United States Patent
Si et al.

(10) Patent No.: US 11,178,668 B2
(45) Date of Patent: Nov. 16, 2021

(54) METHOD AND APPARATUS OF BROADCAST SIGNALS AND CHANNELS FOR SYSTEM INFORMATION TRANSMISSION

(71) Applicant: Samsung Electronics Co., Ltd., Suwon-si (KR)

(72) Inventors: Hongbo Si, Plano, TX (US); Le Liu, Fremont, CA (US); Eko Onggosanusi, Coppell, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/506,961

(22) Filed: Jul. 9, 2019

(65) Prior Publication Data

US 2019/0335470 A1    Oct. 31, 2019

Related U.S. Application Data

(63) Continuation of application No. 15/823,310, filed on Nov. 27, 2017, now Pat. No. 10,470,191.

(Continued)

(51) Int. Cl.
*H04W 72/04*  (2009.01)
*H04W 72/12*  (2009.01)
(Continued)

(52) U.S. Cl.
CPC ....... *H04W 72/0486* (2013.01); *H04L 1/0061* (2013.01); *H04L 5/00* (2013.01);
(Continued)

(58) Field of Classification Search
CPC .......... H04W 72/0486; H04W 72/044; H04W 72/1252; H04W 72/005; H04W 74/008;
(Continued)

(56) References Cited

U.S. PATENT DOCUMENTS 8,467,480 B2   6/2013  Liu et al.
9,654,266 B2   5/2017  Jang et al.
(Continued)

FOREIGN PATENT DOCUMENTS

CN   102484560 A   5/2012
CN   103503344 A   1/2014
(Continued)

OTHER PUBLICATIONS

R1-1613046 Intel Corporation, "On Multiplexing between PSS and SSS" Nov. 18, 2016, 3GPP TSG RAN WG1 Meeting #87 (Year: 2016).*

(Continued)

*Primary Examiner* — Hoang-Chuong Q Vu

(57) ABSTRACT

A method for receiving a broadcasting signal in a wireless communication system. The method comprises receiving, from a base station (BS), a physical broadcasting channel (PBCH) content over a PBCH, and determining the PBCH content including a payload, wherein the payload includes uncommon information within a transmission time interval (TTI) of the PBCH that comprises at least a portion of a 10-bit system frame number (SFN), a half frame index within a radio frame, and at least part of a synchronization signal (SS) block time index.

20 Claims, 31 Drawing Sheets

Related U.S. Application Data

(60) Provisional application No. 62/541,400, filed on Aug. 4, 2017, provisional application No. 62/521,876, filed on Jun. 19, 2017, provisional application No. 62/511,909, filed on May 26, 2017, provisional application No. 62/483,010, filed on Apr. 7, 2017, provisional application No. 62/475,488, filed on Mar. 23, 2017, provisional application No. 62/454,386, filed on Feb. 3, 2017, provisional application No. 62/443,999, filed on Jan. 9, 2017, provisional application No. 62/438,064, filed on Dec. 22, 2016, provisional application No. 62/435,516, filed on Dec. 16, 2016, provisional application No. 62/432,379, filed on Dec. 9, 2016.

(51) Int. Cl.
*H04L 5/00* (2006.01)
*H04L 1/00* (2006.01)
*H04W 72/00* (2009.01)
*H04J 11/00* (2006.01)
*H04W 74/00* (2009.01)
*H04W 48/08* (2009.01)

(52) U.S. Cl.
CPC ....... *H04W 72/005* (2013.01); *H04W 72/044* (2013.01); *H04W 72/1252* (2013.01); *H04J 11/0069* (2013.01); *H04J 2011/0016* (2013.01); *H04L 1/0068* (2013.01); *H04L 2001/0093* (2013.01); *H04W 48/08* (2013.01); *H04W 72/1289* (2013.01); *H04W 74/008* (2013.01)

(58) Field of Classification Search
CPC ............. H04W 48/08; H04W 72/1289; H04W 72/0406; H04L 1/0061; H04L 5/00; H04L 2001/0093; H04L 1/0068; H04J 11/0069; H04J 2011/0016
See application file for complete search history.

(56) References Cited

U.S. PATENT DOCUMENTS

| | | | |
|---|---|---|---|
| 10,420,050 B2 | 9/2019 | Kim et al. | |
| 2014/0003381 A1 | 1/2014 | Lee et al. | |
| 2015/0085717 A1 | 3/2015 | Papasakellariou et al. | |
| 2016/0029354 A1 | 1/2016 | Lyu et al. | |
| 2016/0277225 A1* | 9/2016 | Frenne | H04L 27/261 |
| 2016/0294528 A1 | 10/2016 | Kim et al. | |
| 2016/0308637 A1* | 10/2016 | Frenne | H04J 11/0069 |
| 2017/0245260 A1* | 8/2017 | Islam | H04L 5/0057 |
| 2017/0353257 A1* | 12/2017 | Islam | H04J 3/0617 |
| 2018/0054837 A1* | 2/2018 | Islam | H04W 74/006 |
| 2018/0084593 A1* | 3/2018 | Chen | H04L 5/0048 |
| 2018/0198659 A1* | 7/2018 | Ko | H04L 27/2662 |
| 2018/0279271 A1* | 9/2018 | Sadiq | H04L 5/0053 |
| 2018/0295590 A1* | 10/2018 | Abedini | H04L 5/0051 |
| 2018/0302182 A1* | 10/2018 | Ly | H04L 5/0023 |
| 2018/0310262 A1* | 10/2018 | Ly | H04L 5/005 |
| 2018/0324678 A1* | 11/2018 | Chen | H04W 48/10 |
| 2018/0359716 A1* | 12/2018 | Bai | H04W 56/001 |
| 2018/0368084 A1* | 12/2018 | Ko | H04W 56/001 |
| 2018/0376438 A1* | 12/2018 | Islam | H04W 56/001 |
| 2019/0103931 A1* | 4/2019 | Yi | H04L 5/001 |
| 2019/0173628 A1* | 6/2019 | Ko | H04L 5/00 |
| 2019/0200306 A1* | 6/2019 | Ko | H04B 7/06 |
| 2019/0349960 A1* | 11/2019 | Li | H04W 72/1242 |
| 2020/0083975 A1* | 3/2020 | Ly | H04L 5/005 |

FOREIGN PATENT DOCUMENTS

| | | |
|---|---|---|
| CN | 105164965 A | 12/2015 |
| CN | 105453456 A | 3/2016 |
| CN | 105745892 A | 7/2016 |
| CN | 106105070 A | 11/2016 |
| EP | 2978151 A2 | 1/2016 |
| EP | 2999140 A1 | 3/2016 |
| WO | 2013066100 A1 | 5/2013 |

OTHER PUBLICATIONS

First Office Action in connection with Chinese Application No. 201780076370.5 dated Sep. 16, 2020, 12 pages.
Extended European Search Report in connection with European Application No. 19185289.6 dated Nov. 3, 2020, 7 pages.
Supplementary European Search Report in connection with European Application No. 17877649.8 dated Nov. 3, 2020, 9 pages.
Extended European Search Report in connection with European Application No. 20187863.4 dated Nov. 3, 2020, 7 pages.
Intel Corporation, "On multiplexing between PSS and SSS," R1-1613046, 3GPP TSG RAN WG1 Meeting #87, Reno, USA, Nov. 14-18, 2016, 6 pages.
LG Electronics, "NR PBCH Design," R1-1611787, 3GPP TSG RAN WG1 Meeting #87, Reno, USA, Nov. 14-18, 2016, 5 pages.
Nokia et al., "NR PBCH Design," R1-1612807, 3GPP TSG RAN WG1 Meeting #87, Reno, USA, Nov. 14-18, 2016, 8 pages.
ZTE et al., "Considerations on SS block design," R1-1611268, 3GPP TSG RAN WG1 Meeting #87, Reno, USA, Nov. 14-18, 2016, 7 pages.
Discussion and Decision, "NR-PBCH design," R1-1705321, 3GPP TSG RAN WG1 Meeting #88bis, Spokane, USA, Apr. 3-7, 2017, 8 pages.
Chinese National Intellectual Property Adminisliation, Decision to Grant dated Jul. 20, 2021 regarding Application No. 202010735956. 1, 8 pages.
Intel Corporation, "Number of Antenna Ports of PBCH", 3GPP TSG RAN WG1 Meeting #87, R1-1611967, Nov. 2016, 4 pages.

* cited by examiner

METHOD AND APPARATUS OF BROADCAST SIGNALS AND CHANNELS FOR SYSTEM INFORMATION TRANSMISSION

CROSS-REFERENCE TO RELATED APPLICATIONS

This application is a continuation of U.S. patent application Ser. No. 15/823,310, filed Nov. 27, 2017, which claims priority to U.S. Provisional Patent Application No. 62/432,379, filed Dec. 9, 2016; U.S. Provisional Patent Application No. 62/435,516, filed Dec. 16, 2016; U.S. Provisional Patent Application No. 62/438,064, filed Dec. 22, 2016; U.S. Provisional Patent Application No. 62/443,999, filed Jan. 9, 2017; U.S. Provisional Patent Application No. 62/454,386, filed Feb. 3, 2017; U.S. Provisional Patent Application No. 62/475,488, filed Mar. 23, 2017; U.S. Provisional Patent Application No. 62/483,010, filed Apr. 7, 2017; U.S. Provisional Patent Application No. 62/511,909, filed May 26, 2017; U.S. Provisional Patent Application No. 62/521,876, filed Jun. 19, 2017; and U.S. Provisional Patent Application No. 62/541,400, filed Aug. 4, 2017. The contents of the above-identified patent documents are incorporated herein by reference.

TECHNICAL FIELD

The present application relates generally to broadcast signals and channel. More specifically, this disclosure relates to system information transmission in an advanced wireless communication system.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide a synchronization signal design in an advanced wireless communication system.

In one embodiment, a user equipment (UE) for receiving a broadcasting signal in a wireless communication system is provided. The UE comprises a transceiver configured to receive, from a base station (BS), a physical broadcasting channel (PBCH) content over a PBCH. The UE further comprises at least one processor configured to determine the PBCH content including a payload, wherein the payload includes uncommon information within a transmission time interval (TTI) of the PBCH that comprises at least a portion of a 10-bit system frame number (SFN), a half frame index within a radio frame, and at least part of a synchronization signal (SS) block time index.

In another embodiment, a base station (BS) for transmitting a broadcast signal in a wireless communication system is provided. The BS comprises at least one processor configured to generate a payload including uncommon information within a transmission time interval (TTI) of a physical broadcasting channel (PBCH) comprising at least a portion of a 10-bit system frame number (SFN), a half frame index within a radio frame, and at least part of a synchronization signal (SS) block time index and determine a PBCH content including the generated payload. The BS further comprises a transceiver configured to transmit the PBCH content to a user equipment (UE) over a PBCH.

In yet another embodiment, a method for receiving a broadcasting signal in a wireless communication system is provided. The method comprises receiving, from a base station (BS), a physical broadcasting channel (PBCH) content over a PBCH and determining the PBCH content including a payload, wherein the payload includes uncommon information within a transmission time interval (TTI) of the PBCH that comprises at least a portion of a 10-bit system frame number (SFN), a half frame index within a radio frame, and at least part of a synchronization signal (SS) block time index.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
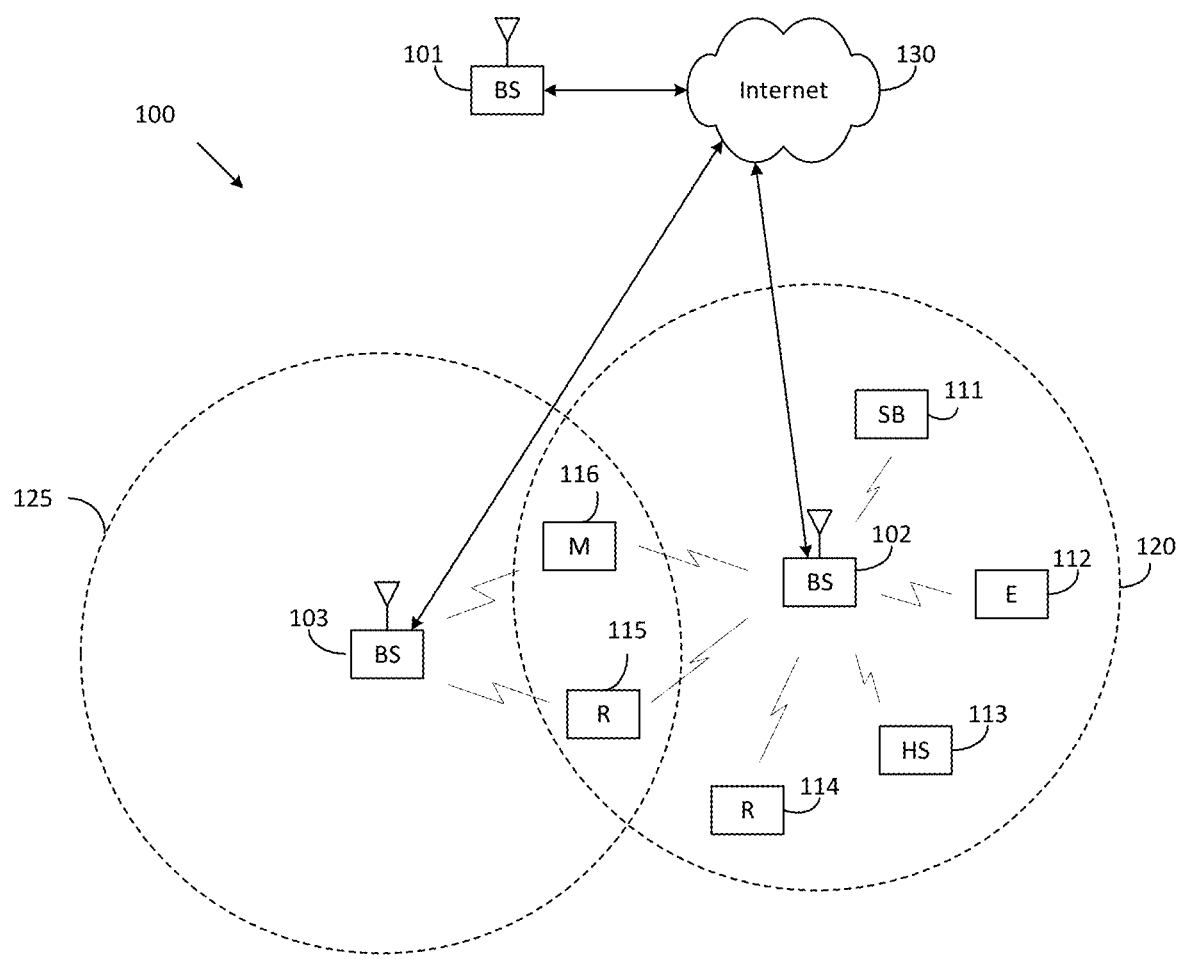
FIG. 1 illustrates an example wireless network according to embodiments of the present disclosure.
Figure 2:
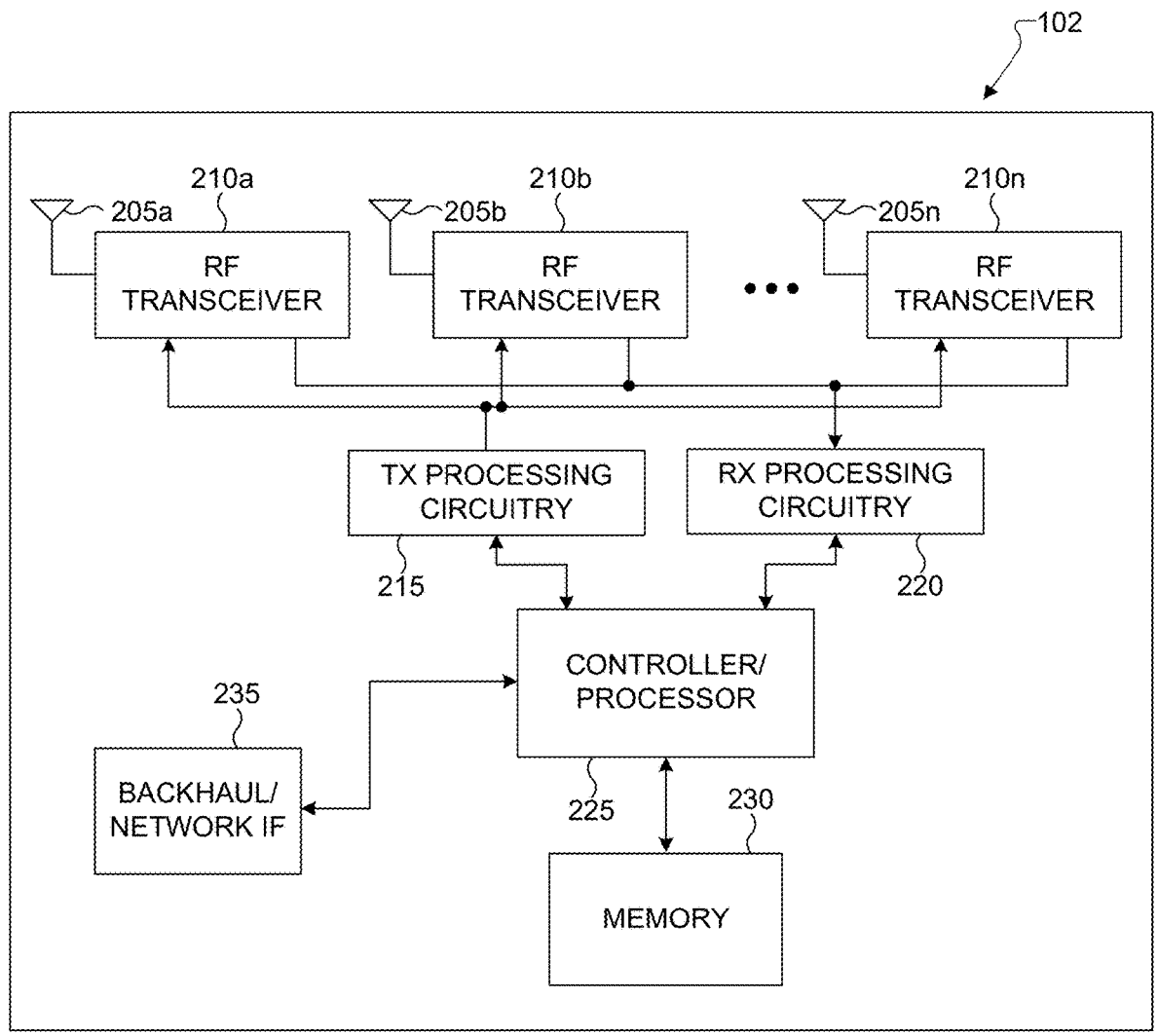
FIG. 2 illustrates an example eNB according to embodiments of the present disclosure.
Figure 3:
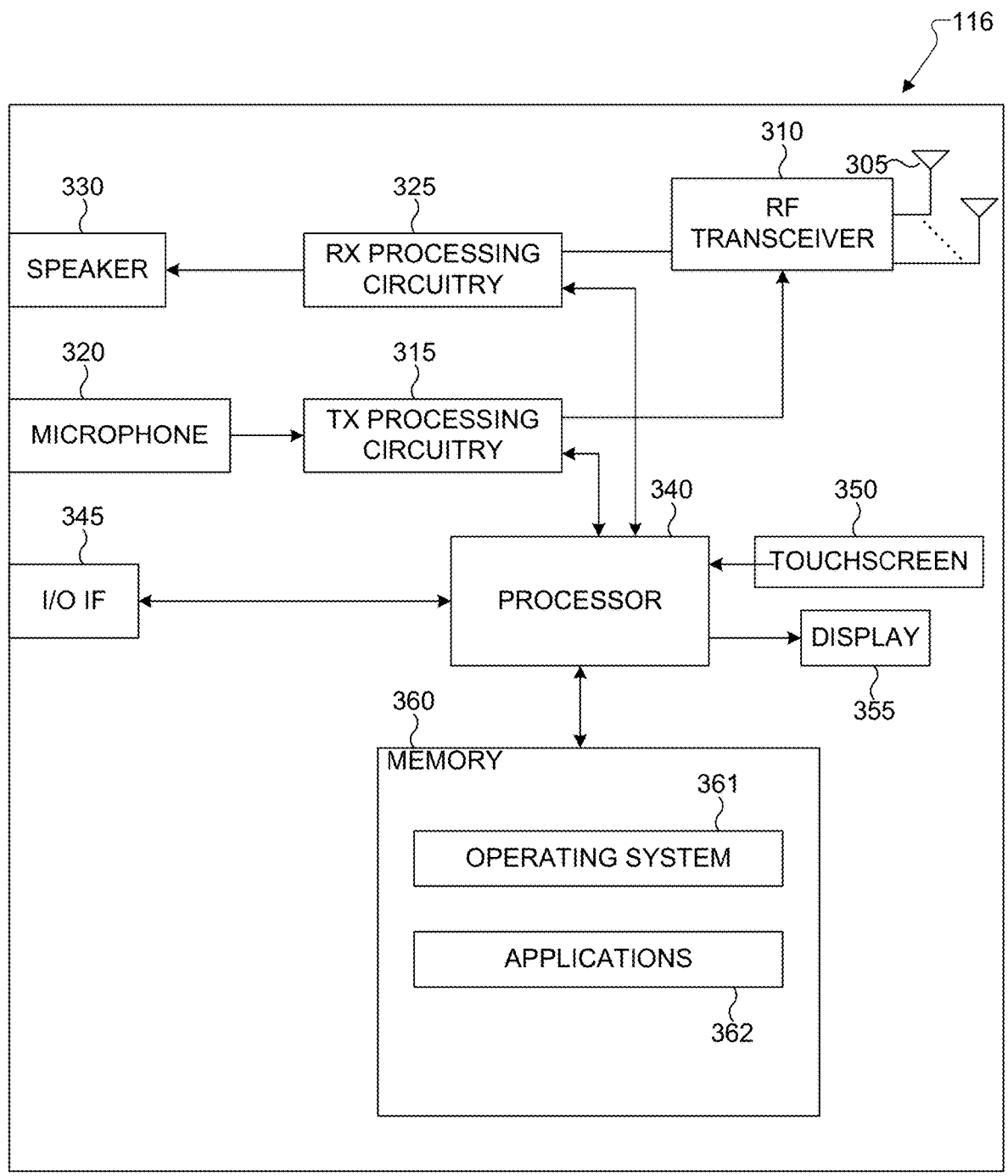
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on PUCCH in an advanced wireless communication system. In certain embodiments, and one or more of the eNBs 101-103 includes circuitry, programing, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceivers 210a-210n are capable of transmitting the PBCH content to a user equipment (UE) over a PBCH and the PBCH content using a transmission scheme based on a single antenna port. In such embodiments, the single antenna port used for PBCH content transmission is the same as the single antenna port used for a secondary synchronization signal (SSS) transmission.

In some embodiments, the RF transceivers 210a-210n are capable of transmitting, to a UE, an RMSI content including at least one of configuration information or part of the configuration information for TRS over a physical downlink shared channel (PDSCH) and receiving, from the UE, the PRACH preamble based on the PRACH information.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of generating a payload including uncommon information within a transmission time interval (TTI) of a physical broadcasting channel (PBCH) comprising at least a portion of a 10-bit system frame number (SFN), a half frame index within a radio frame, and at least part of a synchronization signal (SS) block time index and determining a PBCH content including the generated payload.

In some embodiments, the controller/processor 225 is capable of determining configuration information for a remaining minimum system information (RMSI) transmission, the configuration information including at least one of frequency resource configuration information or time resource configuration information for a control resource set (CORESET) for the RMSI transmission and generating the payload including the configuration information.

In some embodiments, the controller/processor 225 is capable of generating the payload including at least one of configuration information or part of the configuration information for a tracking reference signal (TRS), the configuration information including at least one of a number of antenna ports, a periodicity, or a timing offset, and determining an RMSI content including the generated payload.

In some embodiments, the controller/processor 225 is capable of generating physical random access channel (PRACH) information including a format of a PRACH preamble, wherein the format of the PRACH preamble includes at least one of a preamble sequence length or a numerology.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), a physical broadcasting channel (PBCH) content over a PBCH and the PBCH content using a transmission scheme based on a single antenna port, and wherein the single antenna port used for PBCH content transmission is the same as the single antenna port used for a secondary synchronization signal (SSS) transmission.

In some embodiments, the RF transceiver 310 is capable of receiving, from the BS, an RMSI content including at least one of configuration information or part of the configuration information for TRS over a physical downlink shared channel (PDSCH) and transmitting, to the BS, the PRACH preamble based on the PRACH information.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining the PBCH content including a payload, wherein the payload includes uncommon information within a transmission time interval (TTI) of the PBCH that comprises at least a portion of a 10-bit system frame number (SFN), a half frame index within a radio frame, and at least part of a synchronization signal (SS) block time index.

In some embodiments, the processor 340 is capable of determining the payload including configuration information for a remaining minimum system information (RMSI) transmission, the configuration information including at least one of frequency resource configuration information or time resource configuration information for a control resource set (CORESET) for the RMSI transmission, and determining an RMSI content including the payload that comprises at least one of configuration information or part of the configuration information for a tracking reference signal (TRS), the configuration information including at least one of a number of antenna ports, a periodicity, or a timing offset.

In some embodiments, the processor 340 is capable of determining physical random access channel (PRACH) information including a format of a PRACH preamble, wherein the format of the PRACH preamble includes at least one of a preamble sequence length or a numerology.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
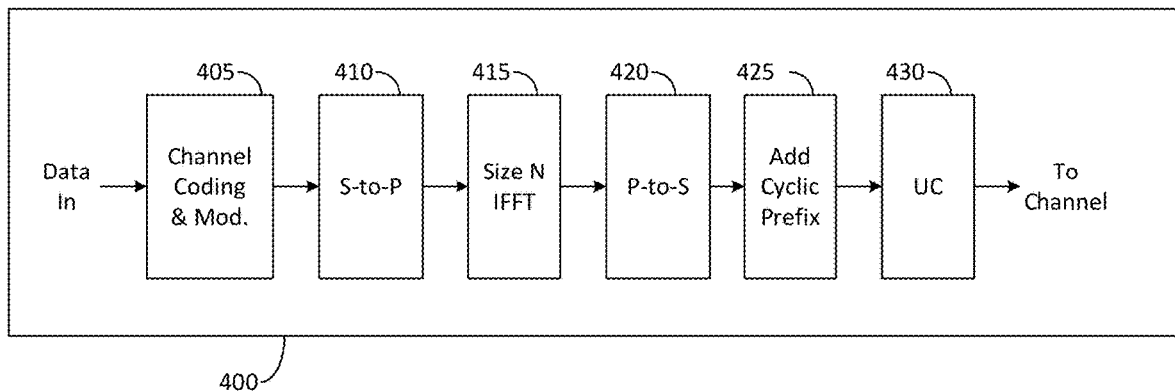
FIG. 4A illustrates a high-level diagram of an orthogonal frequency division multiple access transmit path according to embodiments of the present disclosure.
Figure 4B:
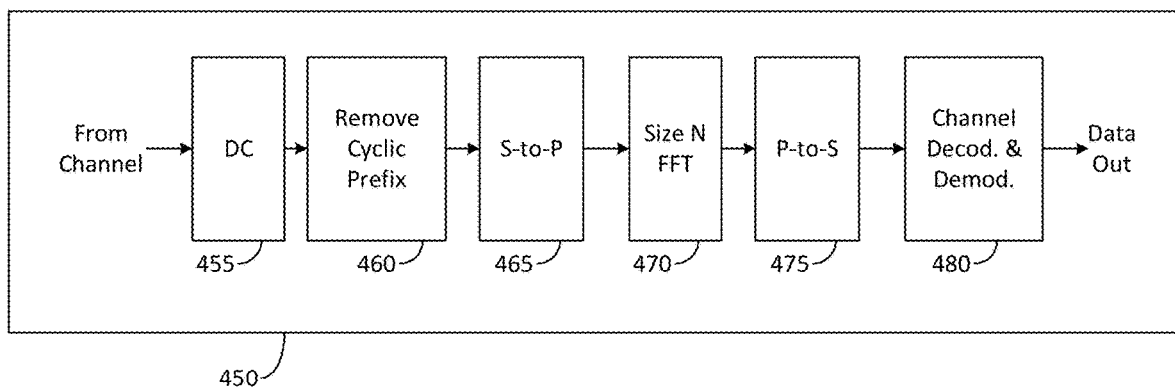
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when it conveys a master information block (MIB) or to a DL shared channel (DL-SCH) when it conveys a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, it may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
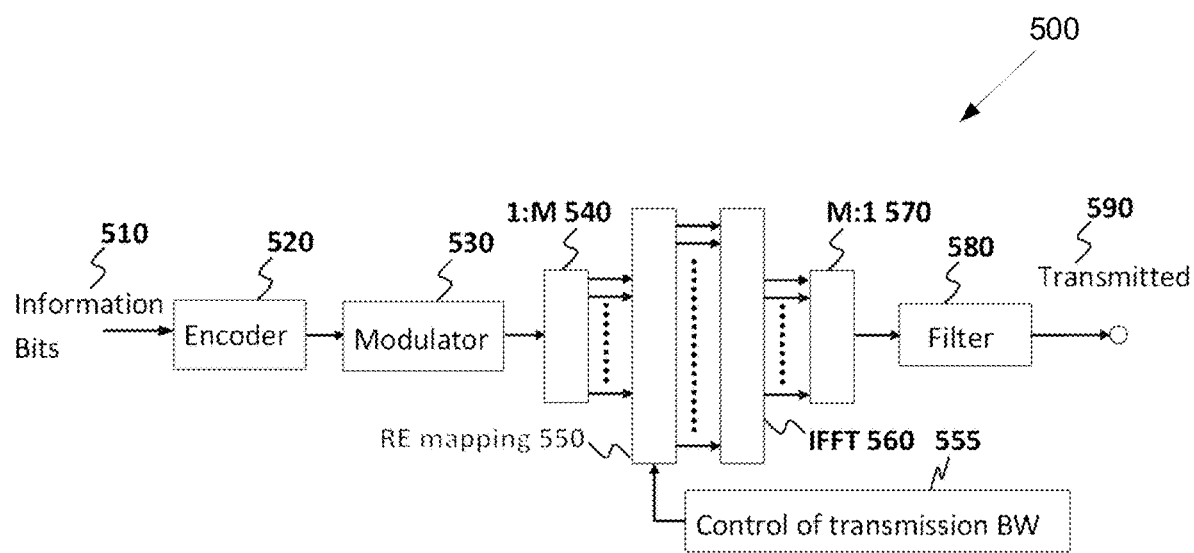
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
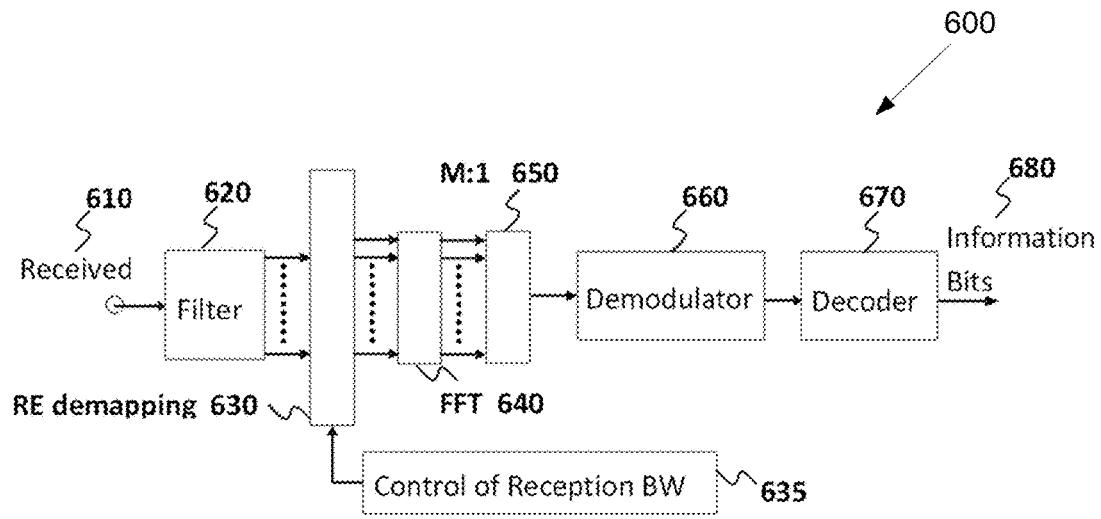
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
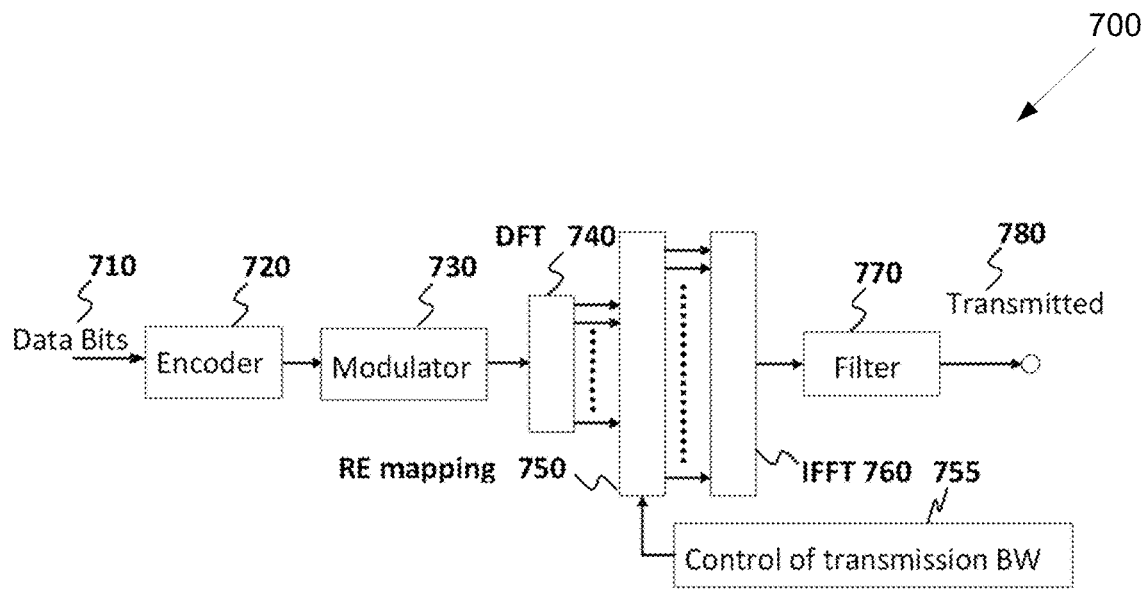
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
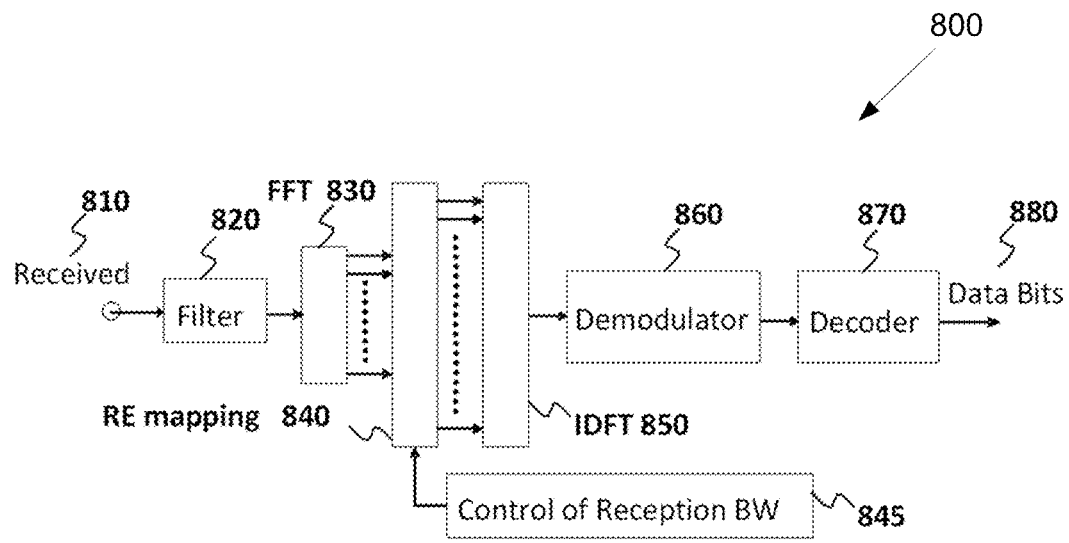
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
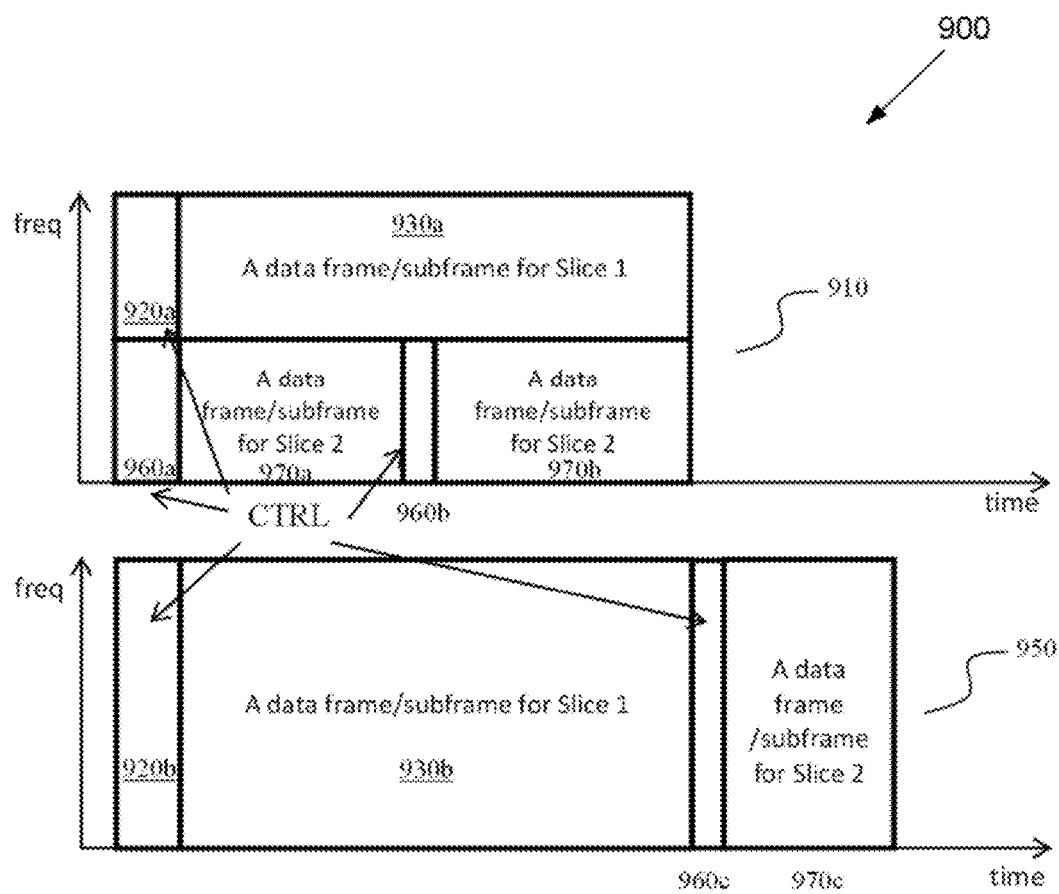
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9.

In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
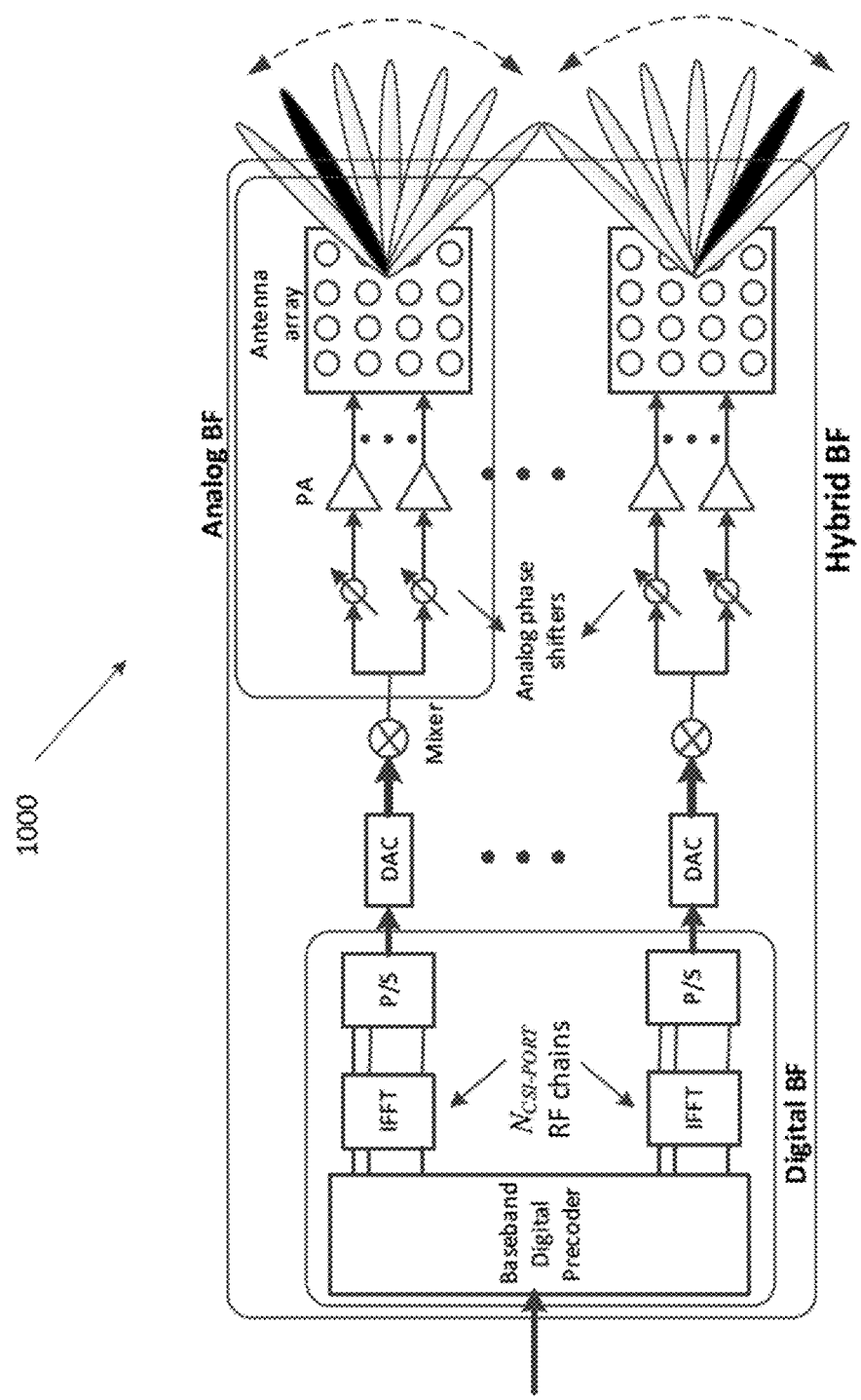
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
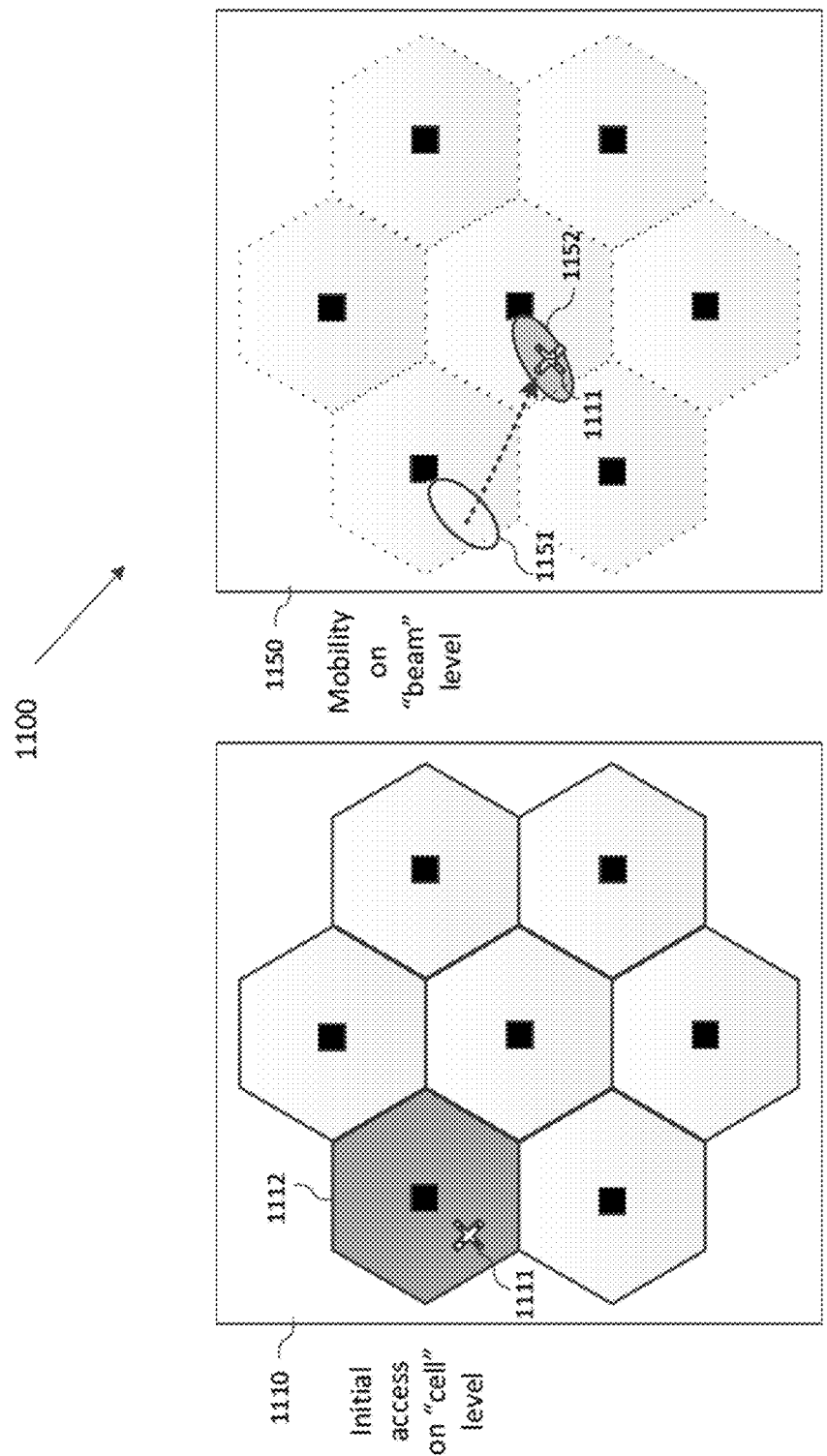
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

Figure 12:
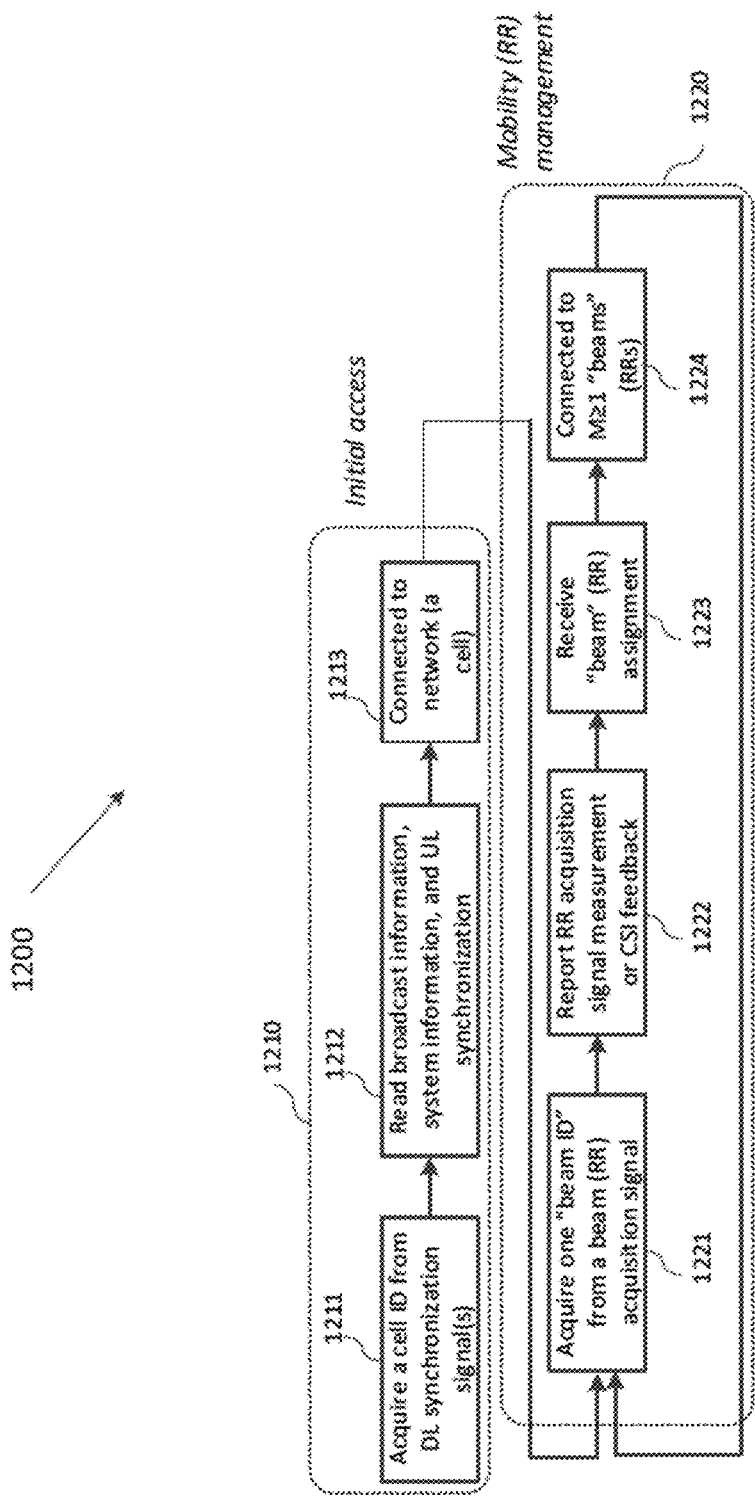
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure) 1212. Once the UE completes the UL synchronization, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report it to the TRP (or network). Second, the UE can measure each of the K CSI-RS resources, calculate an associated CSI (which can include CQI and potentially other CSI parameters such as RI and PMI), and report it to the TRP (or network). Based on the report from the UE, the UE is assigned M≥1 "beams" or RRs either via a higher-layer (RRC) signaling or an L1/L2 control signaling 1223. Therefore the UE is connected to these M "beams"/RRs.

For certain scenarios such as asynchronous networks, the UE can fall back to cell ID based or cell-level mobility management similar to 3GPP LTE system. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping (as shown in FIG. 12) or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

Therefore, considering the above new challenges in initial access procedure and RRM for the new radio access technology (NR), there is a need for designing synchronization signals (along with their associated UE procedures) and primary broadcast channel which carries broadcast information (e.g., master information block or MIB).

In the present disclosure, numerology refers to a set of signal parameters which can include subframe duration, sub-carrier spacing, cyclic prefix length, transmission bandwidth, or any combination of these signal parameters.

In the present disclosure, numerology refers to a set of signal parameters which can include subframe duration, sub-carrier spacing, cyclic prefix length, transmission bandwidth, or any combination of these signal parameters.

For LTE, primary and secondary synchronization signals (PSS and SSS, respectively) are used for coarse timing and frequency synchronization and cell ID acquisition. Since PSS/SSS is transmitted twice per 10 ms radio frame and time-domain enumeration is introduced in terms of system frame number (SFN, included in the MIB), frame timing is detected from PSS/SSS to avoid the need for increasing the detection burden from PBCH. In addition, cyclic prefix (CP) length and, if unknown, duplexing scheme can be detected from PSS/SSS. The PSS is constructed from a frequency-domain ZC sequence of length 63, with the middle element truncated to avoid using the d.c. subcarrier. Three roots are selected for PSS to represent the three physical layer identities within each group of cells. The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence. The cyclic shift indices are constructed from the physical cell ID group.

Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection. PBCH is primarily used to signal the master block information (MIB) which consists of DL and UL system bandwidth information (3 bits), PHICH information (3 bits), and SFN (8 bits). Adding 10 reserved bits (for other uses such as MTC), the MIB payload amounts to 24 bits. After appended with a 16-bit CRC, a rate-1/3 tail-biting convolutional coding, 4× repetition, and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH. In LTE, the 8-bit SFN in the PBCH is the most significant bit (MSB) and updated every 40 ms. The 2-bit least significant bit (LSB) of radio frame number is not explicitly indicated in PBCH payload. The UE relies on the blind detection of 4 possible phases for the PBCH scrambling code to identify the LSB so that the four times of NR-PBCH transmission can be coherently combined within 40 ms. TABLE 1 shows LTE PSS/SSS/PBCH.

TABLE 1

LTE PSS/SSS/PBCH

| LTE design | PSS/SSS | PBCH |
|---|---|---|
| Function | Coarse T/F & cell ID acquisition | MTB acquisition, [confirming cell ID acquisition] |
| Parameters included | Cell ID (504 hypotheses), frame timing (2 hypotheses) | MIB: system BW (3 bits), PHICH info (3 bits), System frame number (SFN): 8-bit MSB of radio frame number, reserved bits (10 bits). |
| Need for blind detection | CP size, [TDD vs. FDD] | Number of antenna ports (1, 2 or 4 ports) by checking 3 CRC mask, 2-bit LSB of radio frame number within 40 ms (1, 2, 3, 4). |
| Reliability | Low to moderate | High (protected with 16-bit CRC + 1/48 effective code rate) |

The essential system information indicated by LTE eNB over logical channel in the BCH or DL SCH. There are two parts in SI static part and dynamic part. Static part is called as MIB and is transmitted using BCH and carried by PBCH once every 40 ms. MIB carries useful information which includes channel bandwidth, PHICH configuration details; transmit power, no. of antennas and SIB scheduling information transmitted along with other information on the DL-SCH. Dynamic part is called as SIB and is mapped on RRC SI messages (SI-1,2,3,4,5,6,7,8,9,10,11) over DL-SCH and transmitted using PDSCH at periodic intervals. SI-1 transmitted every 80 ms, SI-2 every 160 ms and SI-3 every 320 ms. System Information Blocks are grouped in SI containers. Each SI is composed of multiple SIBs. Each SI usually may have different transmission frequency and may be sent in a single sub-frame. SIBs are transmitted using BCCH mapped on DL-SCH which in turn mapped on PDSCH.

However, the NR's carrier frequency as well as bandwidth is different. For NR, the transmission bandwidth containing synchronization signals and PBCH is supposed to be larger than LTE. Moreover, the conventional periodic CRS may not be available as LTE. The NR requires new designs, as well as the corresponding transmission schemes.

The present disclosure focuses on the design of NR broadcast signals and channels. The system information is very essential and the same is broadcasted by LTE eNB over logical channel BCCH. This logical channel information is further carried over transport channel BCH or carried by DL-SCH.

The present disclosure relates generally to wireless communication systems and, more specifically, to the design of NR broadcast signals, along with their associated mapping and procedures. NR main information signals, termed the NR-MIB and NR-SIB, sent on NR-PBCH or NR-PDSCH in the present disclosure.

NR is using higher carrier frequency and has larger bandwidth. The minimum bandwidth for NR-PSS, NR-SSS, and NR-PBCH is larger than that of LTE. NR-SSS is used to identify the cell-ID. The repeated NR-SSS is added to improve the robustness, and also TDM repeated pattern assist better carrier frequency offset (CFO) estimation, since the CFO in higher carrier frequency becomes larger.

Figure 13:
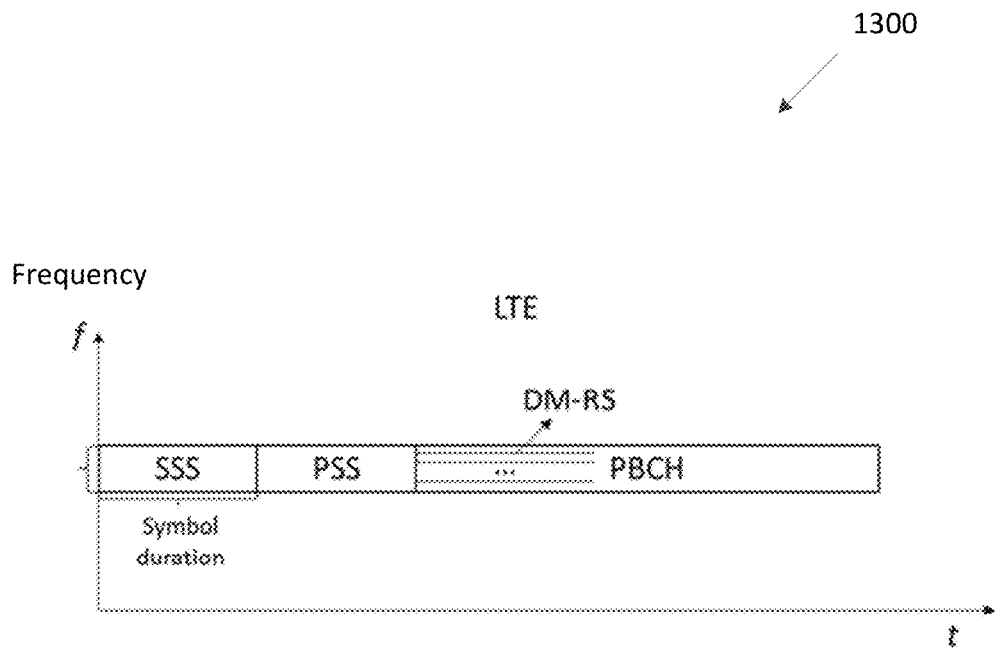
FIG. 13 illustrates an example PSS/SSS/PBCH in long-term evolution system according to embodiments of the present disclosure.

FIG. 13 illustrates an example PSS/SSS/PBCH in long-term evolution system 1300 according to embodiments of the present disclosure. The embodiment of the PSS/SSS/PBCH in long-term evolution system 1300 illustrated in FIG. 13 is for illustration only. FIG. 13 does not limit the scope of this disclosure to any particular implementation.

The NR-SSS is also used as the DM-RS to detect PBCH symbols. The repeated pattern of NR-SSS also improves the channel estimation for PBCH detection. The location of NR-SSS could be before NR-PSS or after NR-PSS, as illustrated in FIG. 13.

Figure 14A:
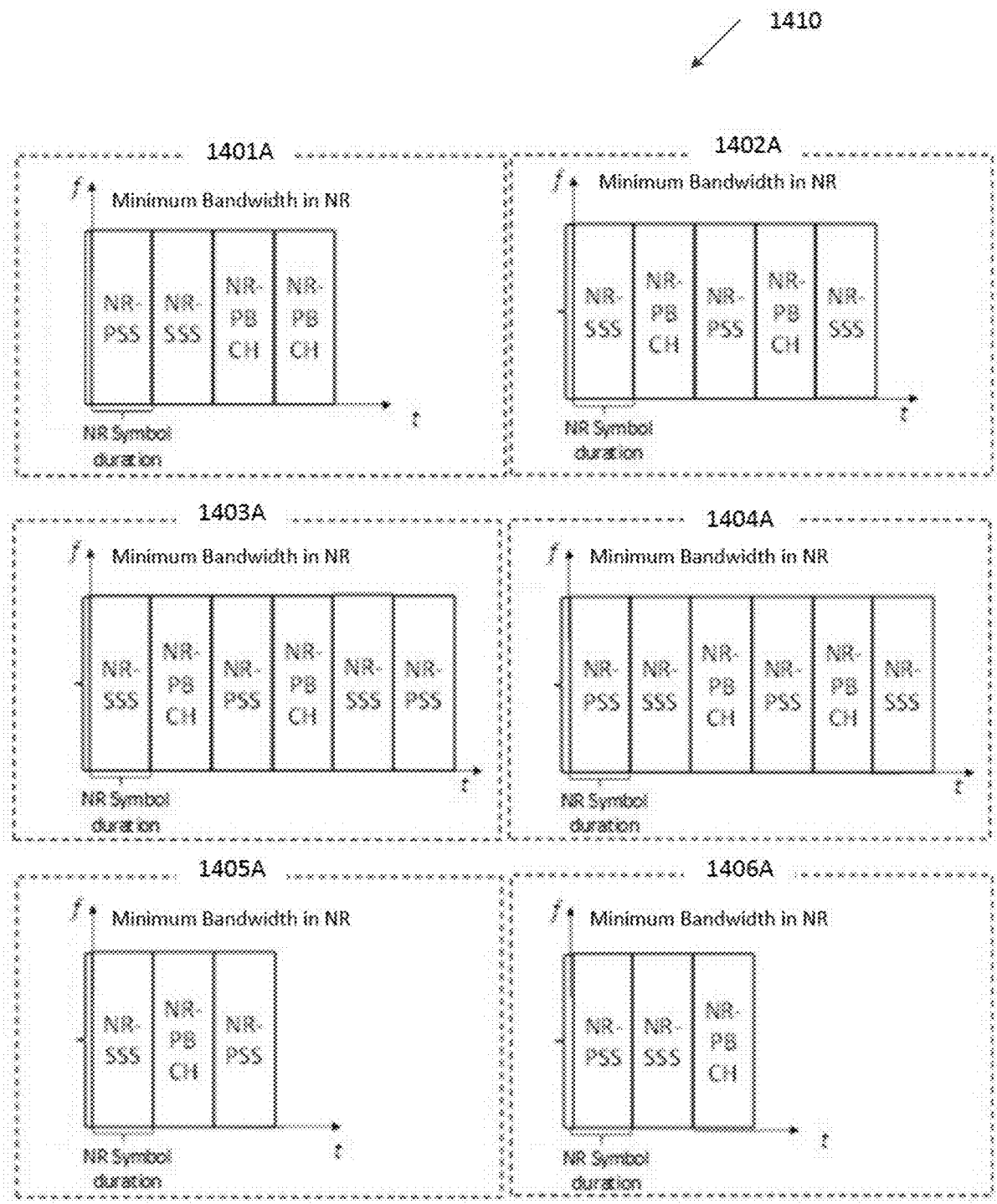
FIG. 14A illustrates an example TDM based NR-SSS and NR PBCH-transmission according to embodiments of the present disclosure.

FIG. 14A illustrates an example TDM based NR-SSS and NR PBCH-transmission 1410 according to embodiments of the present disclosure. The embodiment of the TDM based NR-SSS and NR PBCH-transmission 1410 illustrated in FIG. 14A is for illustration only. FIG. 14A does not limit the scope of this disclosure to any particular implementation.

Figure 14B:
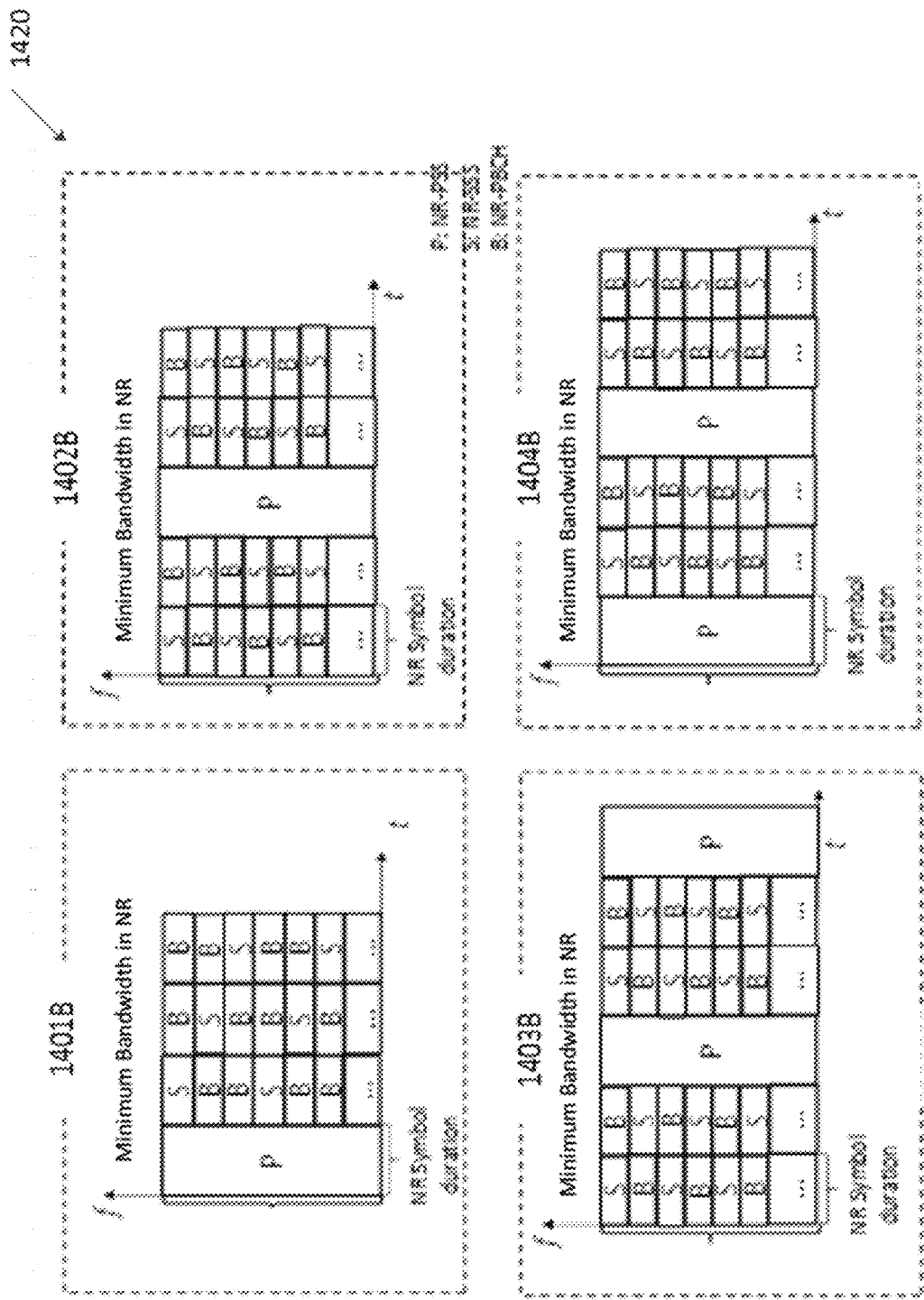
FIGS. 14B and 14C illustrate examples IFDM based NR-SSS and NR-PBCH transmissions according to embodiments of the present disclosure.
Figure 14C:
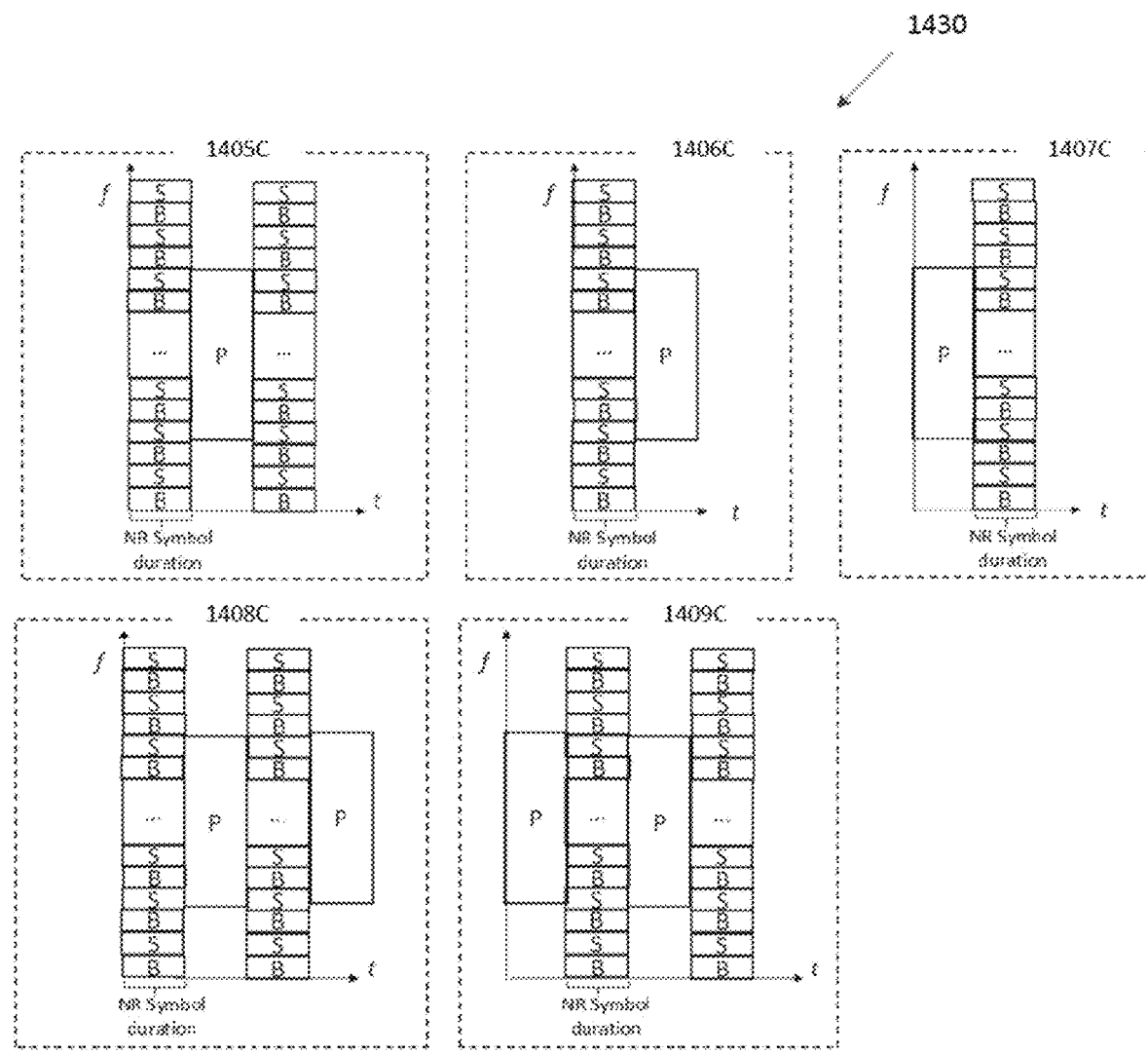

FIGS. 14B and 14C illustrate examples IFDM based NR-SSS and NR-PBCH transmissions 1420 and 1430 according to embodiments of the present disclosure. The embodiment of the IFDM based NR-SSS and NR-PBCH transmissions 1420 and 1430 illustrated in FIGS. 14B and 14C are for illustration only. FIGS. 114B and 14C do not limit the scope of this disclosure to any particular implementation.

Figure 14D:
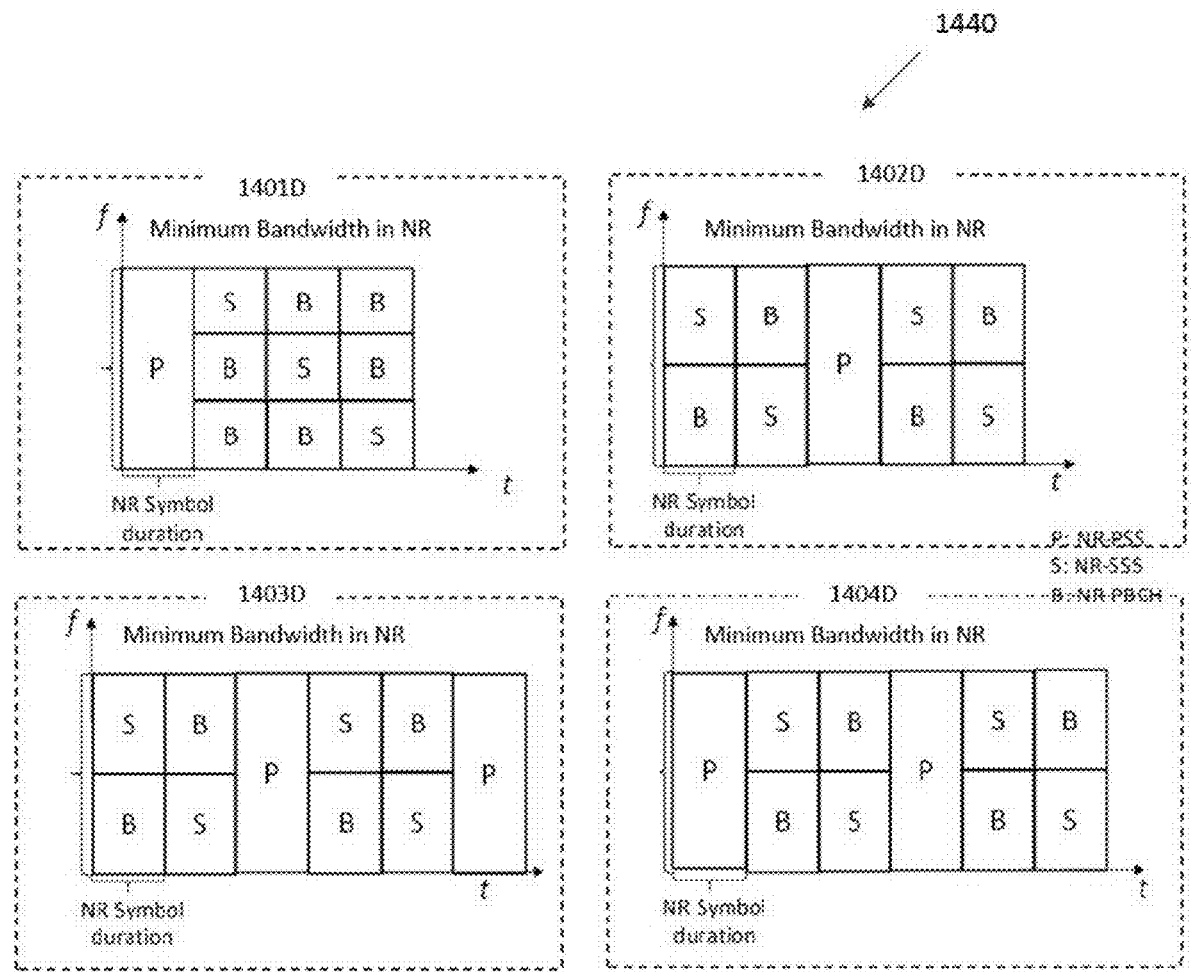
FIGS. 14D and 14E illustrate examples block IFDM based NR-SSS and NR-PBCH transmissions according to embodiments of the present disclosure.
Figure 14E:
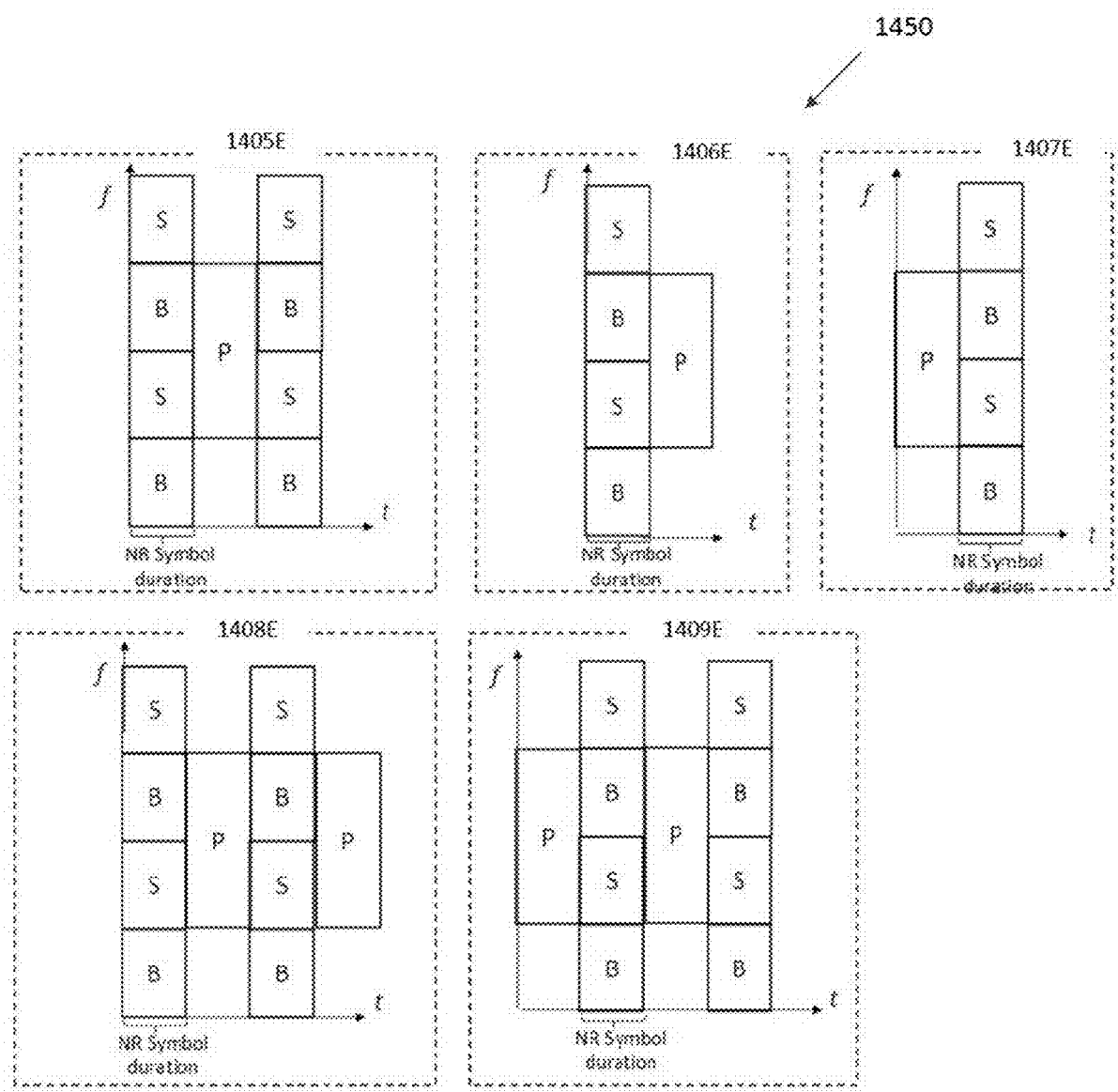

FIGS. 14D and 14E illustrate examples block IFDM based NR-SSS and NR-PBCH transmissions 1440 and 1450 according to embodiments of the present disclosure. The embodiment of the block IFDM based NR-SSS and NR-PBCH transmissions 1440 and 1450 illustrated in FIGS. 14D and 14E are for illustration only. FIGS. 14D and 14E do not limit the scope of this disclosure to any particular implementation.

Figure 14F:
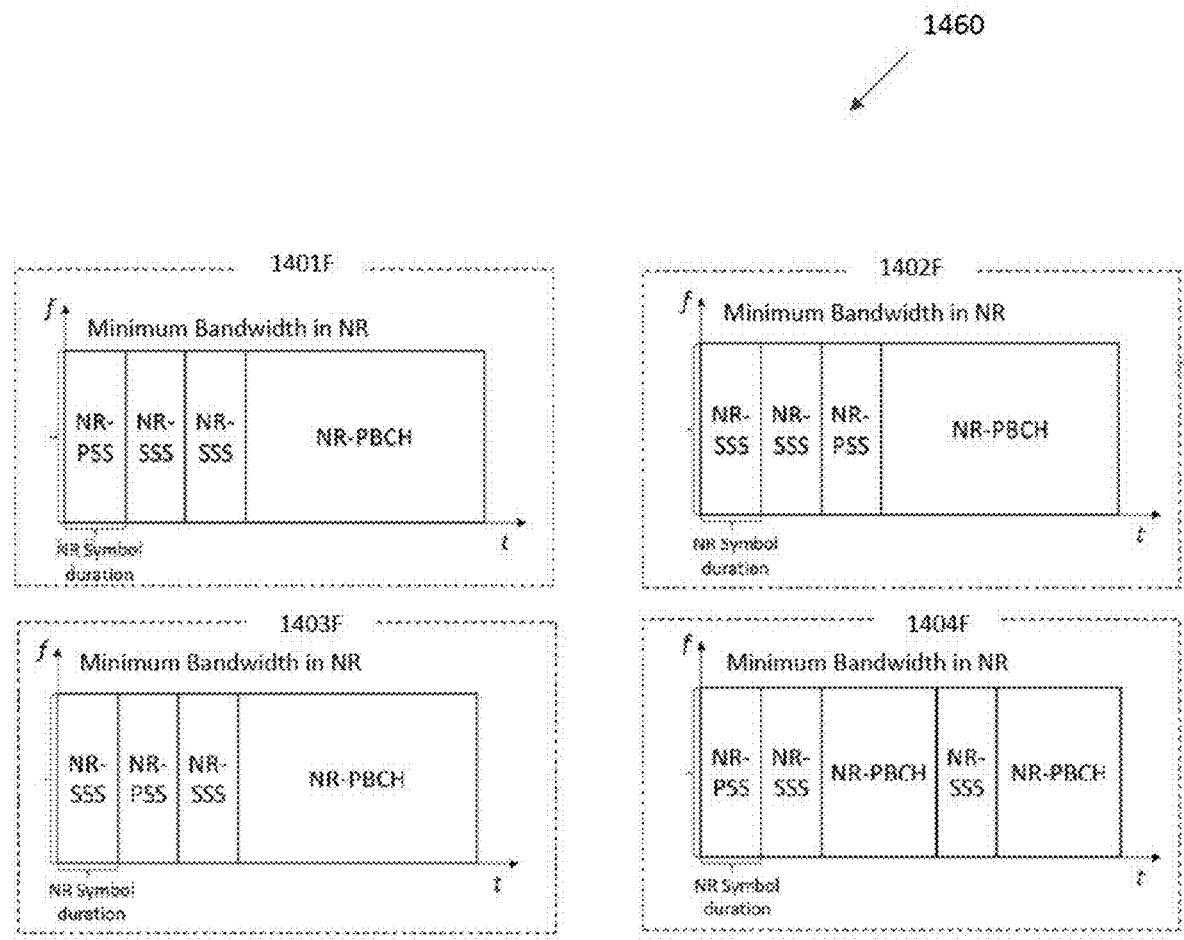
FIGS. 14F and 14G illustrate examples combination of NR-PSS/NR-SSS/NR-PBCH transmissions according to embodiments of the present disclosure.
Figure 14G:
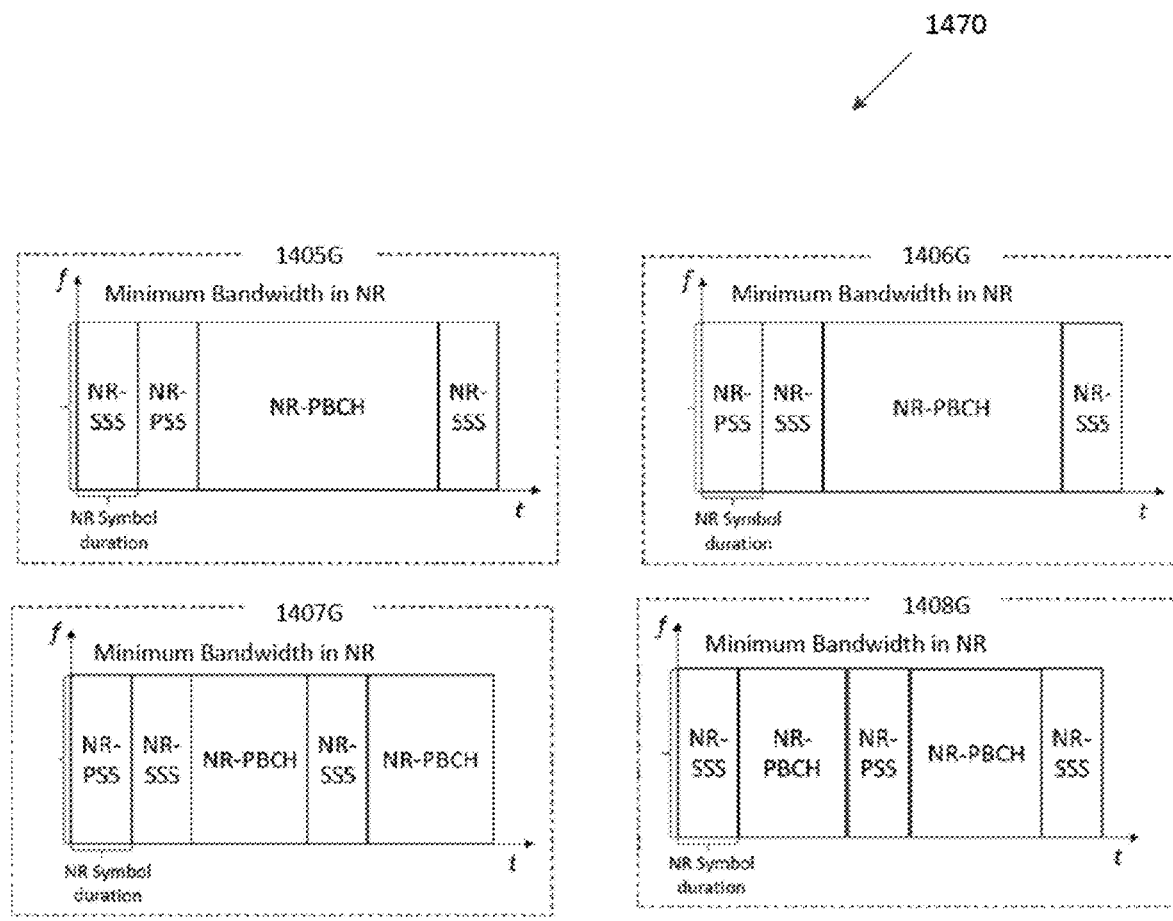

FIGS. 14F and 14G illustrate examples combination of NR-PSS/NR-SSS/NR-PBCH transmission 1460 and 1470 according to embodiments of the present disclosure. The embodiment of the combination of NR-PSS/NR-SSS/NR-PBCH transmission 1460 and 1470 illustrated in FIGS. 4F and 14G is for illustration only. FIGS. 14F and 14G do not limit the scope of this disclosure to any particular implementation.

The larger distance between the repeated NR-SSS symbols achieves better CFO estimation, such as 1403-1408 in FIG. 14A-G.

In LTE, the DM-RS is inserted within the $1^{st}$ and $2^{nd}$ PBCH symbol. If the NR-SSS as well as the repeated NR-SSS symbols are before NR-PBCH, the channel estimation is carried out ahead of PBCH reception, which does not need to buffer the $1^{st}$ PBCH symbol. No or less resource elements of DM-RS are required. Compared with the DM-RS (e.g., 48/(72*4)=16.7% overhead per radio frame) in LTE, to achieve channel estimation based on NR-SSS can save the overhead and leaving more information bits in NR-PBCH symbols.

In LTE, PBCH could be transmitted over single port or multiple antenna ports (e.g., 2 ports and 4 ports). At the UE side, UE performs blind detection on the number of antenna ports, which could cause unnecessary PBCH decoding latency and complexity. For NR, it is preferred to use the fixed number of antenna port(s) for NR-PBCH to reduce the PBCH decoding latency and complexity at the UE side. The NR-SSS has same number of antenna port(s) as NR-PBCH. Also the NR-SSS is sent on the same antenna port as that of NR-PBCH using the same transmission scheme. For example, NR-SSS and NR-PBCH could be transmitted over 1 antenna port, e.g., {port0} and both use the same transmission diversity scheme, such as cyclic shift delay (CSD)/cyclic delay diversity (CDD) on multiplex transmit antennas, or precoding cycling across SSS and PBCH symbols within each radio frames and change the precoding cycling parameters over multiple radio frames. Another example is that NR-SSS and NR-PBCH could be transmitted over 2 antenna ports, e.g., {port0, port1} and both use the same transmission diversity scheme, such as 2-port SFBC in LTE.

Note that combinations of the mapping and multiplexing schemes in FIG. 14A-G are also supported in this disclosure. In the present disclosure, a set of NR-PSS/NR-SSS/NR-PB is defined as a SS block and each SS block is sent periodically. Examples of such a duration is half of a radio frame (such as 5 ms), one radio frame (such as 10 ms), or a multiple of radio frames (such as 10N-ms where N is an integer greater than 1). The block of complex-valued modulated signals $d(0), \ldots, d(M_{symb}-1)$ may be mapped on the PBCH symbols, where the number of NR-PBCH symbols is $M_{symb}$. In FIG. 14A-G, $M_{symb}=2$ is illustrated. The block of complex-valued symbols $y^{(p)}(0), \ldots, y^{(p)}(M_{symb}-1)$ for each antenna port is transmitted during 4 consecutive radio frames starting in each radio frame fulfilling $n_f \bmod 4=0$ and may be mapped in sequence starting with $y(0)$ to resource elements $(k, l)$ constituting the core set of PBCH resource elements.

In case of single antenna port, p=0 and (p) can be deleted for sake of simplicity. The k is the relative subcarrier index for each PBCH symbol and l is the relative symbol index of the radio frame including PBCH. The mapping to resource elements (k,l) not reserved for transmission of reference signals may be in increasing order of first the index k, then the index l in slot 1 in subframe 0 and finally the radio frame number.

An example embodiment in FIG. 14A is that each SS block is composed of time division multiplexing (TDM)-based NR-PSS/SSS/PBCH. For example, in 1401A there are one NR-PSS symbol, one NR-SSS symbol and NR-PBCH symbols. In 1402A there are two NR-SSS symbols at the two edges of the SS block, used for the demodulation of adjacent ($M_{symb}$) NR-PBCH symbols, and one NR-PSS inserted in the middle of ($M_{symb}$) NR-PBCH symbols. In 1403A and 1404A one more NR-PSS symbol is inserted before or after the sub-block of NR-SSS plus NR-PBCH to further improve the time/frequency synchronization as well as the channel estimation for coherent detection of NR-SSS. The 1405A or 1406A are to send part of 1403F or 1404A as a unit by using short periodicity, e.g., 5 ms.

Another example embodiment is in FIG. 14B is that each SS block is composed of interleaved frequency division multiplexing (IFDM)-based NR-SSS/PBCH and combined with TDMed NR-PSS. For example, in 1401B, there is one NR-PSS symbol followed by ($M_{symb}+1$) IFDMed NR-SSS/PBCH symbols. In each IFDMed NR-SSS/PBCH symbol, the NR-SSS resource elements (REs) are mapped on every ($M_{symb}+1$) subcarriers so that there are $1/(M_{symb}+1)$ subcarriers per symbol are NR-SSS; and the NR-PBCH REs are mapped on the remaining $1-1/(M_{symb}+1)$ subcarriers per symbol. In the m-th symbol of IFDMed NS-SSS/PBCH, where m=0 ... $M_{symb}$, the NR-SSS subcarrier index is $k=\bmod[(M_{symb}+1)k'+m, N_{subcarrier}]$ and the NR-PBCH subcarrier index is $=\bmod[(M_{symb}+1)k'+m+i, N_{subcarrier}]$, where $k'=0, 1, \ldots$ $$\left(\frac{N_{subcarrier}}{M_{symb}+1}-1\right),$$

$i=1, \ldots M_{symb}$ and $N_{subcarrier}$ is the total number of subcarriers.

In 1402B there are two IFDMed NR-SSS/PBCH symbol sub-block on each side of NR-PSS. In each IFDMed NR-SSS/PBCH symbol sub-block, there are $$\left(\frac{M_{symb}}{2}+1\right)$$

IFDMed NR-SSS/PBCH symbols. In each IFDMed NR-SSS/PBCH symbol, the NR-SSS resource elements (REs) are mapped on every $$\left(\frac{M_{symb}}{2}+1\right)$$

subcarriers so that there are $$1\bigg/\left(\frac{M_{symb}}{2}+1\right)$$

subcarriers per symbol are NR-SSS; and the NR-PBCH REs are mapped on the remaining $$1-1\bigg/\left(\frac{M_{symb}}{2}+1\right)$$

subcarriers per symbol. In the m-th symbol of IFDMed NS-SSS/PBCH, where m=0 ...

$$\frac{M_{symb}}{2},$$

the NR-SSS subcarrier index is $$k=\bmod\left[\left(\frac{M_{symb}}{2}+1\right)k'+m, N_{subcarrier}\right]$$

and the NR-PBCH subcarrier index is $$k=\bmod\left[\left(\frac{M_{symb}}{2}+1\right)k'+m+i, N_{subcarrier}\right],$$

where k'=0, 1, ...

$$\left(\frac{N_{subcarrier}}{\frac{M_{symb}}{2}+1}-1\right),$$

i=1, ...

$$\frac{M_{symb}}{2}$$

and $N_{subcarrier}$ is the total number of subcarriers for PBCH payload.

In 1403B and 1404B one more NR-PSS symbol is inserted before or after the sub-block of NR-SSS plus NR-PBCH to further improve the time/frequency synchronization as well as the channel estimation for coherent detection of NR-SSS.

The 1405C in FIG. 14C is to further squeeze the IFDMed NR-SSS/PBCH symbols in 1402B into one symbol by using wider BW than that of NR-PSS. The 1406C or 1407C are to send part of 1405C as a unit by using shorter periodicity. Similarly, the 1408C and 1409C are to further squeeze the IFDMed NR-SSS/PBCH symbols in 1403B and 1404B into one symbol, respectively, by using wider BW than that of NR-PSS. Notice that the BW for IFDMed NR-SSS/PBCH symbol can be X times of NR-PSS BW and X can be equal to $$1 \sim \left(\frac{M_{symb}}{2}+1\right).$$

Another example embodiment is in FIG. 14D is that each SS block is composed of Block-IFDM-based NR-SSS/PBCH and combined with TDMed NR-PSS. For example, in 1401D there are one NR-PSS symbol followed by ($M_{symb}$+1) Block-IFDMed NR-SSS/PBCH symbols. In each Block-IFDMed NR-SSS/PBCH symbol, the NR-SSS resource elements (REs) are mapped on the contiguous $$\left(\frac{N_{subcarrier}}{M_{symb}+1}\right) - \text{subcarrier}$$

block so that there are $1/(M_{symb}+1)$ subcarriers per symbol are NR-SSS; and the NR-PBCH REs are mapped on the remaining $1-1/(M_{symb}+1)$ subcarriers per symbol. In the m-th symbol of Block-IFDMed NS-SSS/PBCH, where m=0 ... $M_{symb}$, the NR-SSS subcarrier index is $$k = \text{mod}\left[\left(\frac{N_{subcarrier}}{M_{symb}+1}\right)m + k', N_{subcarrier}\right]$$

and the NR-PBCH subcarrier index is $$k = \text{mod}\left[\left(\frac{N_{subcarrier}}{M_{symb}+1}\right)(m+i) + k', N_{subcarrier}\right],$$

where k'=0, 1, ...

$$\left(\frac{N_{subcarrier}}{M_{symb}+1}-1\right),$$

i=1, ... $M_{symb}$ and $N_{subcarrier}$ is the total number of subcarriers for PBCH payload.

In 1402B there are two IFDMed NR-SSS/PBCH symbol sub-block on each side of NR-PSS. In each IFDMed NR-SSS/PBCH symbol sub-block, there are $$\left(\frac{M_{symb}}{2}+1\right)$$

IFDMed NR-SSS/PBCH symbols. In each Block-IFDMed NR-SSS/PBCH symbol, the NR-SSS resource elements (REs) are mapped on the contiguous $$\left(\frac{N_{subcarrier}}{\frac{M_{symb}}{2}+1}\right) - \text{subcarrier}$$

block so that there are $$1\bigg/\left(\frac{M_{symb}}{2}+1\right)$$

subcarriers per symbol are NR-SSS; and the NR-PBCH REs are mapped on the remaining $$1 - 1\bigg/\left(\frac{M_{symb}}{2}+1\right)$$

subcarriers per symbol. In the m-th symbol of Block-IFDMed NS-SSS/PBCH, where m=0 ...

$$\frac{M_{symb}}{2},$$

the NR-SSS subcarrier index is $$k = \text{mod}\left[\left(\frac{N_{subcarrier}}{\frac{M_{symb}}{2}+1}\right)m + k', N_{subcarrier}\right]$$

and the NR-PBCH subcarrier index is $$k = \text{mod}\left[\left(\frac{N_{subcarrier}}{\frac{M_{symb}}{2}+1}\right)(m+i) + k', N_{subcarrier}\right],$$

where k'=0, 1, ...

$$\left(\frac{N_{subcarrier}}{\frac{M_{symb}}{2}+1}-1\right),$$

i=1, . . .

$$\frac{M_{symb}}{2}$$

and N subcarrier is the total number of subcarriers for PBCH payload.

In 1403D and 1404D one more NR-PSS symbol is inserted before or after the sub-block of NR-SSS plus NR-PBCH to further improve the time/frequency synchronization as well as the channel estimation for coherent detection of NR-SSS.

The 1405E in FIG. 14E is to further squeeze the Block-IFDMed NR-SSS/PBCH symbols in 1402D into one symbol by using wider BW than that of NR-PSS. The 1006c or 1007c are to send part of 1405E as a unit by using shorter periodicity. Similarly, the 1408E and 1409E are to further squeeze the Block-IFDMed NR-SSS/PBCH symbols in 1403D and 1404D, respectively, into one symbol by using wider BW than that of NR-PSS. Notice that the BW for Block-IFDMed NR-SSS/PBCH symbol can be X times of NR-PSS BW and X can be equal to $$1 \sim \left(\frac{M_{symb}}{2} + 1\right).$$

More illustrated combinations of NR-PSS/SSS/PBCH is given in FIGS. 14F and 14G. Note that the other combinations of the mapping and multiplexing schemes in FIGS. 14A-14G are also supported in this disclosure.

Embodiment 1 illustrates the NR-PBCH Format 1, which is a simple format without considering beam sweeping and may be used in carrier frequency<6 GHz, such as 4 GHz. Similar with LTE, the NR-PBCH indicate partial minimum system information (MIB) and the remaining minimum system information (RMSI), which is similar to the SIB1 and SIB2 in LTE, is transmitted in PDSCH or a newly defined secondary physical broadcast control channel (secondary PBCH).

On example of aspect is that the NR-PBCH includes some configuration for the RMSI transmission. If the RMSI is carried in PDSCH, the configuration for the RMSI transmission in NR-PBCH can be the configuration of the PDSCH for RMSI transmission, or the configuration of the control resource set, such as PDCCH, which is used to indicate the scheduling information of the RMSI transmission in PDSCH. If the RMSI or partial RMSI is carried in the secondary PBCH, the configuration for the RMSI transmission in NR-PBCH can be the configuration of the secondary PBCH for RMSI transmission.

Another example of aspect is the DC location. Relative to 1.25 MHz (6 RBs) in LTE for PSS/SSS/PBCH, the bandwidth for NR-PSS/SSS/PBCH may be extended larger, e.g., 5 MHz, containing more information bits in NR-PBCH. The DC subcarrier of NR wideband may not be in the middle of synchronization bandwidth. If the DC location is configurable, the PBCH include the indication of DC offset. The DC offset can be pre-defined for each frequency raster, implicitly indicated by the carrier frequency of PSS/SSS/PBCH. Or there can be only limited number of bits in PBCH to indicate the predefined patterns of possible DC offsets.

Yet another example of aspect different from LTE is that there is no conventional pre-defined always-on CRS in NR and instead the gNB or TRP may configure the measurement RS (MRS) distributed over the DL system bandwidth, where the system bandwidth is indicated in PBCH and larger than that of NR-PSS/SSS/PBCH. This RS can also be defined as configurable common RS, tracking RS (TRS) for time/frequency synchronization (T-F tracking), reduced CRS, or lite CRS, etc. The TRS is configurable but not user-specific, e.g., gNB-specific, TRP-specific, cell-specific, or sector-specific. Alternatively, this RS can be a part of CSI-RS configuration such as cell-specific CSI-RS or level-1 CSI-RS (non-UE-specific CSI-RS).

According to the UE performance/RF specification (e.g., LTE specification), the UE modulated carrier frequency may be accurate to within ±0.1 ppm observed over a period of 0.5 ms compared to the carrier frequency received from the eNB. For example, in case of 4 GHz carrier frequency, the frequency offset between the UE's receiver and the received DL signal can be in the range of ±400 Hz. The UE receiver has to perform frequency tracking continuously so that the residual frequency offset observed in each slot does not exceed the ±400 Hz and thus the SNR of the received DL signal is not significantly degraded. For high speed UEs, the additional frequency offset due to the Doppler shift further exacerbate the SNR degradation.

For example, for a UE speed of 100 km/h and carrier frequency of 4 GHz, the resulting Doppler frequency offset is in the range of ±741 Hz. If the UE does not continuously keep tracking of the frequency offset and accordingly correct the frequency error, the frequency tracking can go off the convergence range. Although rigorous evaluation may be necessary, estimating and correcting the frequency offset every 5 ms or even 10 ms, 80 ms based on PSS/SSS does not seem sufficient enough considering LTE system requirement and the Doppler effect. Therefore, the long transmission interval of SS periodicity seems insufficient to provide reliable frequency tracking.

For time tracking, the bandwidth of the timing measurement signal determines the achievable time resolution in time tracking because the time resolution is inversely proportional to the signal bandwidth. For example, comparing the NR-PSS/SSS sent on the 5 MHz bandwidth and the wideband TRS over the whole DL transmission bandwidth of 100 MHz, the achievable time resolution by wideband TRS is roughly 20 times higher than that of PSS/SSS. Also if we consider the SS block design with smaller CP length and symbol length for the sake of low latency, the time tracking becomes more important for both sub6 GHz and over 6 GHz in NR to keep the time synchronization error within the range of CP length.

One example is that the multiple non-co-located transmission points (TRP) sharing the same cell ID. They are synchronized but quasi-colocated (QCL). The TRPs send same PSS/SSS/PBCH using the shared cell ID. The network can configure one or several antenna ports per TRP. The UE close to one of the TRP could use the TRS on the corresponding antenna port(s) for fine time/frequency/phase tracking. Therefore, TRS (Tracking RS) is necessary especially when we consider the larger SS periodicity in NR and still try to achieve low latency of the synchronization before DL signal detection. The TRS configuration may include e.g., the number of antenna ports, periodicity, timing offset, etc.

Although the SIBs signals may be transmitted with low MCS, the SINR requirement as low as −6 dB is still challenging to get fine time/frequency synchronization with short latency considering the worst case of the cell-edge users. And it is more efficient to use the sparsely distributed TRS REs instead of the subband dense DM-RS for control channel set. But in some special cases, the TRS is configurable to be switched off. Another example is to turn off the TRS if the cell has a small coverage without need to consider the high-mobility users.

The NR-PBCH can indicate the TRS configuration, which may include the TRS on/off, number of the antenna port(s), RE pattern, periodicity, resource configuration (time offset, frequency offset), frequency density, time density, tx power, etc. For sake of simplicity, the TRS on/off, TRS configuration for NR may reuse some existing configurations of CSI-RS in LTE. Considering the channel delay spread varies as the carrier frequency and/or the beamforming precoding, the coherent bandwidth and frequency-selective fading is different. Also the larger subcarrier spacing for higher carrier frequency becomes larger to be robust against the CFO. Therefore, the TRS configuration parameters should include the configurable frequency density of the TRS REs, or predefined density adaptive to carrier frequency band, or predefined density adaptive to subcarrier spacing of the NR-PBCH or the NR-PDSCH in the configured bandwidth, or even the combination of the configurable frequency density but different sets of values for different carrier frequency and/or different SCS. The frequency density could be implicitly indicated by antenna port, or the RE pattern index with predefined RE pattern with different frequency density.

On the other hand, the high mobility is considered for lower frequency band, such as 120 km/h or even 500 km/h in gNB with large coverage. The time-domain channel variation requires more TRS REs in time domain. Therefore, the TRS configuration parameters should include the configurable time density of the TRS REs, or predefined density adaptive to cell coverage/deployment, or predefined density adaptive to carrier frequency band, or predefined density adaptive to subcarrier spacing of the NR-PBCH or the NR-PDSCH in the configured bandwidth, or even the combination of the configurable frequency density but different sets of values for different cell coverage/deployment, and/or carrier frequency, and/or different SCS. The time density could be implicitly indicated by repetition time, or the RE pattern index with predefined RE pattern with different time density. In order to reduce the indication bits, an example is illustrated to define the TRS configuration index to indicate one of the pre-defined patterns of the combination of the configurable parameters as shown in TABLE 2.

TABLE 2

| TRS configuration | |
|---|---|
| TRS configuration index | Parameters of TRS configuration |
| 0 | TRS off |
| 1 | TRS on, 1-port, periodicity1, subframe offset index1, RB index1, RE index1 |

TABLE 2-continued

| TRS configuration | |
|---|---|
| TRS configuration index | Parameters of TRS configuration |
| 2 | TRS on, 2-port, periodicity2, subframe offset index2, RB index2, RE index2 |
| 3 | TRS on, 4-port, periodicity3, subframe offset index1, RB index3, RE index3 |
| 4 | TRS on, 8-port, periodicity4, subframe offset index1, RB index4, RE index4 |
| ... | ... |

In order to reduce the signaling overhead in PBCH, some of the parameters or combinations can be implicitly indicated or fixed. As an illustration, the subframe offset and/or resource block (RB) index may be same for different antenna port(s), which is sparsely distributed over the indicated BW or one or more subbands in the indicated BW. The resource element RE index can be aligned with a predefined pattern in the indicated RB. Some of the resource configurations can also be implicitly indicated by the cell ID or partial cell ID, which is obtained by detecting SSS, PSS or PSS/SSS. Some examples of resource configuration which can be implicitly indicated by the cell ID or partial cell ID (such as cell ID group) are RE indices and/or subframe offset indices.

The periodicity may also be same or pre-defined if the antenna ports are configured for QCL TRPs. Or the periodicity may increase as the number of antenna ports per TRP/gNR is larger.

In one example of aspect is that the NR-PBCH includes the system frame number (SFN), which provides the time reference for a periodic transmission or configured transmission resource. But the SFN indication in NR-PBCH could be different from LTE, which is depending on the NR-PBCH periodicity for coherent combining. If the subcarrier spacing of NR-PSS/SSS/PBCH is twice of that in LTE, each symbol of PBCH contains more information bits and the NR-PBCH transmission can be coherently combined every 20 ms, which may save the accessing time, especially for cell-edge UE. The times of blind detection are reduced by differentiating 2 possible phases for the PBCH scrambling code. Alternatively, it may be simpler to use normal/inverted CRC instead of 2-phase PBCH scrambling code for implicitly indicate 2-bit LSB of radio frame number.

In another example of aspect is that the NR-PBCH has some reserved bits for not only future extension but also for octet aligned of the total bits. TABLE 3 shows NR-PBCH format.

TABLE 3

| NR-PBCH format | |
|---|---|
| NR design | NR-PBCH Format I |
| Function | MIB acquisition, [confirming cell ID acquisition] |
| Parameters included | SFN: MSB of radio frame number<br>    In case of SFN = 7, SFN = (radio frame number) MOD 8<br>    In case of SFN = 8, SFN = (radio frame number) MOD 4<br>    In case of SFN = 9, SFN = (radio frame number) MOD 2<br>    In case of SFN = 10, SFN = (radio frame number) |

TABLE 3-continued

NR-PBCH format

| NR design | NR-PBCH Format I |
|---|---|
| | Configuration for the RMSI transmission |
| |     Configuration of the PDSCH or the configuration of the control resource set for the PDSCH in case of RMSI in PDSCH |
| |     Configuration of the PDSCH or secondary PBCH in case of RMSI or partial RMSI in PDSCH or secondary PBCH |
| | Tracking RS configuration may include the parameters or any combination of the parameters) |
| |     TRS On/off |
| |     TRS port number |
| |     TRS periodicity |
| |     TRS frequency density (the number of REs/sub-carriers used for TRS per RB within an OFDM symbol where TRS is received - the REs/sub-carriers can be adjacent/contiguous or distributed/spaced within the RB) |
| |     TRS time density (the number of OFDM symbols used for TRS within one slot/subframe - the REs/symbols can be adjacent/contiguous or distributed/spaced within one slot/subframe) |
| |     TRS resource configuration (including subframe, time offset, bandwidth, subband, resource block index, resource element index, frequency density, time density, pattern, etc.) |
| |     TRS power (if configurable) |
| | DC offset (if configurable) |
| |     Possible frequency locations of NR-SS block(s) within system bandwidth |
| |         E.g., in case of minBW = 5 MHz and maxBW = 40 MHz in the frequency range below 6 GHz, 3 bits are used to indicate 8 possible frequency locations. |
| | E.g., in case of minBW = 10 MHz and maxBW = 40 MHz in the frequency range below 6 GHz, 2 bits are used to indicate 4 possible frequency locations. Other reserved bits |
| Need for blind detection | In case of SFN = 7, 3-bit LSB of radio frame number within 80 ms (1, 2, 3, 4, 5, 6, 7, 8) |
| | In case of SFN = 8, 2-bit LSB of radio frame number within 40 ms (1, 2, 3, 4) |
| | In case of SFN = 9, 1-bit LSB of radio frame number within 20 ms (1, 2) |
| | In case of SFN = 10, no blind detection |
| Reliability | High (protected with 16-bit CRC, very low effective code rate) |

In some embodiments, NR-PBCH indicates part of the minimum system information (MIB) and the RMSI is carried in the PDSCH, where the RMSI transmission configuration is to use the control resource set, e.g., PDCCH, to indicate the scheduling information of the PDSCH. The NR-PBCH indicate UEs where to find the control resource set. After detecting the PDCCH, the UEs can get the RMSI in the scheduled PDSCH. For example, the UEs in LTE search the PDCCH with a special System Information RNTI (SI-RNTI) to get the scheduling information of the PDSCH.

The scheduling information of scheduled PDSCH may change due to the variable SI payload size due to some optional fields. To avoid the NR-PBCH contents change frequently, the configuration for the control resource set, such as PDCCH, is included in NR-PBCH instead of that of scheduled PDSCH. It is more easer for the coherent combining at the receiver side. The configuration for the control resource set include the frequency resource configuration, e.g., bandwidth, subband, etc. and time resource configuration, e.g., periodicity, time offset, number of symbols, etc. Different from TABLE 3, NR-PBCH contents in the aforementioned embodiments include the configuration of the control resource set for the RMSI transmission but do not include TRS configuration and/or DC offset configuration, or only partial TRS configuration, for example, SFN, configuration of control resource set for the RMSI transmission: frequency resource configuration for control resource set; and time resource configuration for control resource set, partial Tracking RS configuration (such as on/off, 1 antenna port, default periodicity, frequency density, time density, time offset), other reserved bits, and CRC.

Besides the scheduling information for the scheduled PDSCH, e.g., periodicity, time offset, subband location, resource block position, etc., which is used for UEs to find the RMSI (similar to the SIB 1 and SIB2 in LTE), the control resource set may also include TRS configuration and DC offset configuration (if configurable), for example, configuration or partial configuration for RMSI in PDSCH: frequency resource configuration for the scheduled PDSCH; time resource configuration for the scheduled PDSCH; transport block size (TBS), MCS, etc.; and numerology of subcarrier spacing, CP length, etc., remaining Tracking RS configuration (such as tx power/power boosting, configurable ant port if more than 1, configurable periodicity, QCL mapping of antenna ports or NR-SS blocks, etc.), and DC offset configuration (if configurable).

In some embodiments, NR-PBCH indicates the part of minimum system information (MIB) and the scheduling information for the RMSI in PDSCH. The UEs directly find the scheduled PDSCH based on the indication in NR-PBCH for RMSI transmission. Different from TABLE 3, NR-PBCH contents in the aforementioned embodiments include the configuration of the PDSCH for the RMSI transmission but do not include TRS configuration and/or DC offset configuration or only partial TRS configuration, for example, SFN, configuration of the PDSCH for the RMSI transmission: frequency resource configuration for the scheduled PDSCH; time resource configuration for the scheduled PDSCH; transport block size (TBS), MCS, etc. for the scheduled PDSCH; numerology of subcarrier spacing, CP length, etc. for the scheduled PDSCH, partial Tracking RS configuration (such as on/off, 1 antenna port, default periodicity, frequency density, time density, time offset), other reserved bits, and CRC. In such embodiments, the configuration parameters of the PDSCH for the RMSI transmission are the scheduling information for UEs to find and detect the RMSI in there. Therefore, the scheduled PDSCH include RMSI or partial RMSI, remaining Tracking RS configuration (such as tx power/power boosting, configurable ant port if more than 1, configurable periodicity, QCL mapping of antenna ports or NR-SS blocks, etc.), and DC offset configuration (if configurable).

In some embodiments, NR-PBCH indicates the part of the minimum system information (MIB) and the configuration for PDSCH for RMSI. The UEs directly find the PDSCH based on the indication in NR-PBCH. Different from TABLE 3, NR-PBCH contents in the aforementioned embodiments include the configuration of the PDSCH for the RMSI transmission but do not include TRS configuration and/or DC offset configuration or only partial TRS configuration, such as SFN, configuration of the PDSCH (or secondary PBCH) for RMSI transmission: frequency resource configuration for the PDSCH; time resource configuration for the PDSCH; transport block size (TBS), MCS, etc. for the PDSCH; and numerology of subcarrier spacing, CP length, etc. for the PDSCH, partial Tracking RS configuration (such as on/off, 1 antenna port, default periodicity, frequency density, time density, time offset), other reserved bits, and CRC. In such embodiments, the configuration parameters for secondary PBCH or PDSCH are the scheduling information for UEs to find RSMI in there. The secondary PBCH or PDSCH may have similar numerology as PBCH but with different periodicity and/or resource allocation. The secondary physical broadcast channel contents include RMSI or partial RMSI, remaining Tracking RS configuration (such as tx power/power boosting, configurable ant port if more than 1, configurable periodicity, QCL mapping of antenna ports or NR-SS blocks, etc.), and DC offset configuration (if configurable)

Note that some of the parameters or combinations can be implicitly indicated or fixed to save the signaling overhead in MIB and/or SIB(s). As an illustration, the time resource configuration for MIB in PBCH and/or SIB(s) of RMSI may be fixed or pre-defined, such as periodicity, time offset, and/or number of symbols. Also note that in the above embodiments and sub-embodiments, the Tracking RS configuration and DC offset configuration (if configurable) can be combined together by using the pre-defined pattern. Also note that in the above embodiments and sub-embodiments, the Tracking RS configuration, if not indicated in MIB or RMSI, can be indicated in RRC signals carried in PDSCH.

Another possibility is to explicitly indicate partial SFN and implicitly indicate the remaining bits of SFN. The implicit scheme include using different scrambling sequences, and/or rate matching with different redundant versions (RVs), and/or the different CRC masks for the PBCH in each SFN within PBCH TTI.

For example, assuming PBCH TTI is 80 ms, the 7-bit MSB of SFN is indicated in PBCH payload. The remaining 3-bit LSB is implicitly indicated by using scrambling sequences. Alternative one is to prepare a long scrambling sequence with same length of 8*(Number of PBCH coded bits per NR-SS block). The 8 segments of the long scrambling sequence are used to multiplex with the PBCH payload with length of (Number of PBCH coded bits per NR-SS block), sent at {0, 10, 20, 30, 40, 50, 60, 70 ms} within PBCH TTI of 80 ms, respectively. Therefore, each cell has one long scrambling sequences for PBCH.

Alternative two is to generate 8 short scrambling sequences are generated with length of (Number of PBCH coded bits per NR-SS block) and pre-allocated for each PBCH payload in each subframe. Therefore, each cell has a group of 8 short scrambling sequences. The short scrambling sequences can be generated based on the same cell-specific base sequence but use different cyclic shifts and/or different cover codes on top of the base sequence to keep their orthogonality. The cyclic shifts and/or cover codes are subframe-specific. For sake of simplicity, the cover codes could be orthogonal OCC codes, etc.

Alternative three is to generate a pair of long scrambling sequences with length of 4*(Number of PBCH coded bits per NR-SS block). The 4 segments of one long scrambling sequence are used to multiplex with the PBCH payload with length of (Number of PBCH coded bits per NR-SS block), sent at {0, 20, 40, 60 ms} within PBCH TTI of 80 ms, respectively. The 4 segments of another long scrambling sequence are used to multiplex with the PBCH payload with length of (Number of PBCH coded bits per NR-SS block), sent at {10, 30, 50, 70 ms} within PBCH TTI of 80 ms, respectively. Therefore, each cell has a pair of long scrambling sequences for PBCH. The two scrambling sequences can be based on the same cell-specific base sequence but use different cyclic shifts and/or different cover codes on top of the base sequence to keep their orthogonality. The cyclic shifts and/or cover codes are subframe-group-specific. For sake of simplicity, the cover codes could be orthogonal OCC codes, etc.

In NR, let's assume we have PBCH payload of 64 bits. After Polar coding and rate matching, we could have 768 bits. With 8 times repetition, the 768*8 bits are scrambled by using Alt1 long scrambling sequence with length of 768*8. The QPSK-modulated 384*8 symbols are segmented into 8 RVs with each RV has self-decodable 384 symbols. Each RV can be mapped into the 384 REs in the 2 NR-PBCH symbols excluding the DMRS REs with 1/3 overhead. Each segment of scrambling sequence to identify the 3-bit LSB of SFN.

Alternatively, the 768 bits are directly scrambled by using Alt2 8 short scrambling sequences with length of 768. In case of Alt2, the 8 short scrambling sequences is pre-defined to differentiate SFN {0, 10, 20, 30, 40, 50, 60, 70 ms} within PBCH TTI of 80 ms. The QPSK-modulated 384 symbols have self-decodable 384 symbols, mapped into the 384 REs in the 2 NR-PBCH symbols excluding the DMRS REs with 1/3 overhead. Each short scrambling sequence is to identify the 3-bit LSB of SFN.

Alternatively, with 4 times repetition, the 768*4 bits are scrambled by using Alt3 a pair of long scrambling sequences with length of 768*4. In case of Alt3, the pair of long scrambling sequences is pre-defined to differentiate two groups of SFN {0, 20, 40, 60 ms} and {10, 30, 50, 70 ms} within PBCH TTI of 80 ms. The QPSK-modulated 384*4 symbols are segmented into 4 RVs with each RV has self-decodable 384 symbols. Each RV can be mapped into the 384 REs in the 2 NR-PBCH symbols excluding the DMRS REs with 1/3 overhead. Each segment of scrambling sequence is to identify the 2-bit LSB of SFN. The remaining 1-bit SFN is differentiated by a pair of scrambling sequences.

In some embodiments, NR-PBCH Format 2 that is a unified format considering both single/multi-beam synchronizations is considered. The beam sweeping is used to send NR PSS/SSS/PBCH and the number of beams is configurable. A small number of wide beams may be considered in case of carrier frequency<6 GHz; while a large Narrow beams may be used in carrier frequency>6 GHz, such as 30 GHz, to combat with significant path loss/shadowing and extend the coverage.

Figure 15:
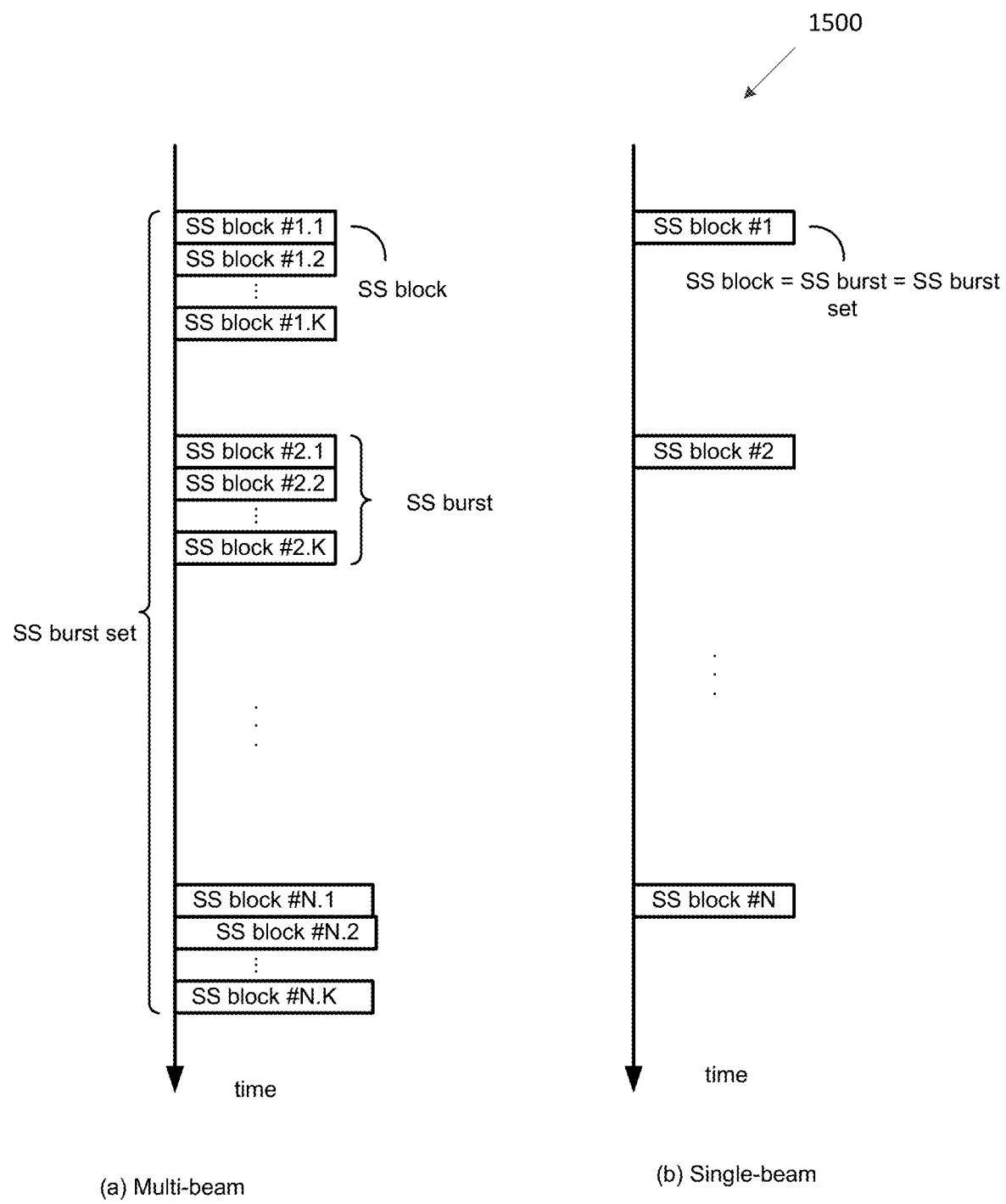
FIG. 15 illustrates an example beam transmission according to embodiments of the present disclosure.

FIG. 15 illustrates an example beam transmission 1500 according to embodiments of the present disclosure. The embodiment of the beam transmission 1500 illustrated in FIG. 15 is for illustration only. FIG. 15 does not limit the scope of this disclosure to any particular implementation.

The beam sweeping for multi-beam NR-PSS/SSS/PBCH is illustrated in FIG. 15, where a SS burst set is consisting of multiple contiguous or non-contiguous SS bursts and each SS burst include a group of contiguous or non-contiguous SS blocks. The SS burst can also be defined as SS group and the SS burst set can be defined as SS group set. Each SS block location within a SS burst/group set as well as the SS burst/group and SS burst/group set are pre-defined with the measurement window, e.g., 5 ms, for each frequency band. The SS burst set is used to carry out the beam sweeping over the whole cell coverage. In each SS block, there are NR-PSS/SSS/NR-PBCH, which is sent by gNB/TRP with a beamforming/precoding/antenna weights/spatial filtering. The single-beam, illustrated in FIG. 15, is regarded as a special case of multi-beam in FIG. 15, where there is only one SS burst and one SS block per SS burst so that SS block=SS burst=SS burst set.

Figure 16:
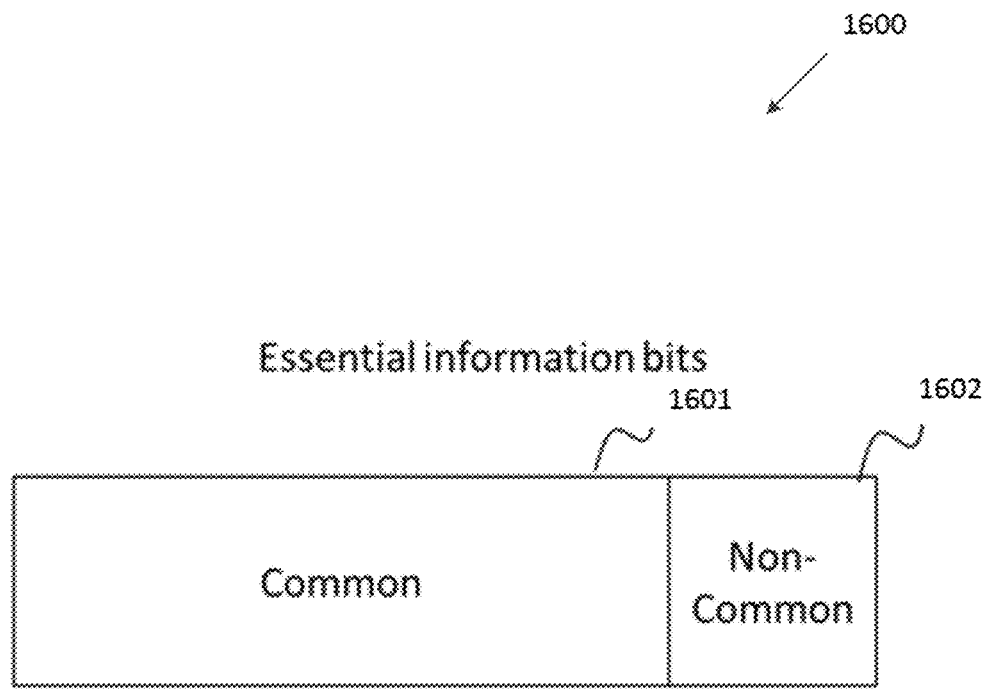
FIG. 16 illustrates an example essential bit information according to embodiments of the present disclosure.

FIG. 16 illustrates example essential bit information 1600 according to embodiments of the present disclosure. The embodiment of the essential bit information 1600 illustrated in FIG. 16 is for illustration only. FIG. 16 does not limit the scope of this disclosure to any particular implementation.

As shown in FIG. 16, the essential information bits indicated in PBCH is divided into common information and non-common information. The common information can be coherently combined over configured period of time, such as among the SS blocks in a SS burst and/or multiple SS blocks in a SS burst set; while the non-common information may include specific information for a SS-block, such as its specific resource configuration including LSB of radio frame index, subframe index, symbol index and the SS-block specific TRS configuration if different. In case of multi-beam NR-SS blocks, the TRS could be configured for the beam-specific or beam-burst-specific RRM measurement. The examples of the DC offset configuration and/or TRS configuration illustrated in the aforementioned embodiments may also apply to the corresponding configurations common to multiple SS-blocks.

The coding schemes and resource mapping can be designed separately for common and non-common information respectively. The codewords and length of CRC may be different. In LTE, tail-bite convolutional coding (TBCC) is used for PBCH. If the number of information bits of common or non-common is small, the simple coding scheme, e.g., Reed-Muller codes, could be used for fast detection.

Although the common and non-common information is separately coded, they are both mapped into the PBCH symbols with or without symbol boundary. The common information with fixed number of bits is decoded first. The number of remaining bits may be configurable according to the common information. According to the indication in common information, UE may know the length of information bits of the following non-common part. If there is no non-common information, the UE may skip the following bits detection within the PBCH symbol. Accordingly, the number of PBCHs is configurable based on the common information indication.

The NR-PBCH contents in the aforementioned embodiments are illustrated in TABLE 4. Note that the payload size for common and uncommon information and/or the number of REs in PBCH to be mapped to carry common and uncommon information can be different for different carrier frequency ranges. For example, the number bits and/or the number of REs to transmit uncommon information for carrier frequency range 0 to 6 GHz can be smaller than the ones for carrier frequency range 6 to 60 GHz.

TABLE 4

| NR-PBCH format 2 | |
| --- | --- |
| NR design | NR-PBCH Format 2 |
| Function | MIB acquisition, [confirming cell ID acquisition] |
| Parameters included | Common information may include<br>SFN<br>    In case of SFN = 7, SFN = (radio frame number) MOD 8<br>    In case of SFN = 8, SFN = (radio frame number) MOD 4<br>    In case of SFN = 9, SFN = (radio frame number) MOD 2<br>    In case of SFN = 10, SFN = (radio frame number)<br>Configuration for the RMSI transmission<br>    Configuration of the PDSCH or the configuration of the control<br>    resource set for the PDSCH in case of RMSI in PDSCH<br>    Configuration of the secondary PBCH or PDSCH in case of<br>    RMSI or partial RMSI in secondary PBCH or PDSCH<br>Tracking RS common configuration may include the parameters or any<br>combination of the parameters<br>    TRS On/off<br>    TRS port number<br>    TRS periodicity<br>    TRS frequency density (the number of REs/sub-carriers used<br>    for TRS per RB within an OFDM symbol where TRS is<br>    received - the REs/sub-carriers can be adjacent/contiguous or<br>    distributed/spaced within the KB)<br>    TRS time density (the number of OFDM symbols used for TRS<br>    within one slot/subframe - the REs/symbols can be<br>    adjacent/contiguous or distributed/spaced within one<br>    slot/subframe) |

TABLE 4-continued

NR-PBCH format 2

| NR design | NR-PBCH Format 2 |
|---|---|
| | TRS resource configuration (including subframe, resource block index, subband, resource element index, frequency density, time density, pattern, etc.) |
| | TRS power (if configurable) |
| | DC offset (if configurable) |
| | Possible frequency locations of NR-SS block(s) within system bandwidth |
| |     E.g., in case of minBW = 5 MHz and maxBW = 40 MHz in the frequency range below 6 GHz, 3 bits are used to indicate 8 possible frequency locations. |
| |     E.g., in case of minBW = 10 MHz and maxBW = 40 MHz in the frequency range below 6 GHz, 2 bits are used to indicate 4 possible frequency locations. |
| |     E.g., in case of minBW = 50 MHz and maxBW = 400 MHz in the frequency range from 24 GHz to 52.6 GHz, 3 bits are used to indicate 8 possible frequency locations. |
| |     E.g., in case of minBW = 100 MHz and maxBW = 400 MHz in the frequency range from 24 GHz to 52.6 GHz, 2 bits are used to indicate 4 possible frequency locations. |
| | Beam Common configuration for beam sweeping may include |
| |     Single beam or multi-beam |
| |     SS-block periodicity |
| |     SS-block pattern per periodicity: SS burst set, Number of SS bursts per SS burst set, Number of SS blocks per SS burst |
| | Other reserved bits |
| | Non-common information may include |
| |     LSB of radio frame number |
| |         In case of SFN = 7, 3-bit LSB of radio frame number within 80 ms (1, 2, 3, 4, 5, 6, 7, 8) |
| |         In case of SFN = 8, 2-bit LSB of radio frame number within 40 ms (1, 2, 3, 4) |
| |         In case of SFN = 9, 1-bit LSB of radio frame number within 20 ms (1, 2) |
| |         In case of SFN = 10, 0-bit LSB |
| | Beam non-common configuration for beam sweeping |
| |     SS-block index per burst set: localized SS block index within a burst set |
| |     Or SS-block index per burst: localized SS block index within a burst or the starting symbol index of each SS-block |
| |     SS burst index per SS burst set |
| |     Half frame index per radio frame (e.g. first or second 5 ms within a radio frame) |
| | TRS non-common configuration (5~10 bits) including |
| |     TRS resource configuration (if non-common) |
| Need for blind detection | NO |
| Reliability | High |
| | Common and non-common information are protected by separate CRC with different low effective code rate |

In some embodiments, NR-PBCH indicates part of the minimum system information (MIB) and the RMSI is carried in the PDSCH, where the RMSI transmission configuration is to use the control resource set, e.g., PDCCH, to indicate the scheduling information of the PDSCH. The NR-PBCH indicate UEs where to find the control resource set. After detecting the PDCCH, the UEs can get the RMSI in the scheduled PDSCH. For example, the UEs in LTE search the PDCCH with a special System Information RNTI (SI-RNTI) to get the scheduling information of the PDSCH.

The scheduling information of scheduled PDSCH may change due to the variable SI payload size due to some optional fields. To avoid the NR-PBCH contents change frequently, the configuration for the control resource set, such as PDCCH, is included in NR-PBCH instead of that of scheduled PDSCH. It is more easer for the coherent combining at the receiver side. The configuration for the control resource set include the frequency resource configuration, e.g., bandwidth, subband, etc. and time resource configuration, e.g., periodicity, time offset, number of symbols, etc. Different from TABLE 3, NR-PBCH contents in the aforementioned embodiments include the configuration of the control resource set for the RMSI transmission but do not include TRS configuration and/or DC offset configuration or only partial TRS configuration, such as SFN, configuration of control resource set for the RMSI transmission: frequency resource configuration for control resource set; and time resource configuration for control resource set, beam Common configuration for beam sweeping, partial Tracking RS configuration (such as on/off, 1 antenna port, default periodicity, frequency density, time density, time offset), other reserved bits, and CRC.

Besides the scheduling information for the scheduled PDSCH, e.g., periodicity, time offset, subband location, resource block position, etc., which is used for UEs to find the RMSI (similar to the SIB 1 and SIB2 in LTE specification), the control resource set may also include TRS configuration and DC offset configuration (if configurable), such as configuration or partial configuration for RMSI in PDSCH: frequency resource configuration for the scheduled PDSCH; time resource configuration for the scheduled PDSCH; transport block size (TBS), MCS, etc.; and numerology of subcarrier spacing, CP length, etc., remaining Tracking RS configuration (such as tx power/power boosting, configurable ant port if more than 1, configurable periodicity, QCL mapping of antenna ports or NR-SS blocks, etc.), and DC offset configuration (if configurable)

In some embodiments, NR-PBCH indicates the part of minimum system information (MIB) and the scheduling information for the RMSI in PDSCH. The UEs directly find the scheduled PDSCH based on the indication in NR-PBCH for RMSI transmission. Different from TABLE 3, NR-PBCH contents in the aforementioned embodiments include the configuration of the PDSCH for the RMSI transmission but do not include TRS configuration and/or DC offset configuration or only partial TRS configuration, such as SFN, configuration of the PDSCH for the RMSI transmission: frequency resource configuration for the scheduled PDSCH; time resource configuration for the scheduled PDSCH; transport block size (TBS), MCS, etc. for the scheduled PDSCH; and numerology of subcarrier spacing, CP length, etc. for the scheduled PDSCH, beam Common configuration for beam sweeping, partial Tracking RS configuration (such as on/off, 1 antenna port, default periodicity, frequency density, time density, time offset), other reserved bits, and CRC. In such embodiments, the configuration parameters of the PDSCH for the RMSI transmission are the scheduling information for UEs to find and detect the RMSI in there. Therefore, the scheduled PDSCH include RMSI or partial RMSI, remaining Tracking RS configuration (such as tx power/power boosting, configurable ant port if more than 1, configurable periodicity, QCL mapping of antenna ports or NR-SS blocks, etc.), and DC offset configuration (if configurable).

In some embodiments, NR-PBCH indicates the part of the minimum system information (MIB) and the configuration for PDSCH for RMSI. The UEs directly find the PDSCH based on the indication in NR-PBCH. Different from TABLE 3, NR-PBCH contents in the aforementioned embodiments include the configuration of the PDSCH for the RMSI transmission but do not include TRS configuration and/or DC offset configuration or only partial TRS configuration, such as SFN, configuration of the PDSCH or (secondary PBCH) for RMSI transmission: frequency resource configuration for the PDSCH; time resource configuration for the PDSCH; transport block size (TBS), MCS, etc. for the PDSCH; and numerology of subcarrier spacing, CP length, etc. for the PDSCH, beam Common configuration for beam sweeping, partial Tracking RS configuration (such as on/off, 1 antenna port, default periodicity, frequency density, time density, time offset), other reserved bits, and CRC. In such embodiments, the configuration parameters for secondary PBCH or PDSCH are the scheduling information for UEs to find RSMI in there. The secondary PBCH or PDSCH may have similar numerology as PBCH but with different periodicity and/or resource allocation. The secondary physical broadcast channel contents include RMSI or partial RMSI, remaining Tracking RS configuration (such as tx power/power boosting, configurable ant port if more than 1, configurable periodicity, QCL mapping of antenna ports or NR-SS blocks, etc.), and DC offset configuration (if configurable).

Note that some of the parameters or combinations can be implicitly indicated or fixed to save the signaling overhead in MIB and/or SIB(s). As an illustration, the time resource configuration for MIB in PBCH and/or SIB(s) of RMSI may be fixed or pre-defined, such as periodicity, time offset, and/or number of symbols. Also note that in the above embodiments and sub-embodiments, the Tracking RS configuration and DC offset configuration (if configurable) can be combined together by using the pre-defined pattern. Also note that in the above embodiments and sub-embodiments, the Tracking RS configuration, if not indicated in MIB or RMSI, can be indicated in RRC signals carried in PDSCH.

Regarding the configuration of SS blocks, a sub-embodiment is to semi-statically indicate the UE-specific configuration of the actual transmission of the SS blocks in a SS burst set by RRC signaling, where the configuration of actually transmitted NR-SS blocks may contain the start/end of the NR-SS block indices for UE monitoring, or multiple sets of the start/end of the NR-SS block indices for UE monitoring, or the start of NR-SS block index plus the duration and/or the number of the NR-SS blocks for UE monitoring, or sets of the start of NR-SS block index plus the duration and/or the number of the NR-SS blocks for UE monitoring. For example, for above 6 GHz, there are max 64 NR-SS blocks so that the gNB can indicate at most 6-bit start index of the NR-SS block and at most 6-bit end index of the NR-SS block. In case that some NR-SS block is switched off during the indicated window(s) for UE monitoring (e.g. the window(s) can be the NR-SS blocks between the start and end block indices), bits in DCI can be used for indication if the UE's PDSCH is scheduled to be multiplexed with the NR-SS block symbols (for example, 1 or 2 bits DCI). With such information, the users can do rate matching of PDSCH if NR-SS block(s) are overlapped with allocated PDSCH resources and/or make use of remaining slots/symbols to detect control/data signals in the DL subframe including DL NR-SS block(s).

Another sub-embodiment is to semi-statically indicate part of the UE-specific configuration of the actual transmission of the SS blocks in a SS burst set by RRC signaling. The NR-SS blocks transmission may have strong RSRP (e.g. RSRP is larger than a threshold, where the threshold can be either fixed, predefined, or configurable), then the rate matching is carried out for the PDSCH transmission when the allocated resources for PDSCH is overlapped or partially overlapped with SS block(s).

Another sub-embodiment is to dynamically indicate the UE-specific configuration of the actual transmission of the SS blocks in a SS burst set or part of the configuration in PDCCH. For example, 1 bit or more than 1 bits in DCI to indicate whether the one or several SS block(s) are present or absent in the allocated resources of a UE's PDSCH. If the corresponding bit is set as "1," the UE may carry out the rate matching on the symbol(s) which there are PSS, SSS, and/or PBCH to receive the PDSCH when SS block resources are overlapped or partially overlapped with PDSCH bandwidth. If the corresponding bit is set as "0," the UE does not need to carry out the rate matching on the symbol(s) to receive the PDSCH since the SS block resources are not overlapped with PDSCH bandwidth.

Another sub-embodiment is that the actually transmitted (active/de-active) NR-SS block configuration is transparent to UE. The scheduling can try to avoid the rate matching of the PDSCH by non-overlapping or partially overlapping with the NR-SS blocks.

Another possibility is to explicitly indicate partial SFN and implicitly indicate the remaining bits of SFN. The implicit scheme include using different scrambling sequences, and/or rate matching with different redundant versions (RVs), and/or the different CRC masks for the PBCH in each SFN within PBCH TTI. For example, assuming PBCH TTI is 80 ms, the 7-bit MSB of SFN is indicated in PBCH payload. The remaining 3-bit LSB is implicitly indicated by using scrambling sequences.

Alternative one is to prepare a long scrambling sequence with same length of 8*(Number of PBCH coded bits per NR-SS block). The 8 segments of the long scrambling sequence are used to multiplex with the PBCH payload with length of (Number of PBCH coded bits per NR-SS block), sent at {0, 10, 20, 30, 40, 50, 60, 70 ms} within PBCH TTI of 80 ms, respectively. Therefore, each cell has one long scrambling sequences for PBCH.

Alternative two is to generate 8 short scrambling sequences are generated with length of (Number of PBCH coded bits per NR-SS block) and pre-allocated for each PBCH payload in each subframe. Therefore, each cell has a group of 8 short scrambling sequences. The short scrambling sequences can be generated based on the same cell-specific base sequence but use different cyclic shifts and/or different cover codes on top of the base sequence to keep their orthogonality. The cyclic shifts and/or cover codes are subframe-specific. For sake of simplicity, the cover codes could be orthogonal OCC codes, etc.

Alternative three is to generate a pair of long scrambling sequences with length of 4*(Number of PBCH coded bits per NR-SS block). The 4 segments of one long scrambling sequence are used to multiplex with the PBCH payload with length of (Number of PBCH coded bits per NR-SS block), sent at {0, 20, 40, 60 ms} within PBCH TTI of 80 ms, respectively. The 4 segments of another long scrambling sequence are used to multiplex with the PBCH payload with length of (number of PBCH coded bits per NR-SS block), sent at {10, 30, 50, 70 ms} within PBCH TTI of 80 ms, respectively. Therefore, each cell has a pair of long scrambling sequences for PBCH. The two scrambling sequences can be based on the same cell-specific base sequence but use different cyclic shifts and/or different cover codes on top of the base sequence to keep their orthogonality. The cyclic shifts and/or cover codes are subframe-group-specific. For sake of simplicity, the cover codes could be orthogonal OCC codes, etc.

In NR, let's assume we have PBCH payload of 64 bits. After Polar coding and rate matching, we could have 768 bits. With 8 times repetition, the 768*8 bits are scrambled by using Alt1 long scrambling sequence with length of 768*8. The QPSK-modulated 384*8 symbols are segmented into 8 RVs with each RV has self-decodable 384 symbols. Each RV can be mapped into the 384 REs in the 2 NR-PBCH symbols excluding the DMRS REs with 1/3 overhead. Each segment of scrambling sequences to identify the 3-bit LSB of SFN.

Alternatively, the 768 bits are directly scrambled by using Alt2 8 short scrambling sequences with length of 768. In case of Alt2, the 8 short scrambling sequences is pre-defined to differentiate SFN {0, 10, 20, 30, 40, 50, 60, 70 ms} within PBCH TTI of 80 ms. The QPSK-modulated 384 symbols have self-decodable 384 symbols, mapped into the 384 REs in the 2 NR-PBCH symbols excluding the DMRS REs with 1/3 overhead. Each short scrambling sequence is to identify the 3-bit LSB of SFN.

Alternatively, with 4 times repetition, the 768*4 bits are scrambled by using Alt3 a pair of long scrambling sequences with length of 768*4. In case of Alt3, the pair of long scrambling sequences is pre-defined to differentiate two groups of SFN {0, 20, 40, 60 ms} and {10, 30, 50, 70 ms} within PBCH TTI of 80 ms. The QPSK-modulated 384*4 symbols are segmented into 4 RVs with each RV has self-decodable 384 symbols. Each RV can be mapped into the 384 REs in the 2 NR-PBCH symbols excluding the DMRS REs with 1/3 overhead. Each segment of scrambling sequence is to identify the 2-bit LSB of SFN. The remaining 1-bit SFN is differentiated by a pair of scrambling sequences.

Figure 17:
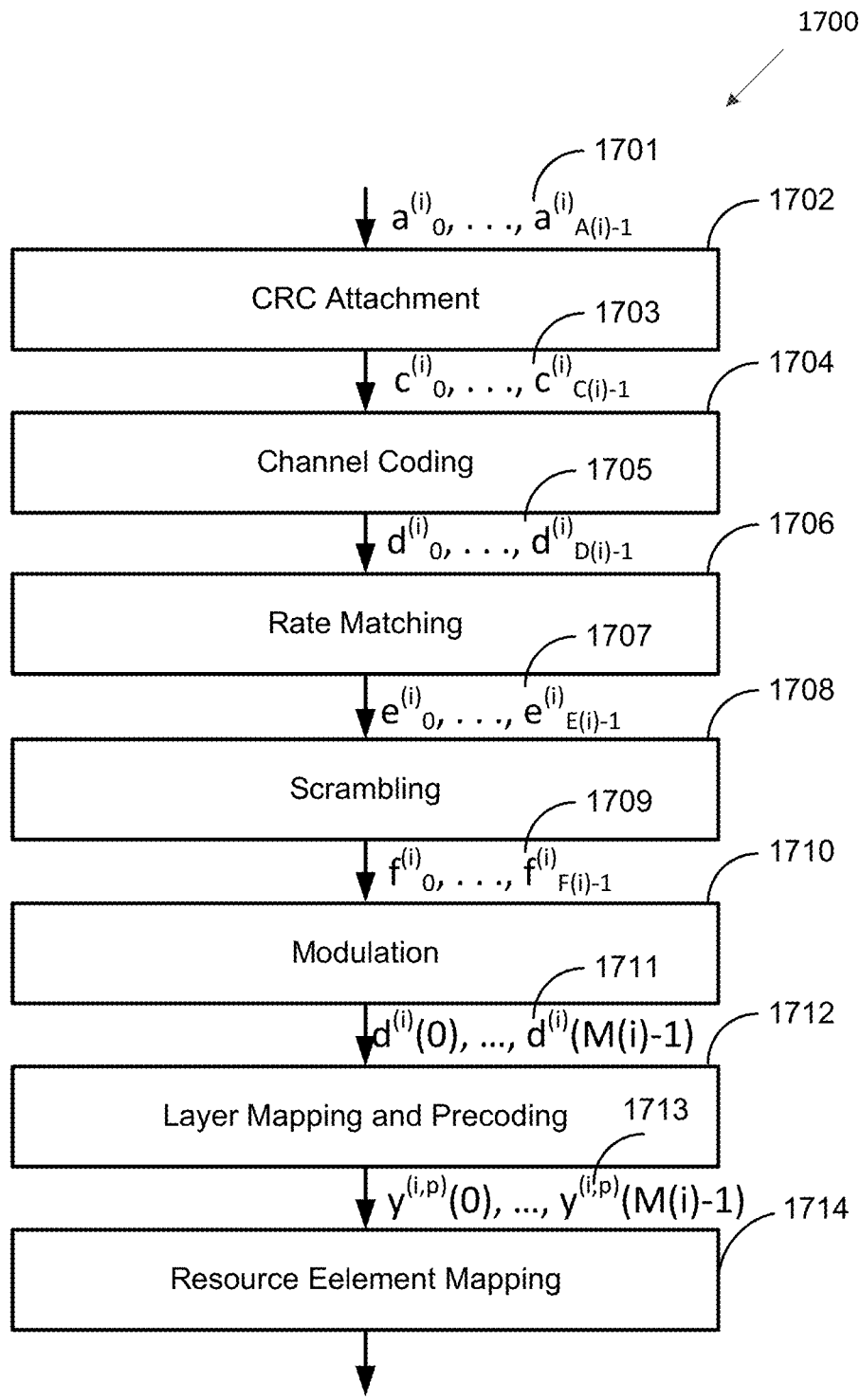
FIG. 17 illustrates a flow chart of a method for NR-PBCH construction according to embodiments of the present disclosure.

FIG. 17 illustrates a flow chart of a method for NR-PBCH construction 1700 according to embodiments of the present disclosure. The embodiment of the method for NR-PBCH construction 1700 illustrated in FIG. 17 is for illustration only. FIG. 17 does not limit the scope of this disclosure to any particular implementation.

General steps for construction of NR-PBCH are shown in FIG. 17. Note that modules or part of the functionalities within the modules in the flow chart can be set as default values such that they do not have any impact.

The payload of NR-PBCH contents $a_0^{(i)}, \ldots, a_{A(i)-1}^{(i)}$ 1701 as shown in FIG. 17 can be divided into at most two parts. In one embodiment, the NR-PBCH contents only have common information, then i=1 and A(1) is the size of all common bits. In another embodiment, the NR-PBCH contents have both common and non-common information, then i=1,2 and A(i) is the size of common bits and non-common bits correspondingly. Note that A(1) and A(2) may not be the same. Also note that A(1) (e.g. A(1) represents for the common information bits) can be different for different carrier frequency range, and A (2) (e.g. A(2) represents for the uncommon information bits) can be different for different carrier frequency range. For example, the value of A(2) for carrier frequency range 0 to 6 GHz can be smaller than the value of A(2) for carrier frequency range 6 to 60 GHz.

In CRC attachment module at step 1702, the entire transport block(s) are used to calculate the CRC parity bits, and the generated parity bits are denoted as $p_0^{(i)}, \ldots, (p)_{L(i)-1}^{(i)}$. $L^{(i)}$ is the length of parity check bits, or equivalently the length of CRC, for each codeword. If there are multiple codewords to be encoded (i>1), the value L(i) can be the same or different for each codeword. For instance, L(i) can equal to 0 (no CRC attachment), or 4, or 8, or 16, or 24, and chosen independently for each codeword. For one example, L(1)=8 and L(2)=0.

Figure 18:
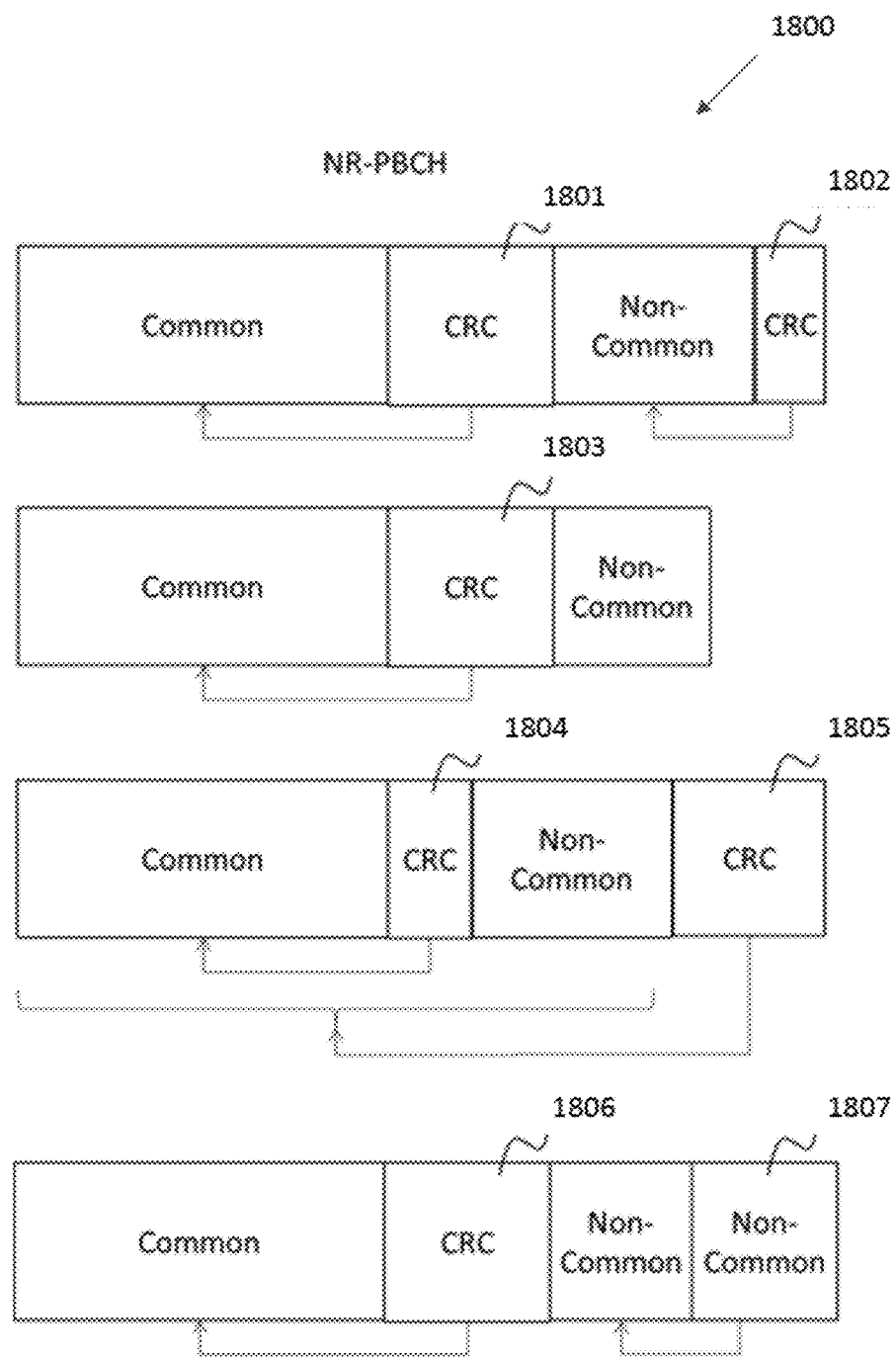
FIG. 18 illustrates an example frame structure according to embodiments of the present disclosure.

FIG. 18 illustrates an example frame structure 1800 according to embodiments of the present disclosure. The embodiment of the frame structure 1800 illustrated in FIG. 18 is for illustration only. FIG. 18 does not limit the scope of this disclosure to any particular implementation.

As illustrated in FIG. 18, in one embodiment, the common information of PBCH may use longer CRC 1801 for error detection (e.g., 16-bit CRC same as that in LTE); while the non-common information of PBCH with less number of bits may use short CRC 1802 (e.g., 4-bit CRC). In another embodiment, only one CRC 1803 is used to protect common information but no CRC is applied to non-common information. In another embodiment, a short CRC 1804 (note that can be 0-bit CRC, which is effective as no CRC) is generated by common information and a long CRC 1805 is jointly generated by common and non-common information. A special case is to use repeated non-common information as its own CRC as illustrated in 1807, where the receiver may further improve the robustness of short non-common information based on soft-combining for each radio frame or each SS-block. The motivation of using separate codewords for common and non-common information of PBCH is to enable flexible reception with coherent combining of multiple SS-blocks or multiple radio frames and fast identification of PBCH per SS-block or per radio frame with less complexity of user blind detection.

After the generation of CRC bits, a CRC mask $x_0^{(i)}, \ldots, x_{L(i)-1}^{(i)}$ can be utilized to scramble the CRC sequence according to the gNB transmit antenna configuration. The output from scrambling is given by $c_0^{(i)}, \ldots, c_{K(i)-1}^{(i)}$ 1703 as shown in FIG. 17, where $c_k^{(i)} = a_k^{(i)}$ for k=0, A(i)−1, and $c_k = (p_{k-A(i)}^{(i)} + x_{k-A(i)}^{(i)})$ mod 2 for k=A(i), ..., A(i)+L(i)−1. Note that by choosing $x_l^{(i)} = 0$ for all $0 \le l \le L(i)-1$, the scrambling procedure has no impact to the CRC bits. In one embodiment, the choice of CRC mask can be the same as the one for NR-PBCH for a particular number of transmit antenna ports. In another embodiment, there can be no CRC mask sequence utilized if the number of transmit antenna ports for NR-PBCH is predefined/fixed and known to UE.

The information bits input to the channel coding module at step 1704 as shown in FIG. 17 are denoted by $c_0^{(i)}, \ldots, c_{K(i)-1}^{(i)}$, where C(i)=A(i)+L(i) denotes the number of information bits to be encoded for codeword i. Channel coding codes can be utilized on the information bits to generate the encoded codeword(s) $d_0^{(i)}, \ldots, d_{D(i)-1}^{(i)}$ 1705 as shown in FIG. 17. One or multiple of the channel coding schemes can be utilized for this module. Note that if there are multiple codewords to be encoded (i>1), the channel coding scheme can be the same or different for each codeword. Note that the encoded length D(1) (e.g. D(1) represents for the encoded length of common information bits) can be different for different carrier frequency range, and D (2) (e.g. D (1) represents for the encoded length of uncommon information bits) can be different for different carrier frequency range.

For example, the value of D (2) for carrier frequency range 0 to 6 GHz can be smaller than the value of D(2) for carrier frequency range 6 to 60 GHz. Also note that if the message bits and encoded length for different carrier frequency are different, channel coding schemes can also be different for different carrier frequency. In one example, Reed-Muller (RM) codes can be utilized to generate the encoded codeword, where D(i)>C(i) and C(i)/D(i) is the rate of RM codes. In another example, tail biting convolutional codes (TBCC) can be utilized to generate the encoded codeword, where D(i)=C(i) and three streams of codes are output by the rate-1/3 TBCC encoder (encoded codewords can be denoted as $d_0^{(i,s)}, \ldots, d_{D(i)-1}^{(i,s)}$ where s=0,1,2). In yet another example, low-density parity-check (LDPC) codes can be utilized to generate the encoded codeword, where D(i)>C(i) and C(i)/D(i) is the rate of LDPC codes. In yet another example, polar codes can be utilized to generate the encoded codeword, where D(i)>C(i) and C(i)/D(i) is the rate of polar codes. In yet another example, Turbo codes can be utilized to generate the encoded codeword, where D(i)=C(i) and three streams of codes are output by the rate-1/3 Turbo encoder (encoded codewords can be denoted as $d_0^{(i,s)}, \ldots, d_{D(i)-1}^{(i,s)}$ where s=0,1,2).

The encoded codeword(s) are delivered to the rate matching module (1306 in FIG. 13). $d_0^{(i)}, \ldots, d_{D(i)-1}^{(i)}, \ldots,$ or $d_0^{(i,s)}, \ldots, d_{D(i)-1}^{(i,s)}$ are repeated and/or truncated to construct a sequence with desired length. Then, interleaving (without using cell ID to generate the interleaving index sequence) is performed if desired to generate the output sequence $e_0, \ldots, e_{E-1}$ or $e_0^{(i)}, \ldots, e_{E(i)-1}^{(i)}$ depending on whether multiple codewords are combined in this module 1707 as shown in FIG. 17. Note that the interleaving index sequence can be constructed such that no effect of interleaving is performed (equivalent as no interleaving). In one embodiment, if multiple codewords are encoded from previous modules, they can be combined and rate matched and interleaved together. In another embodiment, if multiple codewords are encoded from previous modules, they can be rate matched and interleaved separately.

The block of bits $e_0, \ldots, e_{E-1}$ or $e_0^{(i)}, \ldots, e_{E(i)-1}^{(i)}$ (depending on whether multiple codewords are combined in channel coding module) are scrambled with a cell-specific sequence prior to modulation 1708 as shown in FIG. 17, resulting in a block of scrambled bits $f_0, \ldots, f_{F-1}$ or $f_0^{(i)}, \ldots, f_{F(i)-1}^{(i)}$ (depending on whether multiple codewords are combined in channel coding module).

The block of bits $f_0, \ldots, f_{F-1}$ or $f_0^{(i)}, \ldots, f_{F(i)-1}^{(i)}$ (depending on whether multiple codewords are combined in channel coding module) are modulated 1710 as shown in FIG. 17, resulting in a block of complex-valued modulation symbols $d(0), \ldots, d(M-1)$ or $d^{(i)}(0), \ldots, d^{(i)}(M(i)-1)$ depending on whether multiple codewords are combined in channel coding module 1711 as shown in FIG. 17, where M or M(i) is the number of symbols. If multiple codewords are not combined, they can be modulated separately using the same or different modulation schemes. For one example, the modulation scheme for NR-SSS can be BPSK. For another example, the modulation scheme for NR-SSS can be QPSK. For yet another example, the modulation scheme for NR-SSS can be M-FSK. For still another example, the modulation scheme for NR-SSS can be OOK.

The block of modulation symbols may be mapped to layers and precoded 1712 as shown in FIG. 17, resulting in a block of vectors $y^{(p)}(0), \ldots, y^{(p)}(M-1)$ or $y^{(i,p)}(0), \ldots, y^{(i,p)}(M(i)-1)$, where $0 \le p \le P-1$ and P is the number of ports for NR-SSS transmission 1713 as shown in FIG. 17. If multiple codewords are generated from previous modules and not combined until this module, they can be combined first in this module and then be mapped to layers and precoded jointly, or can be mapped to layers and precoded separately. In one embodiment, the number of layer is set to 1 and precoding matric is an identity matrix (equivalent as no layer mapping or precoding, and the input and output of this module are identical). In another embodiment, the method for layer mapping and precoding can be according to the method for layer mapping and precoding in LTE specification.

In yet another embodiment, if NR-SSS and NR-PBCH are jointly coded, the method for layer mapping and precoding can be the same as the ones for NR-PBCH. The block of complex-valued symbols $y^{(p)}(0), \ldots, y^{(p)}(M-1)$ or $y^{(i,p)}(0), \ldots, y^{(i,p)}(M(i)-1)$, for each antenna port p is mapped to the M resource elements available for NR-SSS transmission 1714 as shown in FIG. 17. If multiple streams of symbols are generated from the preceding module, they are combined in this module before mapping. In one embodiment, the mapping to the resource elements (j, k) may be in the increasing order of first the index j, then the index k in slot 1 in subframe 0 and finally the radio frame number. In another embodiment, multiple codewords (e.g. two codewords carrying common and uncommon information correspondingly) are mapped separately to consecutive REs in frequency domain (For example, 1901, 1902 and 1903, which corresponds to different frequency multiplexing locations and different multiplexing for different PBCH symbols, as shown in FIG. 19).

Figure 19:
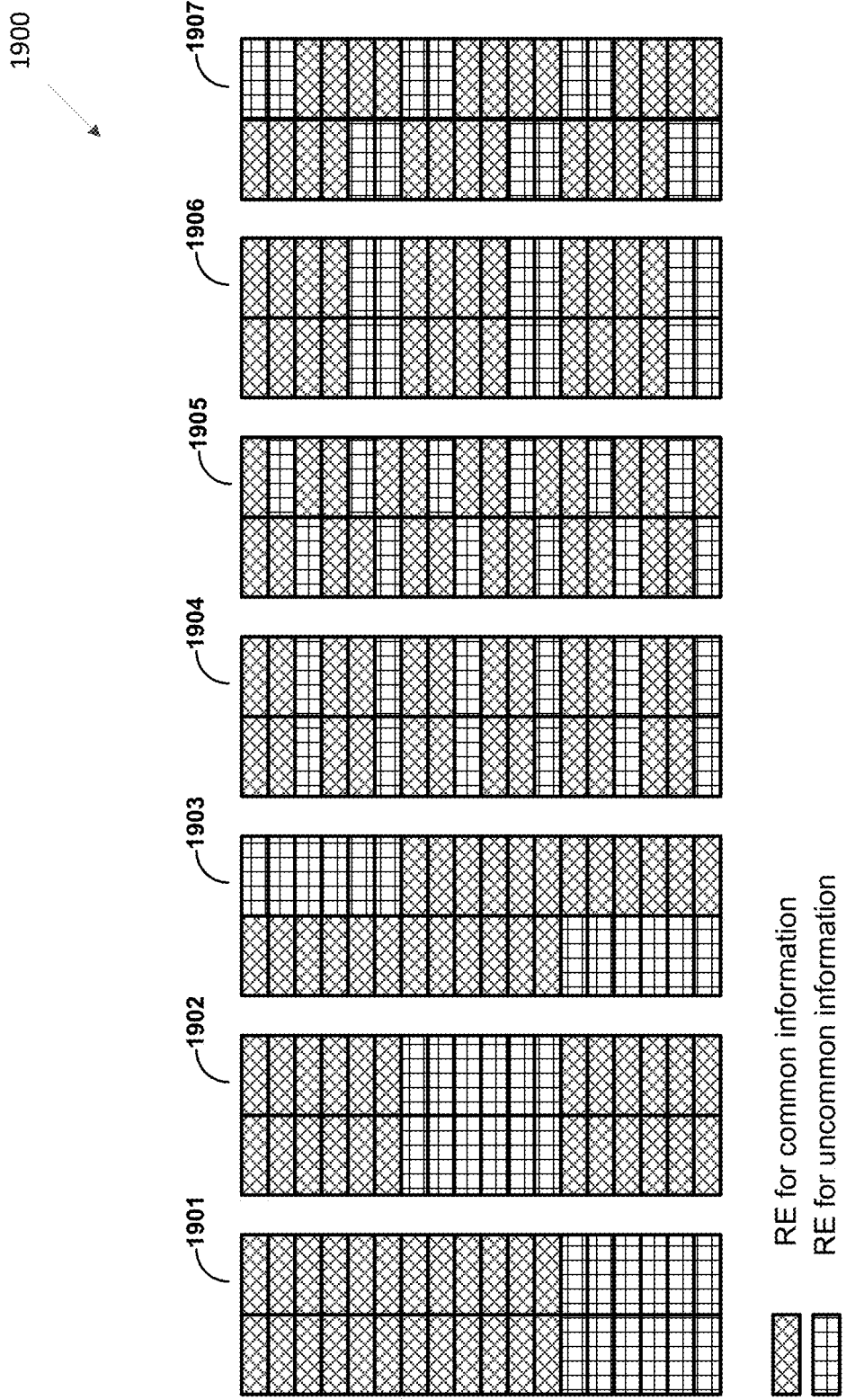
FIG. 19 illustrates an example RE for common and uncommon information according to embodiments of the present disclosure.

FIG. 19 illustrates an example RE for common and uncommon information 1900 according to embodiments of the present disclosure. The embodiment of the RE for common and uncommon information 1900 illustrated in FIG. 19 is for illustration only. FIG. 19 does not limit the scope of this disclosure to any particular implementation.

In yet another embodiment, multiple codewords (e.g. two codewords carrying common and uncommon information correspondingly) are IFDMed mapped with each other (e.g. each of the codewords is mapped to interleaved REs in frequency domain) (e.g., 1904 and 1905, which corresponds to same and different IFDM pattern for different PBCH symbols, as shown in FIG. 19). In yet another embodiment, multiple codewords (e.g. two codewords carrying common and uncommon information correspondingly) are block IFDMed mapped with each other (e.g. each of the codewords is mapped to interleaved blocks of REs in frequency domain) (e.g., 1906 and 1907, which corresponds to same and different block IFDM pattern for different PBCH symbols).

Note that FIG. 19 is only for illustration purpose, and the same design can be generalized to different number of symbols and different number of REs within a symbol. Also note that if multiple OFDM symbols are used for PBCH, the multiplexing method of REs for common and uncommon information can be same or different across symbols. In one embodiment, if DMRS is also supported for demodulation of PBCH, REs for uncommon information can be IFDM or block IFDM mapped using same or similar pattern as DMRS. For example, if payload of DMRS and REs for uncommon information are same, RE for uncommon information is mapped neighboring to RE for DMRS. For another example, if payload of DMRS is higher than REs for uncommon information, RE for uncommon information is mapped neighboring to every K REs for DMRS (where K is the multiple difference of payload of DMRS and REs for uncommon information). For yet another example, if payload of DMRS is lower than REs for uncommon information, group of K REs for uncommon information is mapped neighboring to RE for DMRS (where K is the multiple difference of REs for uncommon information and payload of DMRS).

In case of beam sweeping in the aforementioned embodiments and the related sub-embodiments, let's assume there are limited number K (with K>1) of SS blocks per SS burst and the limited number M of SS bursts illustrated in FIG. 15. Each SS block comprises N OFDM symbols based on the default subcarrier spacing and pre-defined N. And the SS block has the fixed relative position within a SS burst set. Therefore, the UE may be able to identify at least OFDM symbol index, slot index in a radio frame and radio frame number from an SS block. The time index/indices of an SS block from which UE may derive symbol, slot index in a radio frame is/are to be down-selected from the following alternatives.

In one example of Alt. 1, one time index for every SS-block within an SS-burst set, e.g., the SS block indices are $\{i=1 \ldots K*M\}$. One sub-embodiment to indicate the SS block indices $\{i=1 \ldots K*M\}$ is to utilize different NR-SSS/NR-PBCH multiplexing patterns. For example, as shown in FIG. 16, if there are the three symbols of IFDMed NR-SSS/NR-PBCH within N-symbol SS block, the three types of multiplexing patterns as {1601a, 1601b and 1601c} are used to indicate 3 adjacent SS block indices or 3 distributed SS block indices. Another example, if there are the one or two symbols of IFDMed NR-SSS/NR-PBCH within the N-symbol SS block, the two types of multiplexing patterns as {1602a, 1602b}, {1603a, 1603b}, or {1604a, 1604b} are used to indicate 2 adjacent SS block indices or 2 distributed SS block indices.

Another sub-embodiment is to use the K*M scrambling sequences to differentiate the K*M SS block indices. The scrambling sequences are orthogonal or non-orthogonal but low-correlated sequences, e.g., Zadoff-Chu sequences, m-sequences, Gold sequences or PN-sequence. At the transmitter side, a scrambling sequence, defined to identify one SS block index individually, is used to scramble the NR-PBCH resource elements; and at the receiver side, only if the UE use the same scrambling sequence to detect the NR-PBCH, it can pass the CRC detection and therefore the UE can find the corresponding SS block index.

Another sub-embodiment is to use the CRC and inverse CRC to differentiate the 2 adjacent SS block indices or 2 distributed SS block indices. Another sub-embodiment is to combine the CRC/inverse CRC, and/or scrambling sequences, and/or the NR-SSS/NR-PBCH multiplexing patterns to jointly indicate the SS block indices within a burst set.

In one example of Alt. 2, one time index that is specific to each SS-block within an SS-burst, and an SS burst index that is specific to each SS burst within an SS-burst set. SS burst index is common across SS blocks in each SS-burst. The following SS burst index and SS block index per SS burst need to be indicated respectively: the SS burst indices are $\{m=1 \ldots M\}$; and the SS block indices per SS burst are $\{k=1 \ldots K\}$.

One sub-embodiment to indicate the SS burst indices $\{m=1 \ldots M\}$ is to utilize the following approaches. Within an SS burst, the SS block indices $\{k=1 \ldots K\}$ can be indicated in NR-PBCH explicitly or in SS sequence implicitly (e.g., partial PSS/SSS sequences, or separately defined sequence).

Figure 20A:
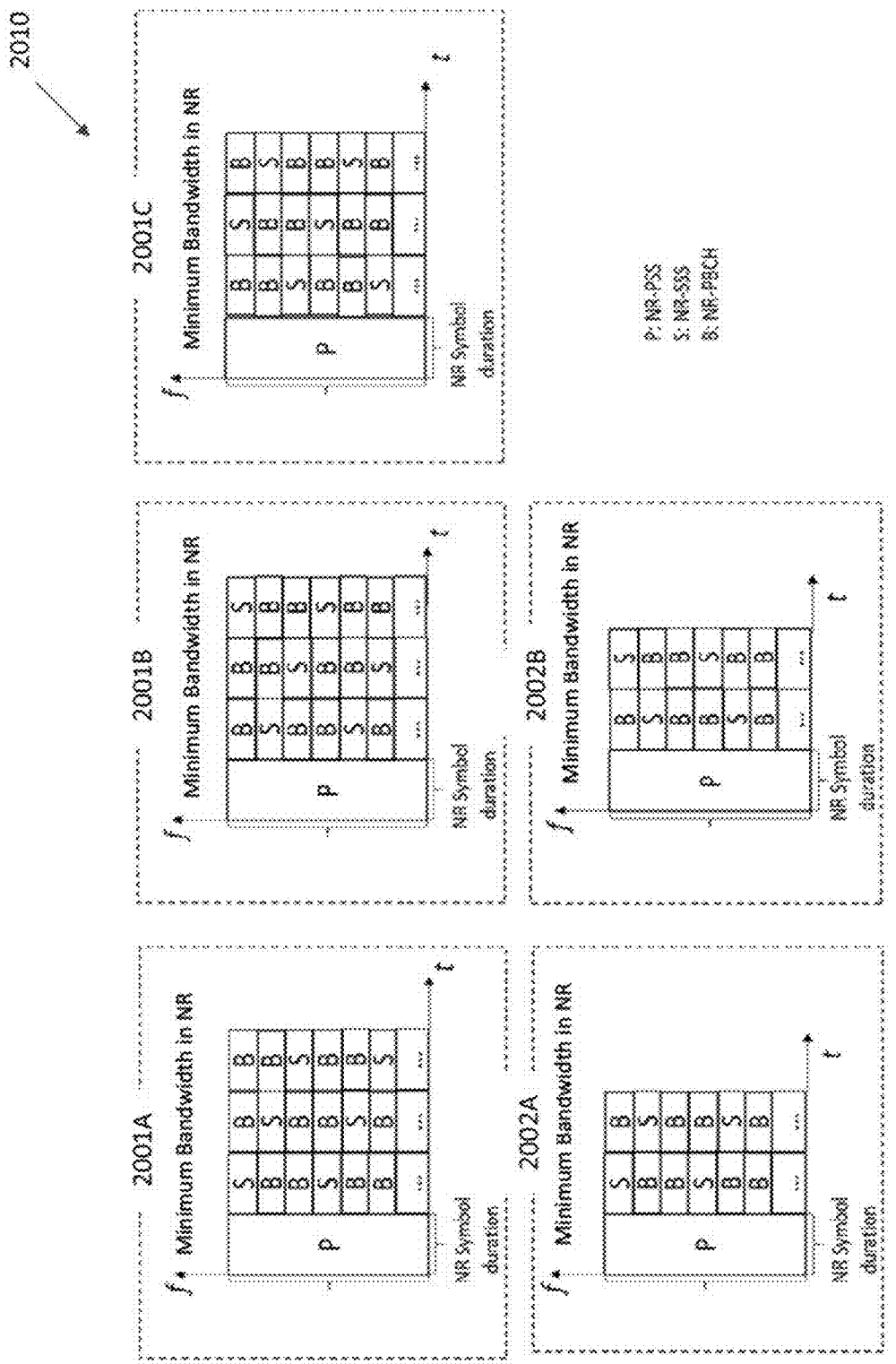
FIGS. 20A and 20B illustrate examples multiplexing patterns according to embodiments of the present disclosure.
Figure 20B:
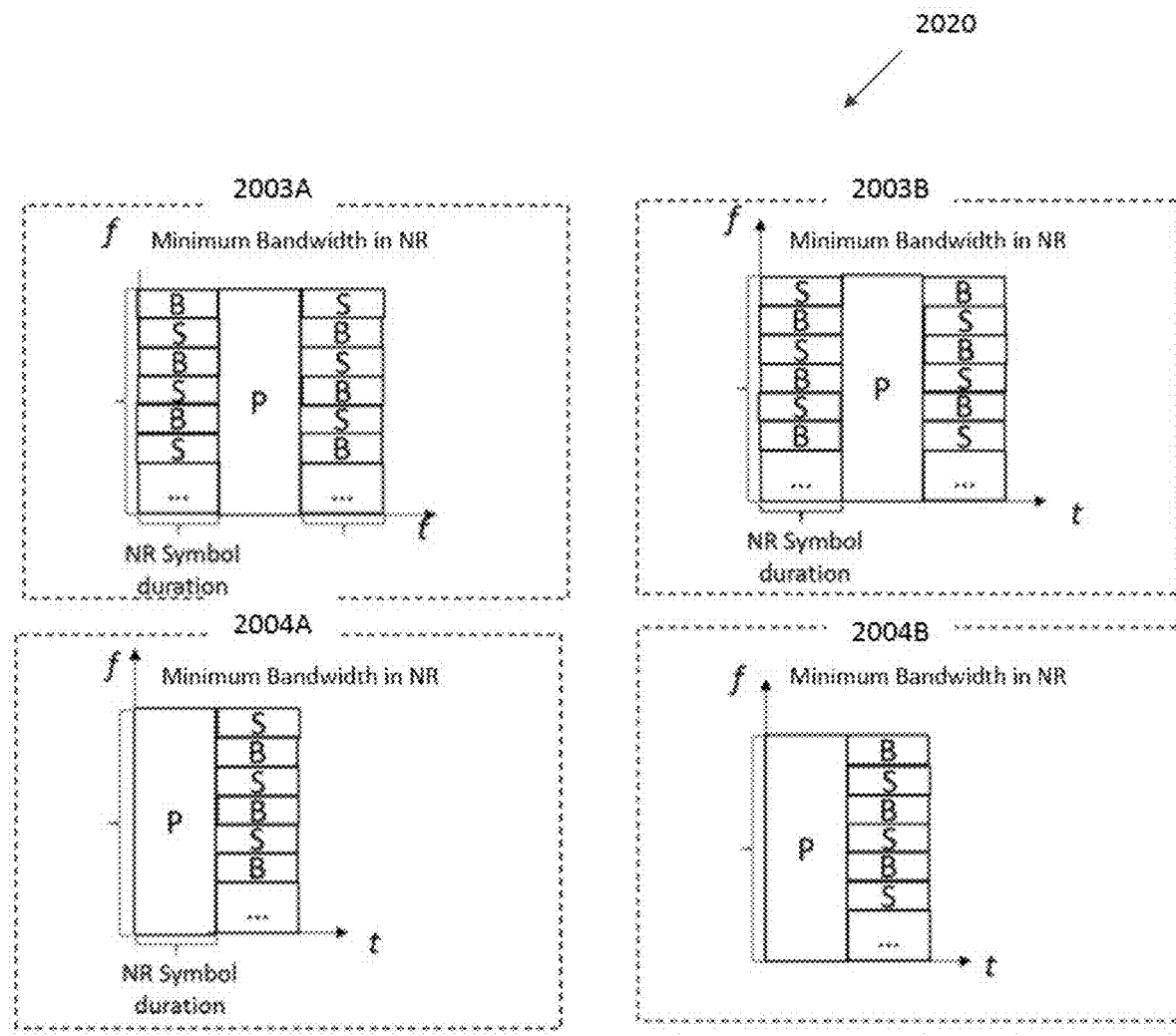

FIGS. 20A and 20B illustrate examples multiplexing patterns 2010 and 2020 according to embodiments of the present disclosure. The embodiment of the multiplexing patterns 2010 and 2020 illustrated in FIGS. 20A and 20B are for illustration only. FIGS. 20A and 20B do not limit the scope of this disclosure to any particular implementation.

One sub-embodiment is to use the M different NR-SSS/NR-PBCH multiplexing patterns. For example, as shown in FIGS. 20A and 20B, the three symbols of IFDMed NR-SSS/NR-PBCH and the three types of multiplexing patterns as {2001A, 2001B, and 2001C} are used to indicate M=3 SS burst indices. Another example, for M=2 SS bursts per SS burst set, the one or two symbols of IFDMed NR-SSS/NR-PBCH and the two types of multiplexing patterns as {2002A, 2002B}, {2003A, 2003B}, or {2004A, 2004B} are used to indicate M=2 SS burst indices.

Another sub-embodiment is to use the M scrambling sequences to differentiate the M SS burst indices. The scrambling sequences are orthogonal or non-orthogonal but low-correlated sequences, e.g., Zadoff-Chu sequences, m-sequences, Gold sequences or PN-sequences. At the transmitter side, a scrambling sequence, defined to identify one SS burst index individually, is used to scramble the NR-PBCH resource elements; and at the receiver side, only if the UE use the same scrambling sequence to detect the NR-PBCH, it can pass the CRC detection and therefore the UE can find the corresponding SS burst index.

Another sub-embodiment is to use the CRC and inverse CRC to differentiate the M=2 SS burst indices. Another sub-embodiment is to combine the CRC/inverse CRC, and/or scrambling sequences, and/or the NR-SSS/NR-PBCH multiplexing patterns to jointly indicate the SS burst indices.

Alternatively, the SS burst indices $\{m=1 \ldots M\}$ are indicated in NR-PBCH explicitly or in SS sequence implicitly (e.g., partial PSS/SSS sequences, or separately defined sequence). Within an SS burst, the SS block indices $\{k=1 \ldots K\}$ can be indicated by utilizing the following approaches. In one sub-embodiment of the different NR-SSS/NR-PBCH multiplexing patterns, for example, as shown in FIGS. 20A and 20B, the three symbols of IFDMed NR-SSS/NR-PBCH and the three types of multiplexing patterns as {2001A, 2001B, and 2001C} are used to indicate K=3 SS block indices. Another example, for K=2 SS blocks per SS burst, the one or two symbols of IFDMed NR-SSS/NR-PBCH and the two types of multiplexing patterns as {2002A, 2002B}, {2003A,2003B}, or {2004A, 2004B} are used to indicate K=2 SS block indices.

Another sub-embodiment is to use the K scrambling sequences to differentiate the K SS block indices. The scrambling sequences are orthogonal or non-orthogonal but low-correlated sequences, e.g., Zadoff-Chu sequences, m-sequences, Gold sequences or PN-sequence. At the transmitter side, a scrambling sequence, defined to identify one SS block index individually, is used to scramble the NR-PBCH resource elements; and at the receiver side, only if the UE use the same scrambling sequence to detect the NR-PBCH, it can pass the CRC detection and therefore the UE can find the corresponding SS block index.

Another sub-embodiment is to use the CRC and inverse CRC to differentiate the K=2 SS block indices. Another sub-embodiment is to combine the CRC/inverse CRC, and/or scrambling sequences, and/or the NR-SSS/NR-PBCH multiplexing patterns to jointly indicate the SS block indices.

Note that if there are multiple combinations of the part of the SS burst indices and/or SS block indices to be indicated, the CRC/inverse CRC, and/or scrambling sequences, and/or the NR-SSS/NR-PBCH multiplexing patterns can be utilized to indicate part of the combinations, and other signal(s) and/or channel(s) can be utilized to indicate the remaining combinations.

This component illustrates the details of polar codes based PBCH coding. Note that the design principles and design aspects for PBCH from all other components can be applied to this component as well, and the features that can only be applicable to polar codes based PBCH coding scheme are discussed in this component.

As described in the above, the information/hypotheses carried by PBCH can be categorized into common and uncommon parts, and one or two codewords can be utilized for PBCH to deliver these information/hypotheses. Here, polar codes based coding schemes are described.

Figure 21:
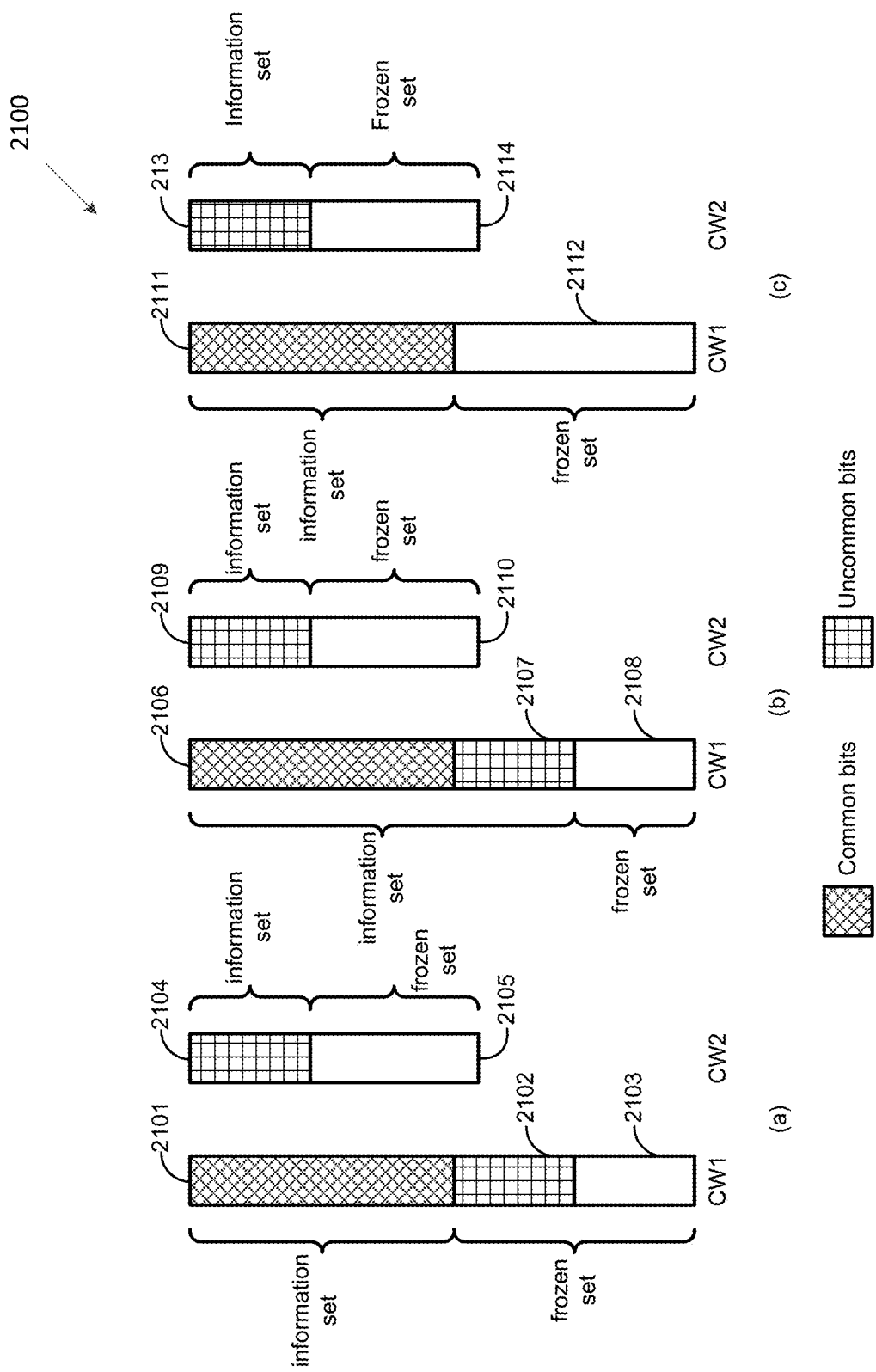
FIG. 21 illustrates an example two codewords for PBCH coding according to embodiments of the present disclosure.

FIG. 21 illustrates an example two codewords for PBCH coding 2100 according to embodiments of the present disclosure. The embodiment of the two codewords for PBCH coding 2100 illustrated in FIG. 21 is for illustration only. FIG. 21 does not limit the scope of this disclosure to any particular implementation.

In one embodiment of Alt 1, two codewords are utilized for PBCH coding as shown in FIG. 21. In one example of Alt 1a, information bits of the first codeword are common bits in PBCH MIB payload (2101), and frozen bits of the first codeword include both constant bits (2103, e.g. zeros) and uncommon bits in PBCH MIB payload (2102, or other forms including the uncommon bits, e.g. scrambling sequence for constant bits). Information bits of the second codeword are uncommon bits in PBCH MIB payload (2104), and frozen bits are constants (2105, e.g. zeros).

In another example of Alt 1b, information bits of the first codeword include common bits in PBCH MIB payload (2106) and uncommon bits in PBCH MIB payload (2107), and frozen bits of the first codeword are constant bits (1708, e.g. zeros). Information bits of the second codeword are uncommon bits in PBCH MIB payload (2109), and frozen bits are constants (2110, e.g. zeros).

In yet another example of Alt 1c, information bits of the first codeword are common bits in PBCH MIB payload (2111), and frozen bits of the first codeword are constant bits (2112, e.g. zeros). Information bits of the second codeword are uncommon bits in PBCH MIB payload (2113), and frozen bits are constants (2114, e.g. zeros).

Figure 22:
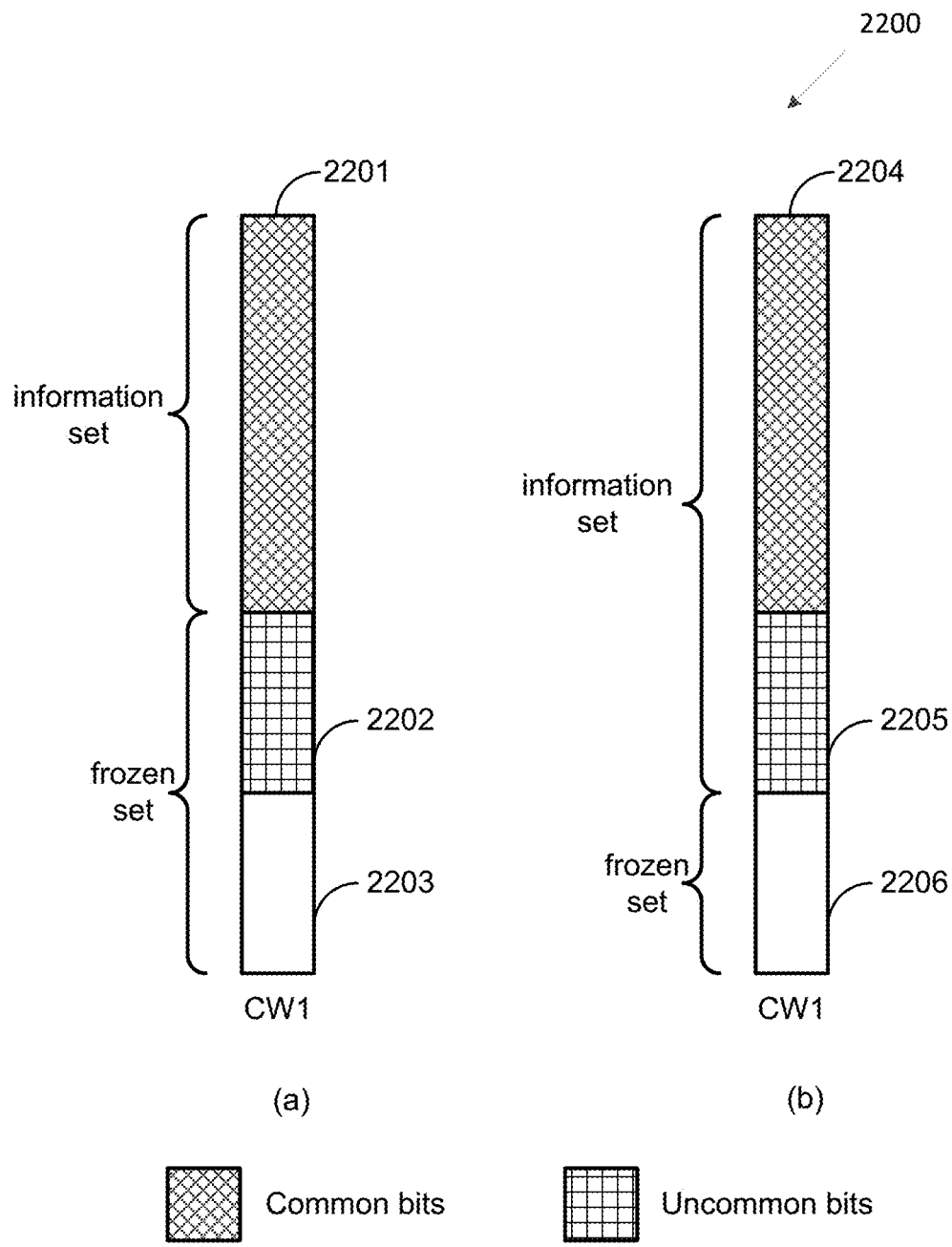
FIG. 22 illustrates an example one codeword for PBCH coding according to embodiments of the present disclosure.

FIG. 22 illustrates an example one codeword for PBCH coding 2200 according to embodiments of the present disclosure. The embodiment of the one codeword for PBCH coding 2200 illustrated in FIG. 22 is for illustration only. FIG. 22 does not limit the scope of this disclosure to any particular implementation.

In some embodiments of Alt 2, one codeword is utilized for PBCH coding as shown in FIG. 22. In one example of Alt 2a, information bits of the codeword are common bits in PBCH MIB payload (2201), and frozen bits of the first codeword include both constant bits (2203, e.g. zeros) and uncommon bits in PBCH MIB payload (2202, or other forms including the uncommon bits, e.g. scrambling sequence for constant bits).

In another example of Alt 1b, information bits of the first codeword include common bits in PBCH MIB payload (2204) and uncommon bits in PBCH MIB payload (2205), and frozen bits of the first codeword are constant bits (2206, e.g. zeros). In one embodiment for Alt 1, the two codewords can be encoded and rate matched to the same number of REs and mapped to two PBCH symbols. In another embodiment for Alt 1, the two codewords can be encoded using the same polar encoder (same generator matrix), but rate matched to different number of REs within the PBCH symbols (e.g. the number of REs for transmitting CW2 is smaller). In yet another embodiment for Alt 1, the two codewords can be encoded differently, and rate matched to different number of REs within the PBCH symbols (e.g. the number of REs for transmitting CW2 is smaller). In one sub-embodiment, the channel coding scheme of CW2 can be not using polar codes (in this case, there is no concept of information bits/set or frozen bits/set). For example, Reed-Muller codes can be utilized to encode CW2.

Note that FIG. 21 and FIG. 22 only illustrate the allocation of common and uncommon bits for polar codes before channel coding.

After the UE detects a synchronization signal (SS) and decodes the broadcasted system information, the UE may transmit a PRACH preamble in uplink based on the PRACH Configuration Index included in SIB2 would indicate at which frame and subframe that UE is allowed to transmit a physical random access channel (PRACH) Preamble as well as the PRACH preamble type, as defined in the 3GPP LTE specification. The transmission and reception point (TRP) replies with a random access response (RAR), and the UE transmits a message 3 in the uplink.

The PRACH occupies 6 PRBs in the frequency domain and spans 1 or 2 or 3 subframes in the time domain, depending on the specific preamble format. In the frequency domain, several subcarriers at both ends of the 6 PRBs are not used to avoid interference with the adjacent PUCCH/PUSCH. In the time domain, the cyclic prefix (CP) and guard time (GT) are used to avoid interference with the previous and next subframes. As it turns out, the GT determines the maximum cell radius. The Preamble format is defined in LTE specification.

Figure 23:
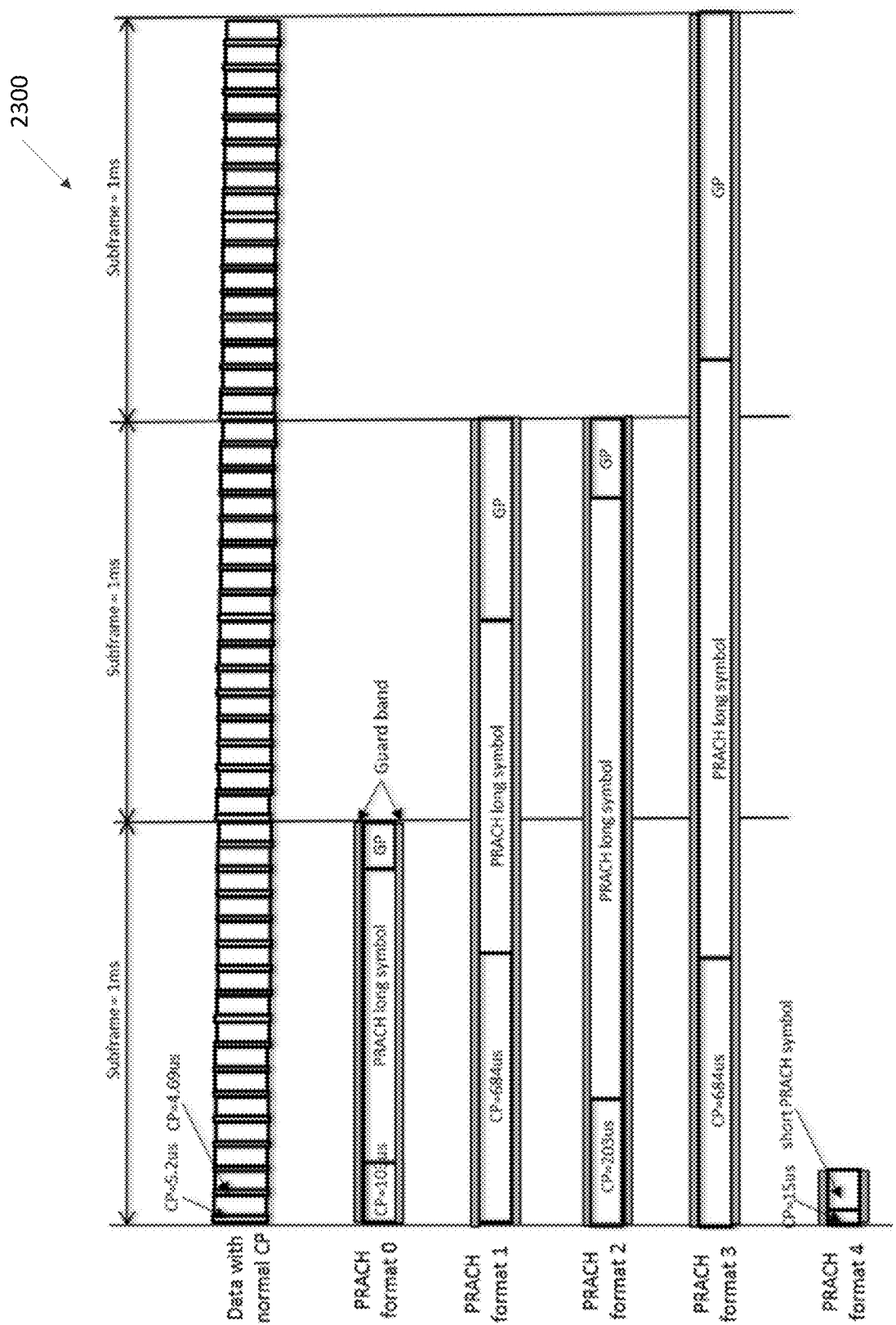
FIG. 23 illustrates an example PRACH format according to embodiments of the present disclosure.

FIG. 23 illustrates an example PRACH format 2300 according to embodiments of the present disclosure. The embodiment of the PRACH format 2300 illustrated in FIG. 23 is for illustration only. FIG. 23 does not limit the scope of this disclosure to any particular implementation.

In FDD, preamble format 0-3 is used. In TDD, preamble format 0-4 are used and the usage of preamble format depends on UL/DL configuration used. There might be multiple random access resources in an UL subframe depending on the UL/DL configuration, e.g., preamble format 1 requires 2 subframes and format 3 requires 3 subframes, as shown in FIG. 23. The number of available UL subframe depends on UL/DL configuration used. The Preamble Format 4 (short PRACH) is only used in TD-LTE, which can be transmitted in the UpPTS part of the special subframe (subframe 1 and/or subframe 6). Minimum number of symbols needed for this is 2. Hence this can be applied only for Special sub frame configurations 5-8 with normal CP or configuration 4-6 with extended CP. PRACH configuration indexes 48 to 57 may use short PRACH. TABLE 5 shows PRACH configuration parameters.

TABLE 5

| PRACH configuration | System frame number | Subframe number |
| --- | --- | --- |
| 0 | Even | 1 |
| 1 | Even | 4 |
| 2 | Even | 7 |
| 3 | Any | 1 |
| 4 | Any | 4 |
| 5 | Any | 7 |
| 6 | Any | 1, 6 |
| 7 | Any | 2, 7 |
| 8 | Any | 3, 8 |
| 9 | Any | 1, 4, 7 |
| 10 | Any | 2, 5, 8 |
| 11 | Any | 3, 6, 9 |
| 12 | Any | 0, 2, 4, 6, 8 |
| 13 | Any | 1, 3, 5, 7, 9 |
| 14 | Any | 0, 1, 2, 3, 4, 5, 6, 7, 8, 9 |
| 15 | Even | 9 |

In LTE, the RACH procedure may be triggered by the following events. At step 1, for initial access and non-synchronized UEs, an initial access after radio link failure. At step 2, for RRC_IDLE and non-synchronized UEs, an initial access from RRC_IDLE. At step 3, for RRC_connected and non-synchronized UEs: handover requiring random access procedure; DL data arrival during RRC_CONNECTED when UL is "non-synchronised;" UL data arrival during RRC_CONNECTED when UL is "non-synchronised." At step 4, for RRC_connected and synchronized UEs: scheduling Request (SR) if there are no PUCCH resources for SR available; and positioning if UE's TA timer has expired, and UE needs to send or receive data, it performs random access.

The NR may support RA procedure for both RRC_IDLE UEs and RRC_CONNECTED UEs. Also both contention-based and contention-free RA procedure may be supported. The contention-free procedure is initiated from network in case of a handover. The present disclosure focuses on the design of NR contention-based RACH procedure for the RRC_CONNECTED synchronized UEs, since in NR there may be a large number of RRC_CONNECTED UEs or devices (e.g., in machine-type communication, MTC) and the limited PUCCH resources are not enough for sending request of uplink data transmission and additional request of beam refinement or beam management in NR. In LTE, the RRC_CONNECTED synchronized UEs use the same PRACH formats as that of non-synchronized UEs with long CP and symbol length as well as large overhead of guard band and guard time. It is more demanding for the NR UEs to improve the efficiency of contention-based RACH procedure.

The present disclosure relates generally to wireless communication systems and, more specifically, to the design of NR PRACH formats, along with their associated NR-PRACH configuration, NR-PRACH preamble and NR-PRACH procedures. The design of PRACH formats and transmission schemes as well as configuration method are illustrated in the following embodiments. Herein, a class of methods and apparatuses are disclosed, which may increase the network efficiency by reducing the collision probability of random access and decreasing the overhead of PRACH transmission per UE.

Note that whereas many alterations and modifications of the present disclosure may not be doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the present disclosure.

Figure 24:
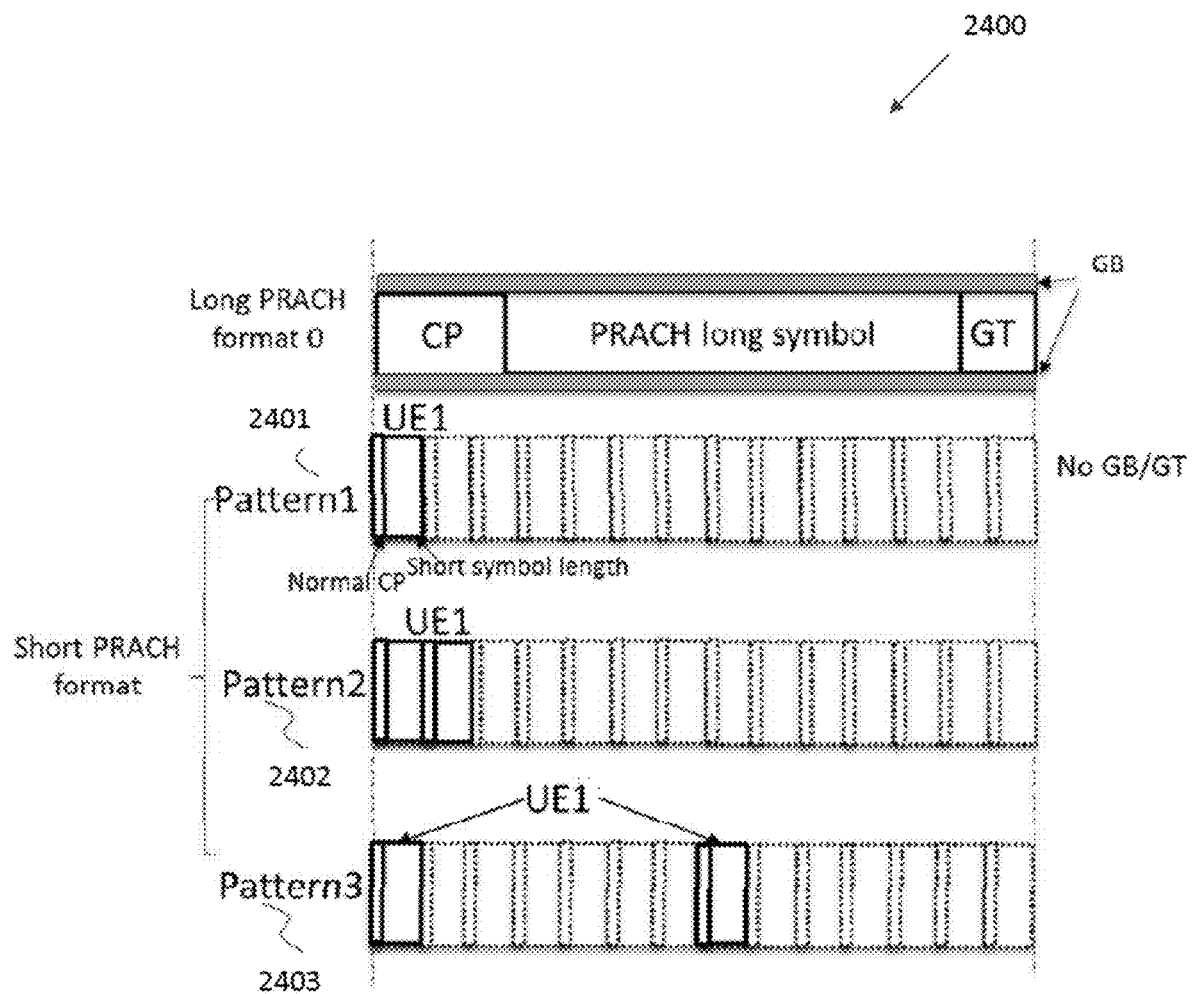
FIG. 24 illustrates another example PRACH format according to embodiments of the present disclosure.

FIG. 24 illustrates another example PRACH format 2400 according to embodiments of the present disclosure. The embodiment of the PRACH format 2400 illustrated in FIG. 24 is for illustration only. FIG. 24 does not limit the scope of this disclosure to any particular implementation.

The PRACH format for the RRC_CONNECTED synchronized UEs can have shorter CP and shorter symbol duration. As illustrated in FIG. 24, the LTE PRACH preamble format 0 is based on a PRACH preamble sequence of length 24576 Ts. This length corresponds to a sub-carrier spacing of 1.25 kHz, in contrast to PUSCH and PUCCH which use a sub-carrier spacing of 15 kHz. For LTE release 8, the inter-carrier interference, due to different sub-carrier spacing, is limited by having small guard bands between PRACH and PUSCH and by allocating PRACH to a single interval of adjacent sub-carriers. Also, the small sub-carrier spacing makes the PRACH preamble more sensitive to frequency errors and other impairments as compared to other physical channels. Therefore, if the short PRACH symbol has same numerology as data symbol in PUSCH as well as the control symbol in PUCCH, no guard band (GB) is needed because of the orthogonality between PRACH and UL data. The PRACH symbol with same CP is timely aligned with the data symbol and the processing in the base station can be using the same FFT for both the data and the PRACH. Although the numerology may be different depending on the frequency ranges, the system information is used for all UL transmission, i.e., PRACH, PUSCH, and PUCCH, and no additional system information is needed to differentiate PRACH, at least for RRC_CONNECTED synchronized users.

Within the same length of the long PRACH format 0, there are 14 symbols in case of normal CP length. For the conventional contention-based RA, the UEs are identified by using the PRACH preamble index only and the two UEs may collide if they select the same long preamble in same indicated PRACH resources. Instead, the short PRACH format allows UEs to randomly select a subset of PRACH resources. The UE can be distinguished by more than one parameter, e.g., the PRACH preamble index and the subset PRACH resource index. It may reduce collision probability by using the short PRACH format. The more number of PRACH resource subsets achieve larger gain on collision reduction. The short PRACH preambles can be a sequence with shorter length catered with the number of subcarriers within the short symbol, i.e., 72 subcarriers within 6 PRBs of PRACH bandwidth. Instead of sending the long PRACH preamble, the short length of PRACH preamble costs less power consumption per UE contention.

As illustrated in FIG. 24, each subset consists of one or several short symbols (contiguous or non-contiguous), and the number of symbols is configurable and indicated by the system information. The UEs can be configured to repeat the short PRACH preamble/symbol in the selected subset PRACH resources. Repeated symbols improve the PRACH detection performance and the carrier frequency offset estimation at the receiver side. The subset can be non-overlapped (orthogonal) or partially overlapped (non-orthogonal). The non-orthogonal subset configuration may increase the total number of subsets at the price of the detection performance.

In order to control the signaling overhead of PRACH resource subset selection, the network can pre-define a pattern or several patterns. The system information block (MIB or SIB) indicate the pattern index with very limited signal overhead. As shown in FIG. 24, the TDMA patterns are illustrated as: (1) pattern1, select a subset resource consisting of one symbol as 2401 as shown in FIG. 24; (2) pattern2, select a subset resource consisting of two consecutive symbols as 2402 as shown in FIG. 24; and (3) pattern3, select a subset resource consisting of two distributed symbols as 2403 as shown in FIG. 24.

In case of Pattern 1 2401 of FIG. 24, each PRACH subset has 72 subcarriers and there are 14 orthogonal subsets. The symbol/subset positions are another orthogonal dimension to separate users. It has larger multiplexing capacity than that of the LTE PRACH format 0 within same resources of 6 PRBs over 1 ms, which has only 839 subcarriers and only support 64 orthogonal preambles per cell.

For the sake of larger random access capacity, similar patterns may be extended to longer period of PRACH resources, e.g., to have same cost of PRCH format 1, 2 in FIG. 23 with 14×2 symbols, or that of PRACH format 3 in FIG. 23 with 14×3 symbols.

For special subframe, UpPTS in TDD mode, similar patterns may be cut to shorter period of PRACH resources, e.g., to have same cost of PRACH format 4 in FIG. 23 with 2 symbols.

Figure 25:
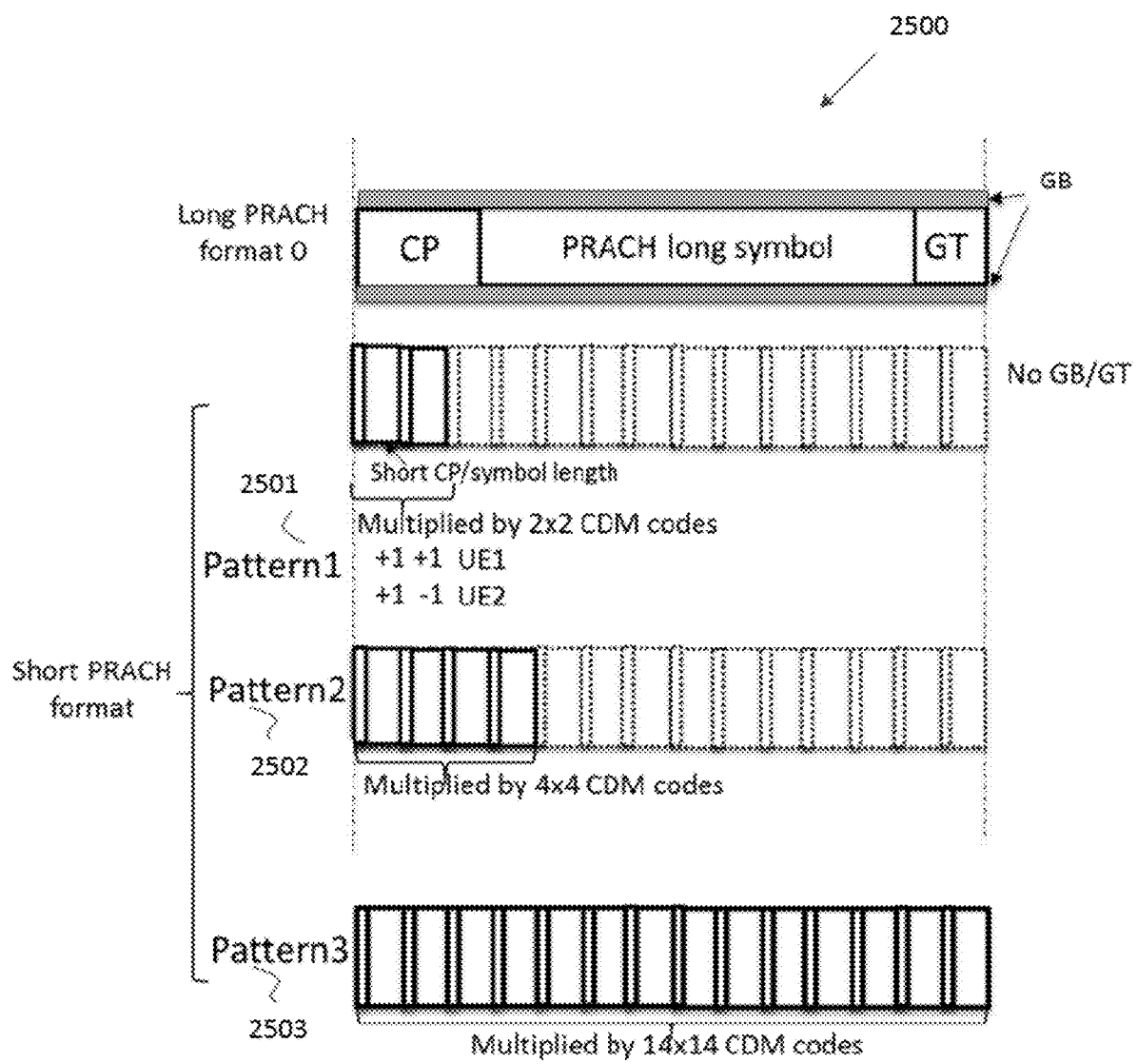
FIG. 25 illustrates yet another example PRACH format according to embodiments of the present disclosure.

FIG. 25 illustrates yet another example PRACH format 2500 according to embodiments of the present disclosure. The embodiment of the PRACH format 2500 illustrated in FIG. 25 is for illustration only. FIG. 25 does not limit the scope of this disclosure to any particular implementation.

The PRACH format for the RRC_CONNECTED synchronized UEs can have shorter CP and shorter symbol duration. As illustrated in FIG. 25, the LTE PRACH preamble format 0 is based on a PRACH preamble sequence of length 24576 Ts. This length corresponds to a sub-carrier spacing of 1.25 kHz, in contrast to PUSCH and PUCCH which use a sub-carrier spacing of 15 kHz. For LTE release 8, the inter-carrier interference, due to different sub-carrier spacing, is limited by having small guard bands between PRACH and PUSCH and by allocating PRACH to a single interval of adjacent sub-carriers. Also, the small sub-carrier spacing makes the PRACH preamble more sensitive to frequency errors and other impairments as compared to other physical channels. Therefore, if the short PRACH symbol has same numerology as data symbol in PUSCH as well as the control symbol in PUCCH, no guard band (GB) is needed because of the orthogonality between PRACH and UL data. The PRACH symbol with same CP is timely aligned with the data symbol and the processing in the base station can be using the same FFT for both the data and the PRACH. Although the numerology may be different depending on the frequency ranges, the system information is used for all UL transmission, i.e., PRACH, PUSCH, and PUCCH, and no additional system information is needed to differentiate PRACH, at least for RRC_CONNECTED synchronized users.

Within the same length of the long PRACH format 0, there are 14 symbols in case of normal CP length. For the conventional contention-based RA, the UEs are identified by using the PRACH preamble index only and the two UEs may collide if they select the same long preamble in same indicated PRACH resources. Instead, the short PRACH format allows UEs to randomly select a subset of PRACH resources. The UE can be distinguished by more than one parameter, e.g., the PRACH preamble index and the subset PRACH resource index. It may reduce collision probability by using the short PRACH format. The more number of PRACH resource subsets achieve larger gain on collision reduction. The short PRACH preambles can be a sequence with shorter length catered with the number of subcarriers within the short symbol, i.e., 72 subcarriers within 6 PRBs of PRACH bandwidth. Instead of sending the long PRACH preamble, the short length of PRACH preamble costs less power consumption per UE contention.

As illustrated in FIG. 25, each subset consists of multiple contiguous repeated short symbols scrambled by CDM codes, and the number of symbols is configurable and indicated by the system information. Note that the CDM codes can be orthogonal codes, such as P-matrix, OVSF codes, DFT-matrix, etc. The subset can be non-overlapped (orthogonal) or partially overlapped (non-orthogonal). The non-orthogonal subset configuration may increase the total number of subsets at the price of the detection performance.

In order to control the signaling overhead of PRACH resource subset selection, the network can pre-define a pattern or several patterns. The system information block (MIB or SIB) indicate the pattern index with very limited signal overhead. As shown in FIG. 25, the CDM+TDM patterns are illustrated as: (1) pattern1, select a subset resource consisting of 2 consecutive symbols with 2×2 CDM codes as 1101 as shown in FIG. 25; (2) pattern2, select a subset resource consisting of 4 consecutive symbols with 4×4 CDM codes as 1102 as shown in FIG. 25; and (3) pattern3, select a subset resource consisting of 14 consecutive symbols with 14×14 CDM codes as 1103 as shown in FIG. 25.

In case of Pattern 1 2501 of FIG. 25, each PRACH subset has 72 subcarriers and there are 7 orthogonal subsets with 2 CDM codes. The symbol/subset positions as well as CDM codes are additional orthogonal dimension to separate users. It has larger multiplexing capacity than that of the LTE PRACH format 0 within same resources of 6 PRBs over 1 ms, which has only 839 subcarriers and only support 64 orthogonal preambles per cell.

For the sake of larger random access capacity, similar patterns may be extended to longer period of PRACH resources, e.g., to have same cost of PRCH format 1, 2 in FIG. 23 with 14×2 symbols, or that of PRACH format 3 in FIG. 23 with 14×3 symbols. For special subframe, UpPTS in TDD mode, similar patterns may be cut to shorter period of PRACH resources, e.g., to have same cost of PRACH format 4 as shown in FIG. 23 with 2 symbols.

Figure 26:
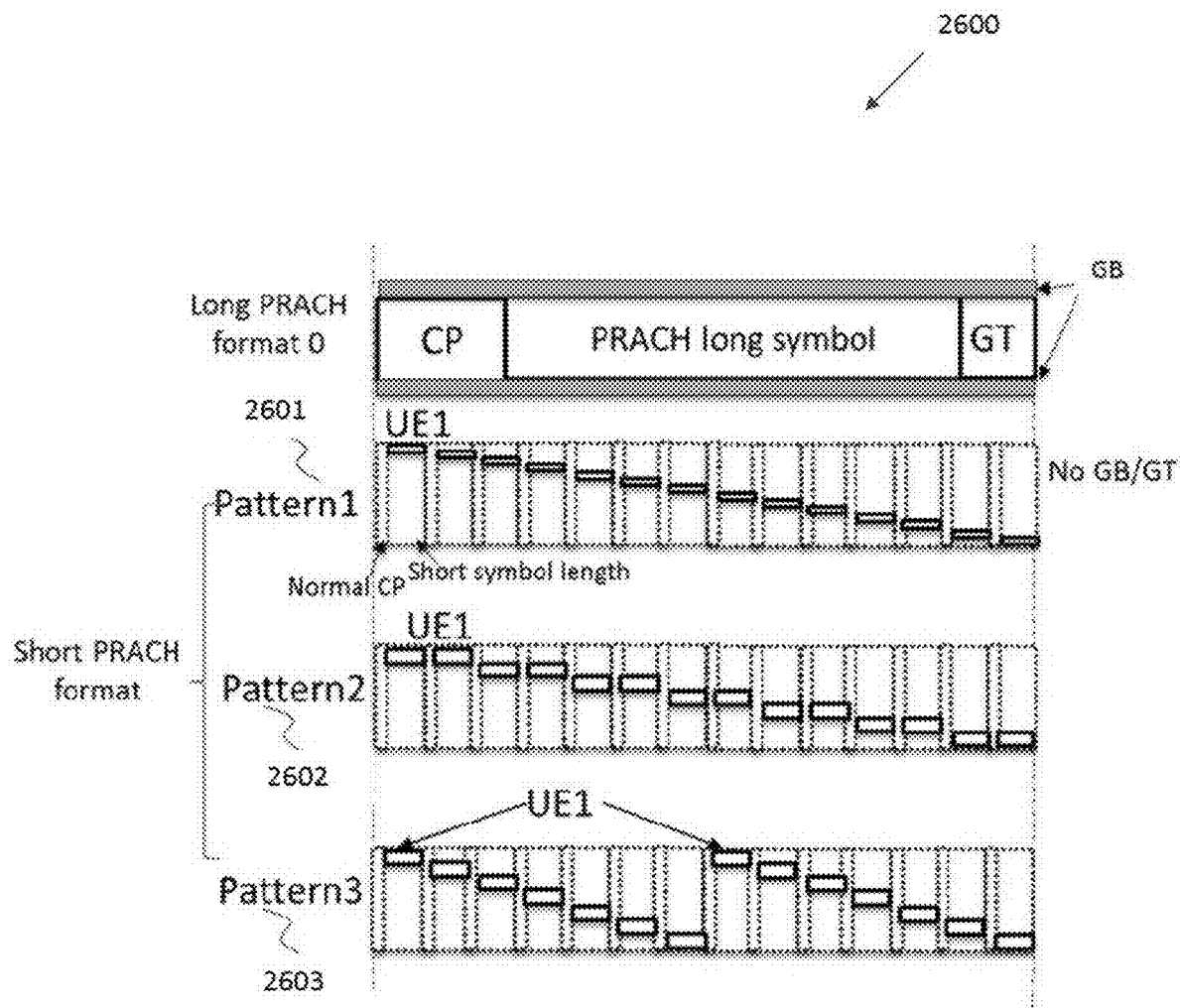
FIG. 26 illustrates yet another example PRACH format according to embodiments of the present disclosure.

FIG. 26 illustrates yet another example PRACH format 2600 according to embodiments of the present disclosure. The embodiment of the PRACH format 2600 illustrated in FIG. 26 is for illustration only. FIG. 26 does not limit the scope of this disclosure to any particular implementation.

The PRACH format for the RRC_CONNECTED synchronized UEs can have shorter CP and shorter symbol duration. As illustrated in FIG. 26, the LTE PRACH preamble format 0 is based on a PRACH preamble sequence of length 24576 Ts. This length corresponds to a sub-carrier spacing of 1.25 kHz, in contrast to PUSCH and PUCCH which use a sub-carrier spacing of 15 kHz. For LTE release 8, the inter-carrier interference, due to different sub-carrier spacing, is limited by having small guard bands between PRACH and PUSCH and by allocating PRACH to a single interval of adjacent sub-carriers. Also, the small sub-carrier spacing makes the PRACH preamble more sensitive to frequency errors and other impairments as compared to other physical channels. Therefore, if the short PRACH symbol has same numerology as data symbol in PUSCH as well as the control symbol in PUCCH, no guard band (GB) is needed because of the orthogonality between PRACH and UL data. The PRACH symbol with same CP is timely aligned with the data symbol and the processing in the base station can be using the same FFT for both the data and the PRACH. Although the numerology may be different depending on the frequency ranges, the system information is used for all UL transmission, i.e., PRACH, PUSCH, and PUCCH, and no additional system information is needed to differentiate PRACH, at least for RRC_CONNECTED synchronized users.

Within the same length of the long PRACH format 0, there are 14 symbols in case of normal CP length. For the conventional contention-based RA, the UEs are identified by using the PRACH preamble index only and the two UEs may collide if they select the same long preamble in same indicated PRACH resources. Instead, the short PRACH format allows UEs to randomly select a subset of PRACH resources. The UE can be distinguished by more than one parameter, e.g., the PRACH preamble index and the subset PRACH resource index. It may reduce collision probability by using the short PRACH format. The more number of PRACH resource subsets achieve larger gain on collision reduction. The short PRACH preambles can be a sequence with shorter length catered with the number of subcarriers within the short symbol, i.e., 72 subcarriers within 6 PRBs of PRACH bandwidth. Instead of sending the long PRACH preamble, the short length of PRACH preamble costs less power consumption per UE contention.

As illustrated in FIG. 26, each subset consists of interleaved subbands with a group of subcarriers per short symbol, and the number of subcarrier per subband is configurable and indicated by the system information. The UEs can be configured to repeat the interleaved subbands in the selected subset PRACH resources. Repeated subbands improve the PRACH detection performance and carrier frequency offset (CFO) estimation at the receiver side. The subset can be non-overlapped (orthogonal) or overlapped (non-orthogonal). The non-orthogonal subset configuration may increase the total number of subsets at the price of the detection performance.

In order to control the signaling overhead of PRACH resource subset selection, the network can pre-define a patter or several patterns. The system information block (MIB or SIB) indicate the pattern index with very limited signal overhead. As shown in FIG. 26, the IFDM patterns are illustrated as: (1) pattern1, select a subset resource consisting of interleaved subbands with 5 subcarriers every one symbol as 1301 as shown in FIG. 26; (2) pattern2, select a subset resource consisting of interleaved subbands with 10 subcarriers every two consecutive symbols as 2602 in FIG. 26; and (3) pattern3, select a subset resource consisting of interleaved subbands with 10 subcarriers every two distributed consecutive symbols as 2603 in FIG. 26.

In case of Pattern 1 2601 of FIG. 26, each PRACH subset has 70 subcarriers, and 14 subbands are distributed in 14 symbols. The subband/subset position is another orthogonal dimension to separate users. It has larger multiplexing capacity than that of the LTE PRACH format 0 within same resources of 6 PRBs over 1 ms, which has only 839 subcarriers and only support 64 orthogonal preambles per cell. For the sake of larger random access capacity, similar patterns may be applied to longer period of PRACH resources, e.g., to have same cost of PRCH format 1, 2 in FIG. 23 with 14×2 symbols, or that of PRACH format 3 in FIG. 23 with 14×3 symbols. For special subframe, UpPTS in TDD mode, similar patterns may be cut to shorter period of PRACH resources, e.g., to have same cost of PRACH format 4 in FIG. 23 with 2 symbols.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A base station comprising:
   a controller configured to:
      generate a primary synchronization signal (PSS) at a first orthogonal frequency division multiplexing (OFDM) symbol of a synchronization signal (SS) block based on one antenna port,
      generate a secondary synchronization signal (SSS) at a second OFDM symbol of the SS block based on the one antenna port, wherein the first OFDM symbol is perfectly separated with the second OFDM symbol and is located prior to the second OFDM symbol in the SS block, and
      generate a physical broadcast channel (PBCH) at the second OFDM symbol of the SS block based on the one antenna port, wherein the PBCH is frequency division multiplexed with the SSS only at the second OFDM symbol of the SS block, wherein a bandwidth of the SSS and the PBCH in the second OFDM symbol is X times larger than a bandwidth of the PSS in the first OFDM symbol, and wherein X has a value that is less than two and greater than one; and
   a transceiver operably coupled with the controller, the transceiver configured to transmit the SS block including the PSS, the SSS, and the PBCH.

2. The base station of claim 1, wherein the bandwidth for the SSS and the PBCH of the second OFDM symbol of the SS block is larger than the bandwidth for all signal(s) in the first OFDM symbol of the SS block, and wherein the PSS is the only signal in the first OFDM symbol of the SS block.

3. The base station of claim 1, wherein the PBCH is frequency division multiplexed with the SSS by a contiguous subcarrier block level, at the second OFDM symbol of the SS block.

4. The base station of claim 1, wherein a number of a SS block and location of the SS block are configured within a half frame.

5. The base station of claim 1, wherein a measurement for radio resource management (RRM) is performed based on a channel state information reference signal (CSI-RS).

6. A method by a base station, the method comprising:
generating a primary synchronization signal (PSS) at a first orthogonal frequency division multiplexing (OFDM) symbol of a synchronization signal (SS) block based on one antenna port;
generating a secondary synchronization signal (SSS) at a second OFDM symbol of the SS block based on the one antenna port, wherein the first OFDM symbol is perfectly separated with the second OFDM symbol and is located prior to the second OFDM symbol in the SS block;
generating a physical broadcast channel (PBCH) at the second OFDM symbol of the SS block based on the one antenna port, wherein the PBCH is frequency division multiplexed with the SSS only at the second OFDM symbol of the SS block, wherein a bandwidth of the SSS and the PBCH in the second OFDM symbol is X times larger than a bandwidth of the PSS in the first OFDM symbol, and wherein X has a value that is less than two and greater than one; and
transmitting the SS block including the PSS, the SSS, and the PBCH.

7. The method of claim 6, wherein the bandwidth for the SSS and the PBCH of the second OFDM symbol of the SS block is larger than the bandwidth for all signal(s) in the first OFDM symbol of the SS block, and wherein the PSS is the only signal in the first OFDM symbol of the SS block.

8. The method of claim 6, wherein the PBCH is frequency division multiplexed with the SSS by a contiguous subcarrier block level, at the second OFDM symbol of the SS block.

9. The method of claim 6, wherein a number of a SS block and location of the SS block are configured within a half frame.

10. The method of claim 6, wherein a measurement for radio resource management (RRM) is performed based on a channel state information reference signal (CSI-RS).

11. A terminal comprising:
a transceiver; and
a controller coupled with the transceiver and configured to:
identify a primary synchronization signal (PSS) at a first orthogonal frequency division multiplexing (OFDM) symbol of a synchronization signal (SS) block based on one antenna port,
identify a secondary synchronization signal (SSS) at a second OFDM symbol of the SS block based on the one antenna port, wherein the first OFDM symbol is perfectly separated with the second OFDM symbol and is located prior to the second OFDM symbol in the SS block, and
identify a physical broadcast channel (PBCH) at the second OFDM symbol of the SS block based on the one antenna port,
wherein the PBCH is frequency division multiplexed with the SSS only at the second OFDM symbol of the SS block,
wherein a bandwidth of the SSS and the PBCH in the second OFDM symbol is X times larger than a bandwidth of the PSS in the first OFDM symbol, and
wherein X has a value that is less than two and greater than one.

12. The terminal of claim 11, wherein the bandwidth for the SSS and the PBCH of the second OFDM symbol of the SS block is larger than the bandwidth for all signal(s) in the first OFDM symbol of the SS block, and wherein the PSS is the only signal in the first OFDM symbol of the SS block.

13. The terminal of claim 11, wherein the PBCH is frequency division multiplexed with the SSS by a contiguous subcarrier block level, at the second OFDM symbol of the SS block.

14. The terminal of claim 11, wherein a number of a SS block and location of the SS block are configured within a half frame.

15. The terminal of claim 11, wherein a measurement for radio resource management (RRM) is performed based on a channel state information-reference signal (CSI-RS).

16. A method by a terminal, the method comprising:
identifying a primary synchronization signal (PSS) at a first orthogonal frequency division multiplexing (OFDM) symbol of a synchronization signal (SS) block based on one antenna port;
identifying a secondary synchronization signal (SSS) at a second OFDM symbol of the SS block based on the one antenna port, wherein the first OFDM symbol is perfectly separated with the second OFDM symbol and is located prior to the second OFDM symbol in the SS block; and
identifying a physical broadcast channel (PBCH) at the second OFDM symbol of the SS block based on the one antenna port, wherein the PBCH is frequency division multiplexed with the SSS only at the second OFDM symbol of the SS block, wherein a bandwidth of the SSS and the PBCH in the second OFDM symbol is X times larger than a bandwidth of the PSS in the first OFDM symbol, and wherein X has a value that is less than two and greater than one.

17. The method of claim 16, wherein the bandwidth for the SSS and the PBCH of the second OFDM symbol of the SS block is larger than the bandwidth for all signal(s) in the first OFDM symbol of the SS block, and wherein the PSS is the only signal in the first OFDM symbol of the SS block.

18. The method of claim 16, wherein the PBCH is frequency division multiplexed with the SSS by a contiguous subcarrier block level, at the second OFDM symbol of the SS block.

19. The method of claim 16, wherein a number of a SS block and location of the SS block are configured within a half frame.

20. The method of claim 16, wherein a measurement for radio resource management (RRM) is performed based on a channel state information-reference signal (CSI-RS).

* * * * *